(12) United States Patent
Ueno et al.

(10) Patent No.: US 11,587,121 B2
(45) Date of Patent: Feb. 21, 2023

(54) PEDESTRIAN DEVICE, COMMUNICATION DEVICE, AND INFORMATION DISTRIBUTION METHOD

(71) Applicant: PANASONIC CORPORATION, Osaka (JP)

(72) Inventors: Tsuyoshi Ueno, Kanagawa (JP); Hiroaki Sudo, Kanagawa (JP); Masahito Sugahara, Kanagawa (JP); Shintaro Muramatsu, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/270,772

(22) PCT Filed: Aug. 20, 2019

(86) PCT No.: PCT/JP2019/032469
§ 371 (c)(1),
(2) Date: Feb. 23, 2021

(87) PCT Pub. No.: WO2020/040147
PCT Pub. Date: Feb. 27, 2020

(65) Prior Publication Data
US 2021/0334854 A1 Oct. 28, 2021

(30) Foreign Application Priority Data

Aug. 24, 2018 (JP) .............................. JP2018-156972
Aug. 24, 2018 (JP) .............................. JP2018-156973

(51) Int. Cl.
*G06Q 30/00* (2012.01)
*G06Q 30/0251* (2023.01)
*G01C 21/36* (2006.01)

(52) U.S. Cl.
CPC ..... *G06Q 30/0267* (2013.01); *G06Q 30/0261* (2013.01); *G01C 21/3697* (2013.01); *G06Q 30/0265* (2013.01)

(58) Field of Classification Search
None
See application file for complete search history.

(56) References Cited

U.S. PATENT DOCUMENTS 9,286,794 B2 * 3/2016 Duncan ................ G02B 27/017
9,881,503 B1 * 1/2018 Goldman-Shenhar ......................
G08G 1/005

(Continued)

FOREIGN PATENT DOCUMENTS

JP 2010-237411 10/2010
JP 2011-198295 10/2011

(Continued)

OTHER PUBLICATIONS

International Search Report (ISR) from International Searching Authority (Japan Patent Office) in International Pat. Appl. No. PCT/JP2019/032469, dated Nov. 26, 2019, along with an English language translation thereof.

(Continued)

*Primary Examiner* — Meredith A Long
(74) *Attorney, Agent, or Firm* — Greenblum & Bernstein, P.L.C.

(57) ABSTRACT

The object of the present invention is to enable presentation of information on a target object (vehicle) located on a road to a pedestrian at an appropriate time and such that the information includes appropriate information for the pedestrian's statues. A pedestrian device transmits position data of a pedestrian to an in-vehicle device, which determines whether or not the pedestrian approaches a vehicle based on the position data. When determining that the pedestrian approaches the vehicle, the in-vehicle device transmits guid- (Continued)

ance direction information to the pedestrian device. The pedestrian device performs control based on the guidance direction information so as to guide the pedestrian to look toward the vehicle, and the pedestrian device acquires sight status information of the pedestrian from a wearable terminal and transmits the sight status information to the in-vehicle terminal. Then, the in-vehicle terminal determines whether or not the pedestrian sees the vehicle. When determining that the pedestrian does not see the vehicle, the in-vehicle terminal transmit alert information to the pedestrian terminal, and the pedestrian terminal performs control based on the alert information so as to provide an alert to the pedestrian.

18 Claims, 30 Drawing Sheets

(56) References Cited

U.S. PATENT DOCUMENTS

| | | |
|---|---|---|
| 2011/0234422 A1 | 9/2011 | Yamashita |
| 2012/0130635 A1 | 5/2012 | Nakamura et al. |
| 2016/0093207 A1 | 3/2016 | Di Censo et al. |
| 2017/0076578 A1 | 3/2017 | Tsubouchi et al. |
| 2017/0109591 A1 | 4/2017 | Sakuragi |
| 2018/0165965 A1* | 6/2018 | Ewert .................. G01S 5/00 |

FOREIGN PATENT DOCUMENTS

| | | |
|---|---|---|
| JP | 2012-108801 | 6/2012 |
| JP | 2013-012024 | 1/2013 |
| JP | 2014-142798 | 8/2014 |
| JP | 2016-009431 | 1/2016 |
| JP | 5874980 | 3/2016 |
| JP | 2017-058945 | 3/2017 |
| JP | 2017-536595 | 12/2017 |
| JP | 2018-026718 | 2/2018 |
| JP | 6312310 | 4/2018 |

OTHER PUBLICATIONS

Office Action from Japan Patent Office (JPO) in Japanese Patent Appl. No. 2018-156973, dated Aug. 30, 2022, together with an English language translation.
Office Action from Japan Patent Office (JPO) in Japanese Patent Appl. No. 2018-156972, dated Nov. 1, 2022.

* cited by examiner

Fig.14 vehicle body information

| vehicle body size | vehicle type | vehicle color | vehicle body image data |
|---|---|---|---|
| width x, length y, height h | truck | silver | URL http://xxx.jpg |

Fig.15 image display settings information

| p-to-vehicle distance | vehicle body size | sizes of virtual vehicle image |
|---|---|---|
| 100m | 5m × 2m × 2m | 5mm × 1mm × 1mm |
| 10m | | 2cm × 1cm × 1cm |
| 0m | | 5m × 2m × 2m |

Fig24 ad object database

| ad object ID | position info | head orien | coordinates of viewpoint | access to ad object info (URL) |
|---|---|---|---|---|
| 101 | lat.i1~i3 longk1~k3 | d1~d3deg | x1~x3, y1~y3 | http://xx1.riceball100 |
| 102 | lat.i4~i6 longk4~k6 | d2~d4deg | x2~x5, y1~y3 | http://xx2.ticketavaibale |
| 103 | lat.i7~i9 longk7~k9 | d3~d5deg | x3~x6, y1~y3 | http://xx3.XXatsale |
| ⋮ | ⋮ | ⋮ | ⋮ | ⋮ |

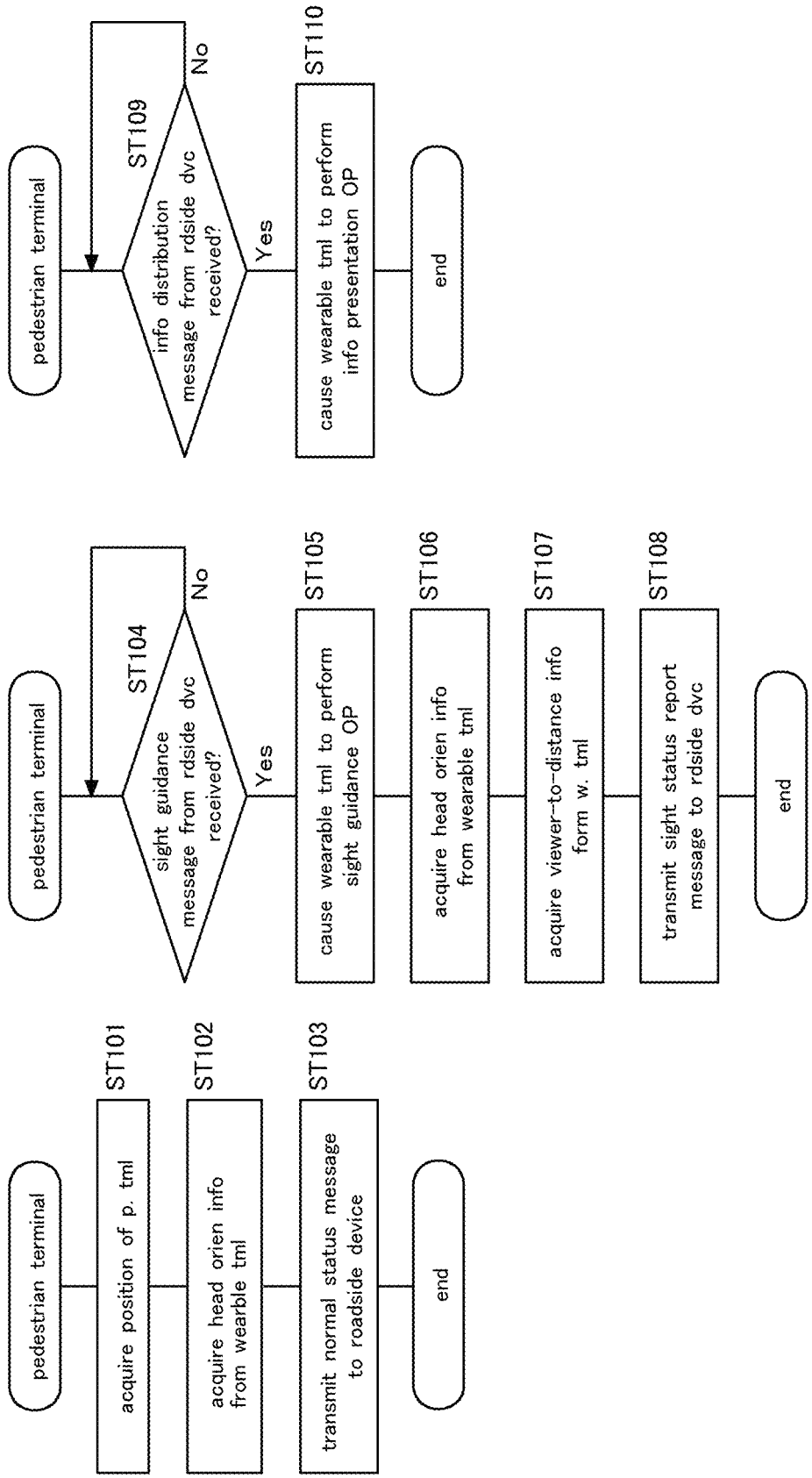

*Fig.29*
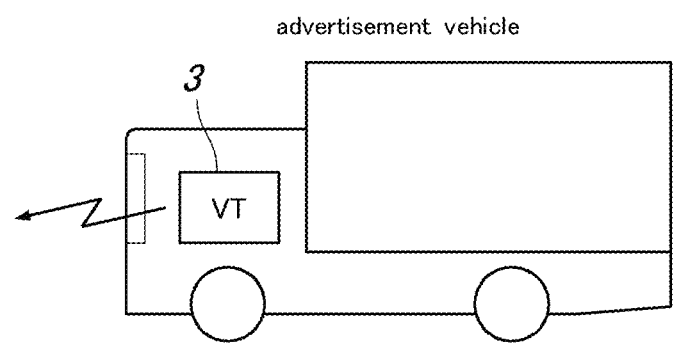
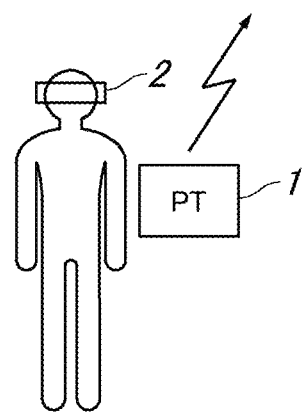

PEDESTRIAN DEVICE, COMMUNICATION DEVICE, AND INFORMATION DISTRIBUTION METHOD

TECHNICAL HELD

The present invention relates to a pedestrian device carried by a pedestrian, a communication device installed near a target object (a target to be paid attention to), the target object being on or around a road, for delivering target object information, and an information distribution method by which target object information is delivered from a communication device to a pedestrian device.

BACKGROUND ART

In recent years, studies have been in progress for the practical and widespread use of safe driving assistance wireless systems utilizing ITS (Intelligent Transport System). In such safe driving assistance wireless systems, an in-vehicle terminal mounted in a vehicle performs ITS communications (vehicle-to-pedestrian communications) with a pedestrian terminal carried by a pedestrian; that is, transmits and receives the position data of the vehicle and that of the pedestrian to and from the pedestrian terminal, thereby determining if there is a risk of collision between the vehicle and the pedestrian and providing a necessary alert to a driver of the vehicle and/or the pedestrian in order to prevent an accident.

However, when a pedestrian has recognized the presence of a vehicle, such an alert needlessly provided to the pedestrian tends to cause annoyance to the pedestrian. Some known technologies which have been made in view of this problem include a system configured to detect a direction of face of a pedestrian and allow for provision of an alert to the pedestrian only when the pedestrian does not look in the direction toward the vehicle (See Patent Document 1).

Furthermore, in such safe driving assistance wireless systems, an in-vehicle terminal performs not only ITS communications with a pedestrian terminal (vehicle-to-pedestrian communications) but also ITS communications with other in-vehicle terminals (vehicle-to-vehicle communications). In addition, such systems are configured such that roadside devices installed on or near roads perform ITS communications with in-vehicle terminals and pedestrian terminals (roadside-to-pedestrian communications, roadside-to-vehicle communications).

In this way, ITS communications are generally used to exchange information, such as position data, to support pedestrian's safety confirmation and vehicle drivers' safe driving. In other embodiments, safety systems may be configured to use ITS communications to deliver different information to pedestrian terminals to present the information to pedestrians. In particular, such a system may present information on advertisement objects along the road to pedestrians, thereby improving advertising effectiveness of the advertisement objects. However, when pedestrians are not interested in an advertisement object, it is pointless to present information on the advertisement object to the pedestrian. Thus, there is a need for systems which is capable of detecting pedestrians who express some interest in an advertisement object, thereby presenting information on the advertisement object to the detected pedestrians.

In this connection, known technologies include a system in which the direction of a person's line-of-sight is detected and information is presented to the person when the person's line-of-sight is directed to a certain direction, so that information can be presented to the person in an efficient manner (See Patent Documents 2 and 3).

PRIOR ART DOCUMENT (S)

Patent Document(s)

Patent Document 1: JP2011-198295A
Patent Document 2: JP5874980B2
Patent Document 3: JP6312310B2

SUMMARY OF THE INVENTION

Task to be Accomplished by the Invention

Generally, when a pedestrian does not look in the direction toward a vehicle, the pedestrian is assumed to have not yet recognized the approaching vehicle. Thus, as in the above prior art, safety systems may be configured to notify a pedestrian of an approaching vehicle so that the pedestrian can recognize the presence of the approaching vehicle. However, in such a configuration, since a pedestrian is only notified of the fact that a vehicle approaches, pedestrian does not know from which direction the vehicle is approaching, which results in occurrence of a need to look around upon being notified of the approaching vehicle, leading to a problem that the system cannot sufficiently support pedestrians' safety confirmation. Another related problem is that, when a pedestrian adequately confirms safe conditions even though the pedestrian does not look in the direction toward a vehicle, such a system needlessly provides an alert to the pedestrian, which can be annoyance to the pedestrian, causing the pedestrian to feel uncomfortable with the alert.

Furthermore, some systems of the above-described prior are configured detect the direction of a person's line-of-sight so that information can be presented to the pedestrian when the pedestrian looks in the direction toward an advertisement object. However, a pedestrian sometimes passes by an advertisement object without noticing it, thereby failing to look at in the direction toward the advertisement object. In such cases, even when the pedestrian is interested in the advertisement object, the system cannot present advertisement information to the pedestrian, wasting a chance to effectively provide advertisement.

The present invention has been made in view of these problems of the prior art, and a primary object of the present invention is to provide a pedestrian device, a communication device, and an information distribution method which can present information on a target object which is located on or around a road, to a pedestrian at an appropriate time and such that the information includes appropriate information for the pedestrian's status.

Means to Accomplish the Task

An aspect of the present invention provides a pedestrian device comprising: a communication transceiver configured to communicate with a communication device installed near a target object to be paid attention, the target object being located on or around a road; and a controller, wherein the controller is configured to cause the communication transceiver to transmit the position data of a pedestrian to the communication device; wherein the communication device is configured to transmit guidance direction information to the pedestrian device when the pedestrian approaches to within a predetermined distance from the target object; wherein, when the communication transceiver receives the guidance direction information transmitted from the communication device, the controller is configured to perform control based on the guidance direction information so as to guide the pedestrian to look in the direction toward the target object; and acquire sight status information on the sight status of the pedestrian, and causes the communication transceiver to transmit the sight status information to the communication device; and wherein, when the communication device transmits, based on the sight status information, target object information on the target object to the pedestrian device, and then the communication transceiver receives the target object information, the controller performs control so as to present the target object information to the pedestrian.

Another aspect of the present invention provides a communication device installed near a target object to be paid attention, the target object being located on or around a road, and configured to deliver target object information on the target object, the communication device comprising: a communication transceiver configured to communicate with a pedestrian device; and a controller, wherein, when the communication transceiver receives position data of a pedestrian transmitted from the pedestrian device, the controller determines whether or not the pedestrian approaches to within a predetermined distance from the target object based on the position data of the pedestrian; wherein, when determining that the pedestrian approaches to within the predetermined distance from the target object, the controller causes the communication transceiver to transmit guidance direction information to the pedestrian device, such that the pedestrian device uses the guidance direction information to guide the pedestrian to look in the direction toward the target object; and wherein, when the communication transceiver receives sight status information on the sight status of the pedestrian, the controller determines, based on the sight status information, whether or not the pedestrian sees the target object, and then, based on the determination result, the controller transmits target object information to the pedestrian device.

Yet another aspect of the present invention provides an information distribution method by which a communication device installed near a target object to be paid attention, which target object is located on or around a road, delivers target object information on the target object to a pedestrian device, wherein the pedestrian device transmits the position data of a pedestrian to the communication device; wherein the communication device determines whether or not the pedestrian approaches to within a predetermined distance from the target object based on the position data of the pedestrian; wherein, when determining that the pedestrian approaches to within the predetermined distance from the target object, the communication device transmits guidance direction information to the pedestrian device, wherein the guidance direction information is to be used to guide the pedestrian to look in the direction toward the target object; wherein, when receiving the guidance direction information, the pedestrian device performs control based on the guidance direction information so as to guide the pedestrian to look in the direction toward the target object, and acquires sight status information on the sight status of the pedestrian, and transmits the sight status information to the communication device; wherein, when receiving the sight status information, the communication device determines, based on the sight status information, whether or not the pedestrian sees the target object, and then, based on the determination result, transmits target object information on the target object to the pedestrian device; and wherein, when receiving the target object information, the pedestrian device performs control so as to present the target object information to the pedestrian.

Effect of the Invention

According to the present invention, a pedestrian can be guided to look in the direction toward a target object (a target to be paid attention to; such as vehicle or advertisement object) located on or around a road, and in response to whether or not the pedestrian sees the target object, information associated with the target object can be presented to the pedestrian at an appropriate time and such that the information includes appropriate information for the pedestrian's status.

BRIEF DESCRIPTION OF THE DRAWINGS

FIG. 14 is an explanatory diagram showing vehicle body information stored in a storage 55 of the in-vehicle terminal 3 according to the third embodiment;

FIG. 15 is an explanatory diagram showing image display settings information stored in the storage 55 of the in-vehicle terminal 3 according to the third embodiment;

FIG. 24 is an explanatory diagram showing an advertisement object database stored in a storage 73 of the roadside device 6 according to the fifth embodiment;

FIG. 25A, FIG. 25B, and FIG. 25C show flow charts of an operation procedure of the pedestrian terminal 1 according to the fifth embodiment;

FIG. 29 is a diagram showing a general configuration of an information distribution system according to a seventh embodiment of the present invention.

DESCRIPTION OF THE PREFERRED EMBODIMENT(S)

Figure 1:
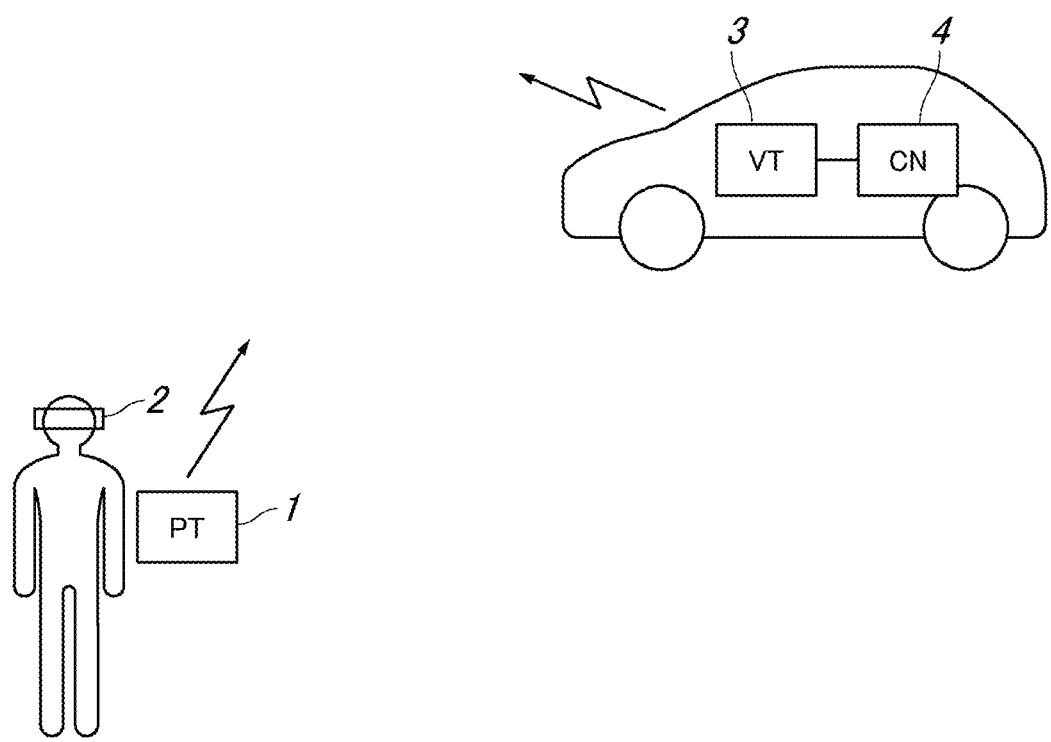
FIG. 1 is a diagram showing a general configuration of a safety confirmation support system according to a first embodiment of the present invention.

A first aspect of the present invention made to achieve the above-described object is a pedestrian device comprising: a communication transceiver configured to communicate with a communication device installed near a target object to be paid attention, the target object being located on or around a road; and a controller, wherein the controller is configured to cause the communication transceiver to transmit the position data of a pedestrian to the communication device; wherein the communication device is configured to transmit guidance direction information to the pedestrian device when the pedestrian approaches to within a predetermined distance from the target object; wherein, when the communication transceiver receives the guidance direction information transmitted from the communication device, the controller is configured to perform control based on the guidance direction information so as to guide the pedestrian to look in the direction toward the target object; and acquire sight status information on the sight status of the pedestrian, and causes the communication transceiver to transmit the sight status information to the communication device; and wherein, when the communication device transmits, based on the sight status information, target object information on the target object to the pedestrian device, and then the communication transceiver receives the target object information, the controller performs control so as to present the target object information to the pedestrian.

According to this configuration, a pedestrian can be guided to look in the direction toward a target object (a target to be paid attention to, such as vehicle or advertisement object) located on or around a road, and in response to whether or not the pedestrian sees the target object, information associated with the target object can be presented to the pedestrian at an appropriate time and such that the information includes appropriate information for the pedestrian's status.

A second aspect of the present invention is the pedestrian device of the first aspect, wherein the communication device is an in-vehicle device mounted in a vehicle; wherein the target object is the vehicle in which the in-vehicle device is mounted; wherein, when determining that the pedestrian does not see the vehicle, the in-vehicle device transmits alert information to the pedestrian device; and wherein, when receiving the alert information transmitted from the in-vehicle device, the controller performs control based on the alert information so as to provide an alert to the pedestrian.

In this configuration, even when a pedestrian is guided to look in the direction toward a vehicle, if the pedestrian still does not see the vehicle; that is, the pedestrian is assumed not to recognize the vehicle, the pedestrian device can provide an alert to the pedestrian. As a result, the pedestrian device can provide an alert to a pedestrian at an appropriate time, thereby properly supporting the pedestrian's safety confirmation.

A third aspect of the present invention is the pedestrian device of the second aspect, further comprising a short-range communication transceiver configured to perform short-range communications with a wearable device, wherein the wearable device is configured to be worn on the pedestrian's body and detect the sight status of the pedestrian; and wherein the controller is configured to acquire the sight status of the pedestrian from the wearable device.

In this configuration, since the wearable device is used to detect the pedestrian's sight status, the pedestrian device can acquire more accurate sight status information.

A fourth aspect of the present invention is the pedestrian device of the third aspect, wherein the wearable device is worn by the pedestrian on the head, and measures a head orientation of the pedestrian and a viewer-to-target distance from a viewpoint of the pedestrian to the target object, as the sight status information; and wherein the controller is configured to transmit the head orientation and the viewer-to-target distance to the in-vehicle device.

In this configuration, the in-vehicle device can be used to accurately determine whether or not the pedestrian sees the vehicle.

A fifth aspect of the present invention is the pedestrian device of the third aspect, wherein the wearable device includes a vibrator, a speaker, and a display; and wherein the controller is configured to control at least one selected from the group consisting of the vibrator, the speaker, and the display of the wearable device so as to guide the pedestrian to look in the direction toward the vehicle.

In this configuration, the pedestrian device can more properly guide a pedestrian to look in the direction toward where a vehicle is present.

A sixth aspect of the present invention is the pedestrian device of the third aspect, wherein the controller is configured to cause a display included in the wearable device to display a virtual vehicle image.

In this configuration, even when a vehicle is out of sight from a pedestrian (e.g., when the pedestrian is at an intersection out of sight from the vehicle), the pedestrian device enables the pedestrian to virtually see the vehicle A seventh aspect of the present invention is the pedestrian device of the first aspect, wherein the communication device is a roadside device installed on or around a road; wherein the target object is an advertisement object; wherein, when determining that the pedestrian sees the advertisement object, the roadside device transmits advertisement object information on the advertisement object to the pedestrian device; and wherein, when receiving the advertisement object information transmitted from the roadside device, the controller performs control so as to present the advertisement object information to the pedestrian.

In this configuration, the pedestrian device guides a pedestrian to look in the look in the direction toward an advertisement object, and in response of the pedestrian's recognition, presents advertisement object information to the pedestrian. As a result, the pedestrian device can present the advertisement object information to pedestrians who express some interest in the advertisement object, thereby improving the advertising effectiveness.

An eighth aspect of the present invention is the pedestrian device of the first aspect, wherein the communication device is an in-vehicle device which is mounted in an advertisement vehicle used as an advertisement object; wherein, when determining that the pedestrian sees the advertisement vehicle, the in-vehicle device transmits advertisement vehicle information on the advertisement vehicle to the pedestrian device; and wherein, when receiving the advertisement vehicle information transmitted from the in-vehicle device, the controller performs control so as to present the advertisement vehicle information to the pedestrian.

In this configuration, the pedestrian device guides a pedestrian to look in the look in the direction toward an advertisement vehicle, and in response of the pedestrian's recognition, presents advertisement vehicle information to the pedestrian. As a result, the pedestrian device can present the advertisement vehicle information to pedestrians who express some interest in the advertisement vehicle, thereby improving the advertising effectiveness.

A ninth aspect of the present invention is the pedestrian device of the seventh or eighth aspect, further comprising a short-range communication transceiver configured to perform short-range communications with a wearable device, wherein the wearable device is configured to be worn on the pedestrian's body and detect the sight status of the pedestrian; and wherein the controller is configured to acquire the sight status of the pedestrian from the wearable device.

In this configuration, since the wearable device is used to detect the pedestrian's sight status, the pedestrian device can acquire more accurate sight status information.

A tenth aspect of the present invention is the pedestrian device of the ninth aspect, wherein the wearable device includes a vibrator, a speaker, and a display; and wherein the controller is configured to control at least one selected from the group consisting of the vibrator, the speaker, and the display of the wearable device so as to guide the pedestrian to look in the direction toward the vehicle.

In this configuration, the pedestrian device can more properly guide a pedestrian to look in the direction toward an advertisement object.

An eleventh aspect of the present invention is a communication device installed near a target object to be paid attention, the target object being located on or around a road, and configured to deliver target object information on the target object, the communication device comprising: a communication transceiver configured to communicate with a pedestrian device; and a controller, wherein, when the communication transceiver receives position data of a pedestrian transmitted from the pedestrian device, the controller determines whether or not the pedestrian approaches to within a predetermined distance from the target object based on the position data of the pedestrian; wherein, when determining that the pedestrian approaches to within the predetermined distance from the target object, the controller causes the communication transceiver to transmit guidance direction information to the pedestrian device, such that the pedestrian device uses the guidance direction information to guide the pedestrian to look in the direction toward the target object; and wherein, when the communication transceiver receives sight status information on the sight status of the pedestrian, the controller determines, based on the sight status information, whether or not the pedestrian sees the target object, and then, based on the determination result, the controller transmits target object information to the pedestrian device.

In this configuration, information associated with a target object located on or around a road can be presented to a pedestrian at an appropriate time and such that the information includes appropriate information for the pedestrian's status, in the same manner as the first aspect.

A twelfth aspect of the present invention is the communication device of the eleventh aspect, wherein the communication device is an in-vehicle device mounted in a vehicle; wherein the target object is the vehicle, in which the in-vehicle device is mounted; and wherein, when determining that the pedestrian does not see the vehicle, the controller causes the communication transceiver to transmit alert information to the pedestrian device, the alert information providing an alert to the pedestrian.

In this configuration, an alert can be provided to a pedestrian at an appropriate time, thereby properly supporting the pedestrian's safety confirmation, in the same manner as the second aspect.

A thirteenth aspect of the present invention is the communication device of the twelfth aspect, wherein, when the pedestrian sees the vehicle, the controller does not cause the communication transceiver to transmit the alert information.

In this configuration, when a pedestrian sees a vehicle; that is, the pedestrian is assumed to recognize the vehicle, no alert is provided to the pedestrian. This prevents an unnecessary alert from being provided to the pedestrian and causing annoyance to the pedestrian.

A fourteenth aspect of the present invention is the communication device of the twelfth aspect, wherein the pedestrian device transmits a head orientation of the pedestrian and a viewer-to-target distance from a viewpoint of the pedestrian to the target object, as the sight status information, to the communication device; and wherein the controller determines whether or not the pedestrian sees the vehicle based on the head orientation, the viewer-to-target distance, and a body size of the vehicle.

In this configuration, whether or not a pedestrian sees a vehicle can be determined more accurately.

A fifteenth aspect of the present invention is the communication device of the twelfth aspect, wherein the controller transmits a virtual vehicle image of the vehicle together with the guidance direction information to the pedestrian device, where the pedestrian device causes the wearable device to display the virtual vehicle image.

In this configuration, even when a vehicle is out of sight from a pedestrian (e.g., when the pedestrian is at an intersection out of sight from the vehicle), a pedestrian is enabled to virtually see the vehicle.

A sixteenth aspect of the present invention is the communication device of the eleventh aspect, wherein communication device is a roadside device installed on or around a road; wherein the target object is an advertisement object; and wherein, when determining that the pedestrian sees the advertisement object, the controller causes the communication transceiver to transmit advertisement object information on the advertisement object to the pedestrian device.

In this configuration, the advertisement object information can be presented to pedestrians who express some interest in the advertisement object, thereby improving the advertising effectiveness, in the same manner as the seventh aspect.

A seventeenth aspect of the present invention is the communication device of the eleventh aspect, wherein the communication device is an in-vehicle device which is mounted in an advertisement vehicle used as advertisement as an advertisement object; wherein the target object is the advertisement vehicle; and wherein, when determining that the pedestrian sees the advertisement object, the controller causes the communication transceiver to transmit advertisement vehicle information on the advertisement vehicle to the pedestrian device.

In this configuration, the advertisement vehicle information can be presented to pedestrians who express some interest in the advertisement vehicle, thereby improving the advertising effectiveness, in the same manner as the eighth aspect.

An eighteenth aspect of the present invention is an information distribution method by which a communication device installed near a target object to be paid attention, which target object is located on or around a road, delivers target object information on the target object to a pedestrian device, wherein the pedestrian device transmits the position data of a pedestrian to the communication device; wherein the communication device determines whether or not the pedestrian approaches to within a predetermined distance from the target object based on the position data of the pedestrian; wherein, when determining that the pedestrian approaches to within the predetermined distance from the target object, the communication device transmits guidance direction information to the pedestrian device, wherein the guidance direction information is to be used to guide the pedestrian to look in the direction toward the target object; wherein, when receiving the guidance direction information, the pedestrian device performs control based on the guidance direction information so as to guide the pedestrian to look in the direction toward the target object, and acquires sight status information on the sight status of the pedestrian, and transmits the sight status information to the communication device; wherein, when receiving the sight status information, the communication device determines, based on the sight status information, whether or not the pedestrian sees the target object, and then, based on the determination result, transmits target object information on the target object to the pedestrian device; and wherein, when receiving the target object information, the pedestrian device performs control so as to present the target object information to the pedestrian.

In this configuration, information associated with a target object located on or around a road can be presented to a pedestrian at an appropriate time and such that the information includes appropriate information for the pedestrian's status, in the same manner as the first aspect.

Embodiments of the present invention will be described below with reference to the drawings.

First Embodiment

FIG. 1 is a diagram showing a general configuration of a safety confirmation support system according to a first embodiment of the present invention.

The safety confirmation support system (pedestrian-to-vehicle communication system) supports pedestrians' safety confirmation. The system includes a pedestrian terminal 1 (pedestrian device), a wearable terminal 2 (wearable device), an in-vehicle terminal 3 (communication device, in-vehicle device), and a car navigation device 4. The pedestrian terminal 1 and the in-vehicle terminal 3 perform ITS communications (pedestrian-to-vehicle communications) with each other.

ITS communications (roadside-to-pedestrian communications) are performed using frequency bands adopted by ITS-based (i.e., using Intelligent Transport System) safe driving assistance wireless systems (for example, 700 MHz band or 5.8 GHz band).

The pedestrian terminal 1 is configured to be carried by a pedestrian. The pedestrian terminal 1 transmits and receives messages including position data to and from an in-vehicle terminal 3 through ITS communications (pedestrian-to-vehicle communication), and determines if there is a risk of collision between the pedestrian and a vehicle (a target object to be paid attention).

The wearable terminal 2 is configured to be worn by a pedestrian. The wearable terminal 2 is connected to the pedestrian terminal 1, and when there is a risk of collision, the wearable terminal 2 provides, based on the control of the pedestrian terminal 1, an alert to the pedestrian by using vibration, voice, or image display.

The in-vehicle terminal 3 is configured to be mounted in a vehicle. The in-vehicle terminal 3 transmits and receives messages including position data to and from the pedestrian terminal 1 through ITS communications (pedestrian-to-vehicle communication), and determines if there is a risk of collision between the pedestrian and the vehicle.

The car navigation device 4 is mounted in a vehicle and provides route instructions to the driver. The car navigation device 4 is connected to the in-vehicle terminal 3, and when there is a risk of collision, the car navigation device 4 provides, based on the control of the in-vehicle terminal 3, an alert to the pedestrian by using voice, or image display.

Figure 2:
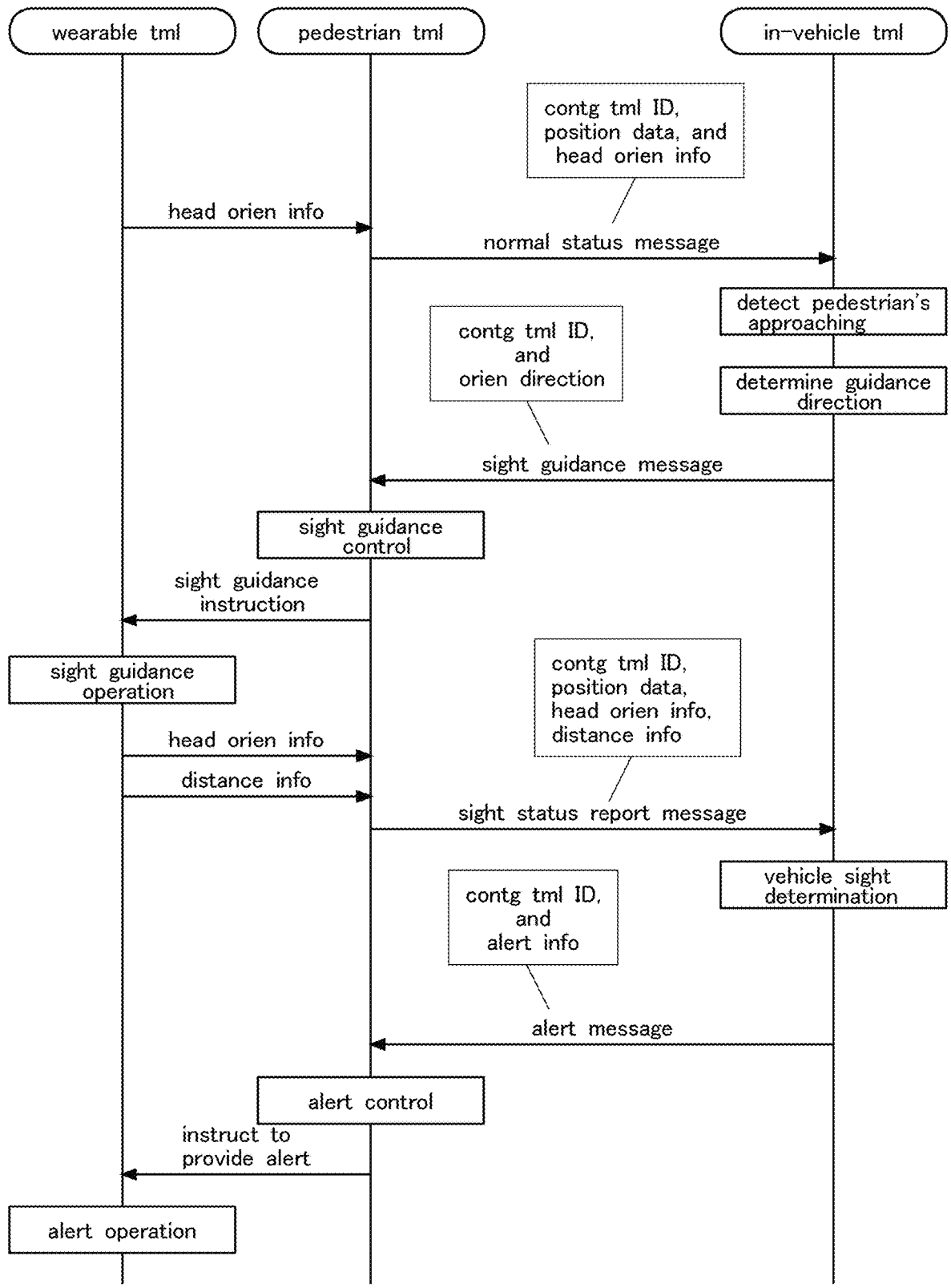
FIG. 2 is a sequence diagram showing an outline of an operation procedure of the safety confirmation support system according to the first embodiment.

Next, an outline of an operation procedure of the safety confirmation support system according to the first embodiment will be described. FIG. 2 is a sequence diagram showing an outline of the operation procedure of the safety confirmation support system.

In the present embodiment, when a pedestrian approaches a vehicle, the system guides the pedestrian to look in the direction toward the vehicle, and when the pedestrian still does not see the vehicle accordingly, the system provides an alert to the pedestrian.

The wearable terminal 2, which is worn on the head of a pedestrian, measures the head orientation (face orientation) of the pedestrian, and transmits a measurement result, i.e., head orientation information to the pedestrian terminal 1. The wearable terminal 2 measures the distance (viewer-to-target distance) from a viewpoint of the pedestrian to the object which the pedestrian sees (target object), and transmits a measurement result, i.e., viewer-to-target distance information, to the pedestrian terminal 1.

The wearable terminal 2 may be configured to measure head orientations and viewer-to-target distances, and transmit the measurement records at regular intervals. In some cases, the wearable terminal 2 may be configured to measure head orientations and viewer-to-target distances, and transmit the measurement records in response to a request from the pedestrian terminal 1. In the case of measuring in response a request from the pedestrian terminal 1, the wearable terminal 2 may be configured to continuously perform measurements until a predetermined time elapses after receiving the request.

The pedestrian terminal 1 first transmits a normal status message to the in-vehicle terminal 3 through pedestrian-to-vehicle communications. Such a normal status message includes the terminal ID and position data (latitude, longitude) of the pedestrian terminal, and the pedestrian's head orientation data acquired by the wearable terminal 2.

When receiving a normal status message from the pedestrian terminal 1 through pedestrian-to-vehicle communications, the in-vehicle terminal 3 determines whether or not the pedestrian has approached to within a predetermined distance (e.g., 10 m) from the vehicle (pedestrian's approaching detection) based on the position data of the pedestrian included in the message and that of the vehicle measured by the in-vehicle terminal. When the in-vehicle terminal 3 determines that the pedestrian has approached to within the predetermined distance from the vehicle, the in-vehicle terminal 3 determines the direction (guidance direction) in which the pedestrian can see the vehicle (guidance direction determination) based on the pedestrian's position data, the vehicle's position data, and the pedestrian's head orientation data included in the received message.

Next, the in-vehicle terminal 3 transmits a sight guidance message to the pedestrian terminal 1 through pedestrian-to-vehicle communications. The sight guidance message includes the terminal ID of the pedestrian terminal 1 to be notified, and a result of the guidance direction determination, i.e., guidance direction information.

Upon receiving the sight guidance message transmitted from the in-vehicle terminal 3 through pedestrian-to-vehicle communications, the pedestrian terminal 1 controls the wearable terminal 2 based on the guidance direction information included in the message so that the wearable terminal 2 performs a sight guidance operation to guide the pedestrian to look in the direction toward the vehicle. In the present embodiment, the wearable terminal 2 notifies the pedestrian of the direction toward the vehicle by the sight guidance operation, such as one using voice, vibration, or image display.

Next, the pedestrian terminal 1 transmits a sight status report message to the in-vehicle terminal 3 through pedestrian-to-vehicle communications. The sight status report message includes the terminal ID and position data of the pedestrian terminal 1 and sight status information (the pedestrian's head orientation data and the viewer-to-target distance) acquired by the wearable terminal 2.

When receiving the sight status report message from the pedestrian terminal 1 through pedestrian-to-vehicle communications, the in-vehicle terminal 3 determines whether or not the pedestrian sees the vehicle (vehicle sight determination) based on the position data of the pedestrian terminal 1, the pedestrian's head orientation and the viewer-to-target distance included in the message, and the position data of the in-vehicle terminal 3.

Next, when the pedestrian does not see the vehicle, the in-vehicle terminal 3 transmits an alert message to the pedestrian terminal 1 through pedestrian-to-vehicle communications. The alert message includes the terminal ID of the pedestrian terminal 1 to be notified and alert information for urging the pedestrian to pay attention to the vehicle. When the pedestrian sees the vehicle, the in-vehicle terminal 3 transmits no alert message.

When receiving an alert message from the in-vehicle terminal 3 through pedestrian-to-vehicle communications, the pedestrian terminal 1 controls the wearable terminal 2 based on the alert information included in the message so that the wearable terminal 2 performs an alert operation to urge the pedestrian to pay attention to the vehicle. In the present embodiment, the pedestrian terminal 1 causes the wearable terminal 2 to perform an alert operation by using vibration, voice, or image display.

Although, in the present embodiment, the system is configured such that the wearable terminal 2 performs an alert operation to the pedestrian, the system may be configured such that the pedestrian terminal 1 or a mobile terminal device (not shown) such as smartphone carried by the pedestrian performs an alert operation.

Although, in the present embodiment, the system is configured such that the in-vehicle terminal 3 performs guidance direction determination, the system may be configured such that the pedestrian terminal 1 performs guidance direction determination. In this case, when detecting that the pedestrian has approached to the vehicle, the in-vehicle terminal 3 transmits a sight guidance instruction message to the pedestrian terminal 1, and the pedestrian terminal 1, upon receiving the sight guidance instruction message from the in-vehicle terminal 3, performs guidance direction determination, and controls the wearable terminal 2 based on the determination result so that the wearable terminal 2 performs a sight guidance operation accordingly. In this case, as the vehicle's position data is necessary for the guidance direction determination, the in-vehicle terminal 3 may be configured to add the vehicle's position data to the sight guidance instruction message and transmits it to the pedestrian terminal 1.

Figure 3:
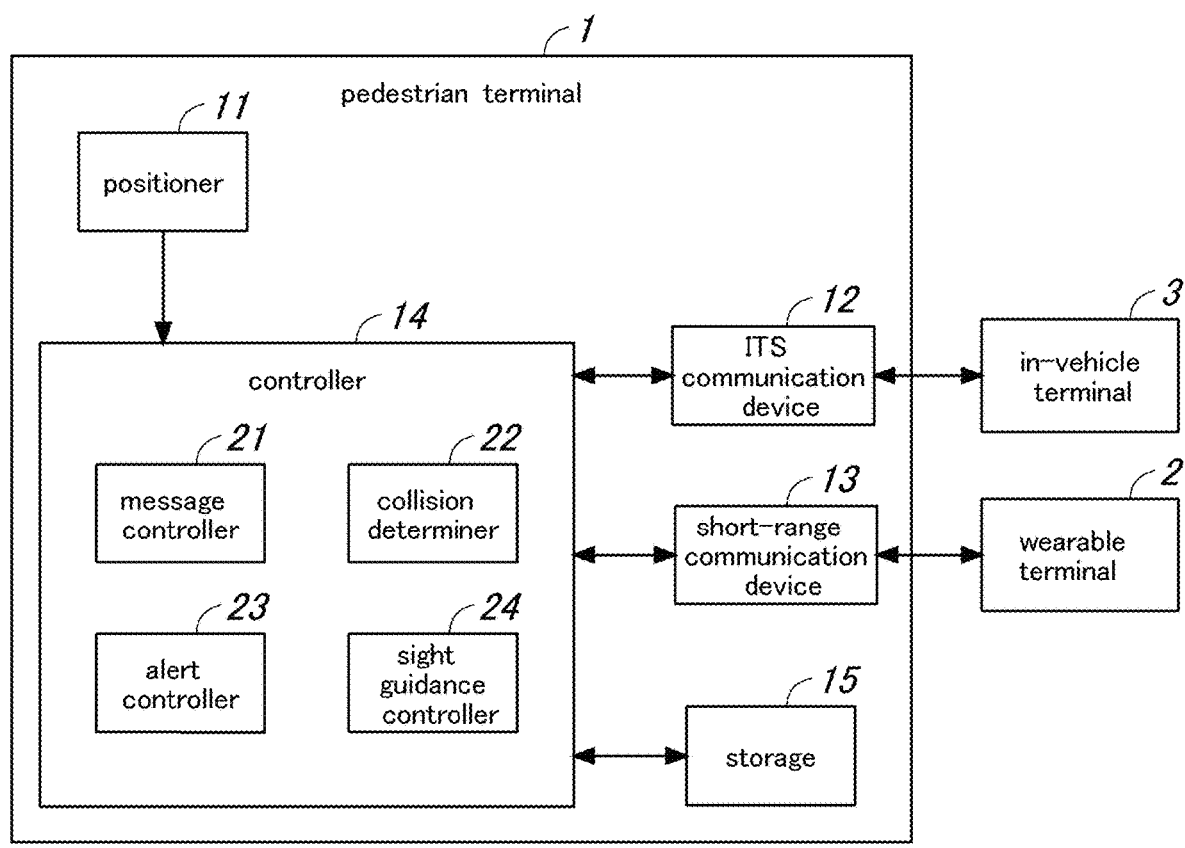
FIG. 3 is a block diagram showing a schematic configuration of a pedestrian terminal 1 according to the first embodiment.

Next, a schematic configuration of a pedestrian terminal 1 according to the first embodiment will be described. FIG. 3 is a block diagram showing a schematic configuration of a pedestrian terminal 1.

The pedestrian terminal 1 includes a positioner 11, an ITS communication device 12 (communication transceiver), a short-range communication device 13, a controller 14, and a storage 15.

The positioner 11 measures the position of the pedestrian terminal by using a satellite positioning system such as GPS (Global Positioning System) or QZSS (Quasi-Zenith Satellite System), to thereby acquire the position data (latitude, longitude) of the pedestrian terminal 1.

The ITS communication device 12 transmits and receives messages to and from the in-vehicle terminal 3 through ITS communications (pedestrian-to-vehicle communications).

The short-range communication device 13 performs short-range communications, such as communications using Bluetooth (registered trademark), with the wearable terminal 2.

The storage 15 stores the terminal ID of the pedestrian terminal, programs executable by a processor which implements the controller 14, and other information.

The controller 14 includes a message controller 21, a collision determiner 22, an alert controller 23, and a sight guidance controller 24. The controller 14 is configured by the processor, and each unit of the controller 14 is implemented by the processor executing a program stored in the storage 15.

The message controller 21 controls the transmission of a message to the in-vehicle terminal 3.

The collision determiner 22 determines if there is a risk of collision between the vehicle and the pedestrian based on the position data of the pedestrian acquired by the positioner 11 and that of the vehicle included in a message received from the in-vehicle terminal 3.

The alert controller 23 controls the wearable terminal 2 so as to perform a predetermined alert operation to the pedestrian. In the present embodiment, when the collision determiner 22 determines that there is a risk of collision or when the ITS communication device 12 receives an alert message from the in-vehicle terminal 3, the pedestrian terminal 1 causes a wearable terminal 2 to perform an alert operation. However, in other embodiments, the pedestrian terminal 1 may perform an alert operation when it receives an alert message and there is a risk of collision. As a result, this configuration can avoid performing unnecessary alert operations.

The sight guidance controller 24 controls the wearable terminal 2 so as to perform a sight guidance operation to guide the pedestrian so as to look in the direction toward the vehicle, based on sight guidance information received from the in-vehicle terminal 3.

Figure 4:
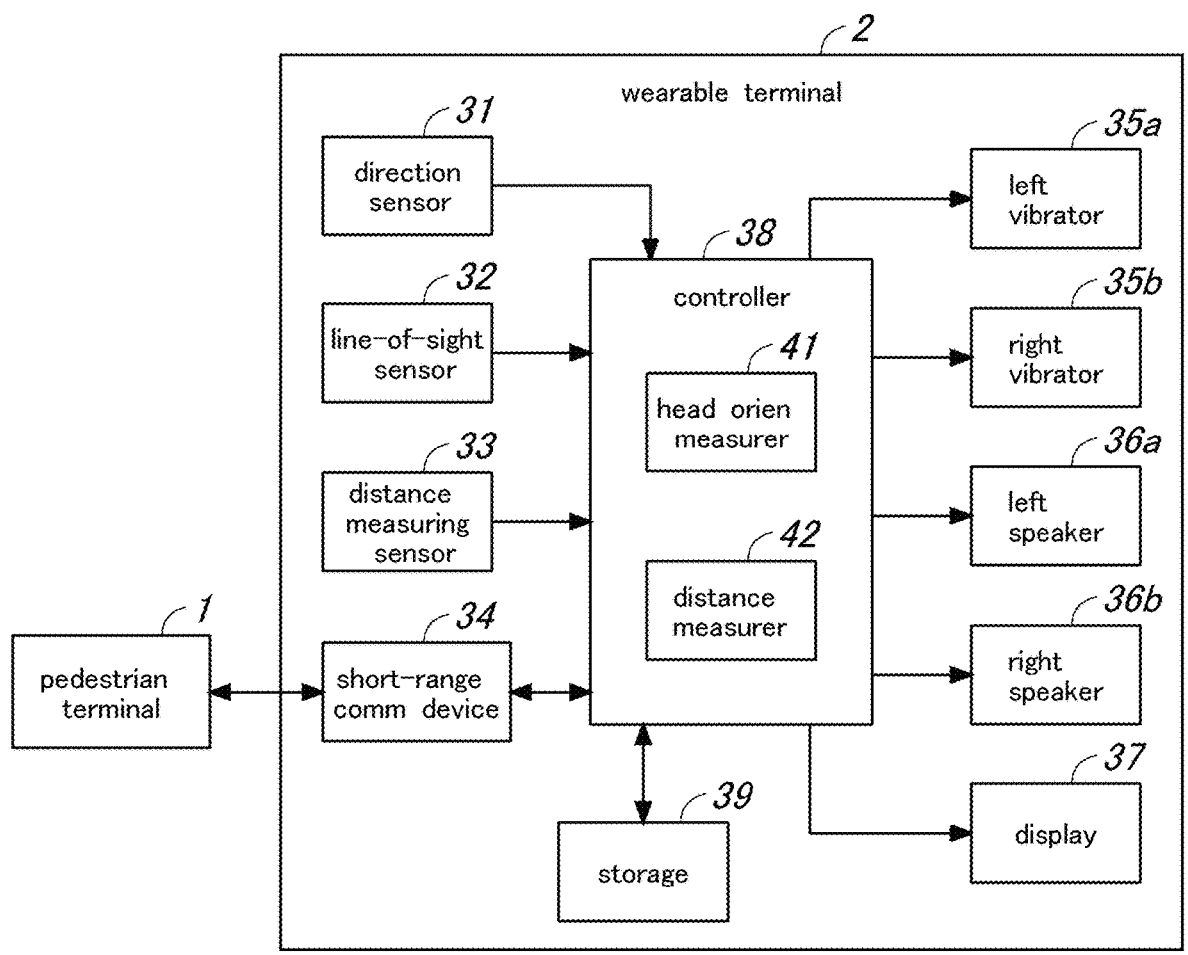
FIG. 4 is a block diagram showing a schematic configuration of a wearable terminal 2 according to the first embodiment.

Next, a schematic configuration of a wearable terminal 2 according to the first embodiment will be described. FIG. 4 is a block diagram showing a schematic configuration of the wearable terminal 2.

The wearable terminal 2 includes a direction sensor 31, a line-of-sight sensor 32, a distance measuring sensor 33, a short-range communication device 34, left and right vibrators 35*a* and 35*b*, left and right speakers 36*a* and 36*b*, a display 37, a controller 38, and a storage 39.

The direction sensor 31 detects the geomagnetic direction. From a detection result of the direction sensor 31, the wearable terminal 2 can acquire the head orientation (face orientation) of the pedestrian who wears the wearable terminal 2.

The line-of-sight sensor 32 detects the line of sight of a pedestrian. From a detection result of the line-of-sight sensor 32, the wearable terminal 2 can acquire the coordinates of the viewer's viewpoint within the line-of-sight detection area defined in the XY orthogonal coordinate system.

The distance measuring sensor 33 measures the distance to an opposite object. The distance measuring sensor 33 may adopt, for example, a PSD (Position Sensitive Detector) type configuration. In the PSD configuration, a light emitting element emits light, which is reflected by an object, a light receiving element detects the reflected light, and the distance measuring sensor 33 measures the distance to the object based on the angle of incidence of the reflected light, which changes with the distance to the object.

The short-range communication device 34 performs short-range communications, such as communications using Bluetooth (registered trademark), with the pedestrian terminal 1.

The vibrators 35*a* and 35*b*, the speakers 36*a* and 36*b*, and the display 37 perform, based on the control of the pedestrian terminal 1, a sight guidance operation to guide a pedestrian to look in the direction toward where the vehicle is present, and an alert operation to urge the pedestrian to pay attention to the approaching vehicle.

In the present embodiment, the display 37 is a transparent display through which an actual landscape can be seen. In other embodiments, the display may be a retinal projection type projector.

The storage 39 stores programs executable by the processor which implements the controller 38, and other information.

The controller 38 includes a head orientation measurer 41 and a distance measurer 42. The controller 38 is configured by the processor, and each unit of the controller 38 is implemented by the processor executing a program stored in the storage 39.

The head orientation measurer 41 measures the head orientation (face orientation) of a pedestrian based on a detection result of the direction sensor 31.

Based on respective detection results of the line-of-sight sensor 32 and the distance measuring sensor 33, the distance measurer 42 measures (determines) the distance (viewer-to-target distance) from a viewpoint of the pedestrian to an object (target object) which the pedestrian sees.

Figure 5:
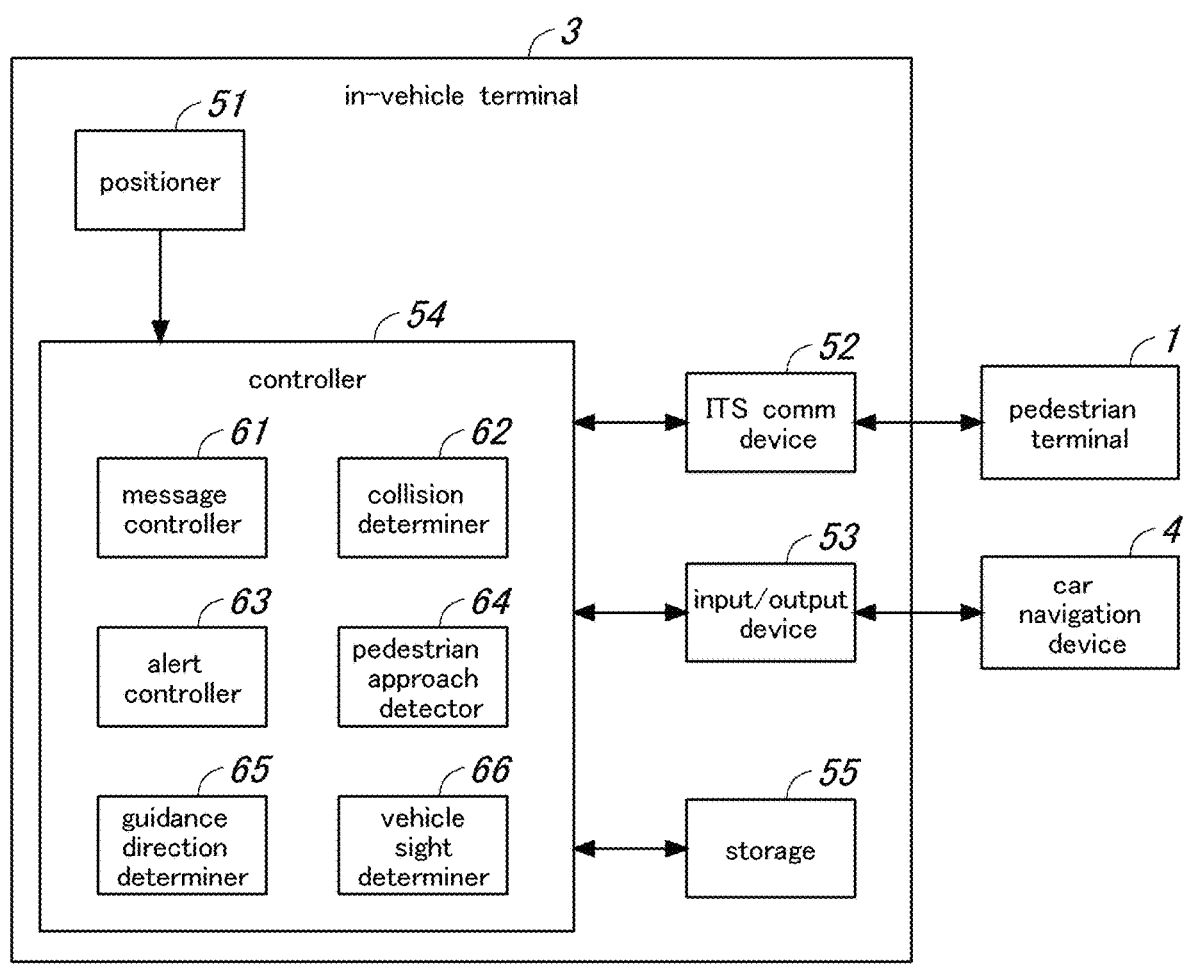
FIG. 5 is a block diagram showing a schematic configuration of an in-vehicle terminal 3 according to the first embodiment.

Next, a schematic configuration of an in-vehicle terminal 3 according to the first embodiment will be described. FIG. 5 is a block diagram showing a schematic configuration of the in-vehicle terminal 3.

The in-vehicle terminal 3 includes a positioner 51, an ITS communication device 52 (communication transceiver), an input/output device 53, a controller 54, and a storage 55.

The positioner 51 measures the position of the pedestrian terminal itself by using a satellite positioning system such as GPS or QZSS, to thereby acquire the pedestrian terminal device's position data (latitude, longitude).

The ITS communication device 52 transmits and receives messages to and from the pedestrian terminal 1 through ITS communications (pedestrian-to-vehicle communications).

The input/output device 53 receives and provides information from and to the car navigation device 4. Based on the information from the input/output device 53, the car navigation device 4 performs an alert operation to the driver.

The storage 55 stores programs executable by a processor which implements the controller 54, and other information.

The controller 54 includes a message controller 61, a collision determiner 62, an alert controller 63, a pedestrian approach detector 64, a guidance direction determiner 65, and a vehicle sight determiner 66. The controller 54 is configured by the processor, and each unit of the controller 54 is implemented by the processor executing a program stored in the storage 55.

The message controller 61 controls the transmission of a message to the pedestrian terminal 1.

The collision determiner 62 determines the position data of the vehicle acquired by the positioner 51 and whether or not there is a risk of the vehicle colliding with a pedestrian, based on the pedestrian's position data included in a message received from the pedestrian terminal 1.

The alert controller 63 controls the car navigation device 4 so as to perform a predetermined alert operation to the driver of the vehicle. In the present embodiment, when the collision determiner 22 determines that there is a risk of collision, the alert controller 63 causes the car navigation device 4 to perform an alert operation (such as one using voice or screen display).

The pedestrian approach detector 64 detects that a pedestrian has approached to within a predetermined distance from the vehicle, based on the position data of the pedestrian received from the pedestrian terminal 1 and that of the vehicle acquired by the positioner 51.

The guidance direction determiner 65 determines the direction (guidance direction) in which the pedestrian can see the vehicle, in order to guide the pedestrian so as to look in the direction toward the vehicle, based on the pedestrian's position data and the pedestrian's head orientation data, and the vehicle's position data. In the present embodiment, the guidance direction determiner 65 determines, as the guidance direction, the direction toward the vehicle viewed from the pedestrian; that is, to the right direction or the left direction from the pedestrian.

The vehicle sight determiner 66 determines whether or not a pedestrian sees the vehicle based on the pedestrian's position data received from the pedestrian terminal 1, the pedestrian's head orientation data and viewer-to-target distance information, the vehicle's position data acquired by the positioner 51, and the vehicle's body size data stored in the storage 55.

Figure 6:
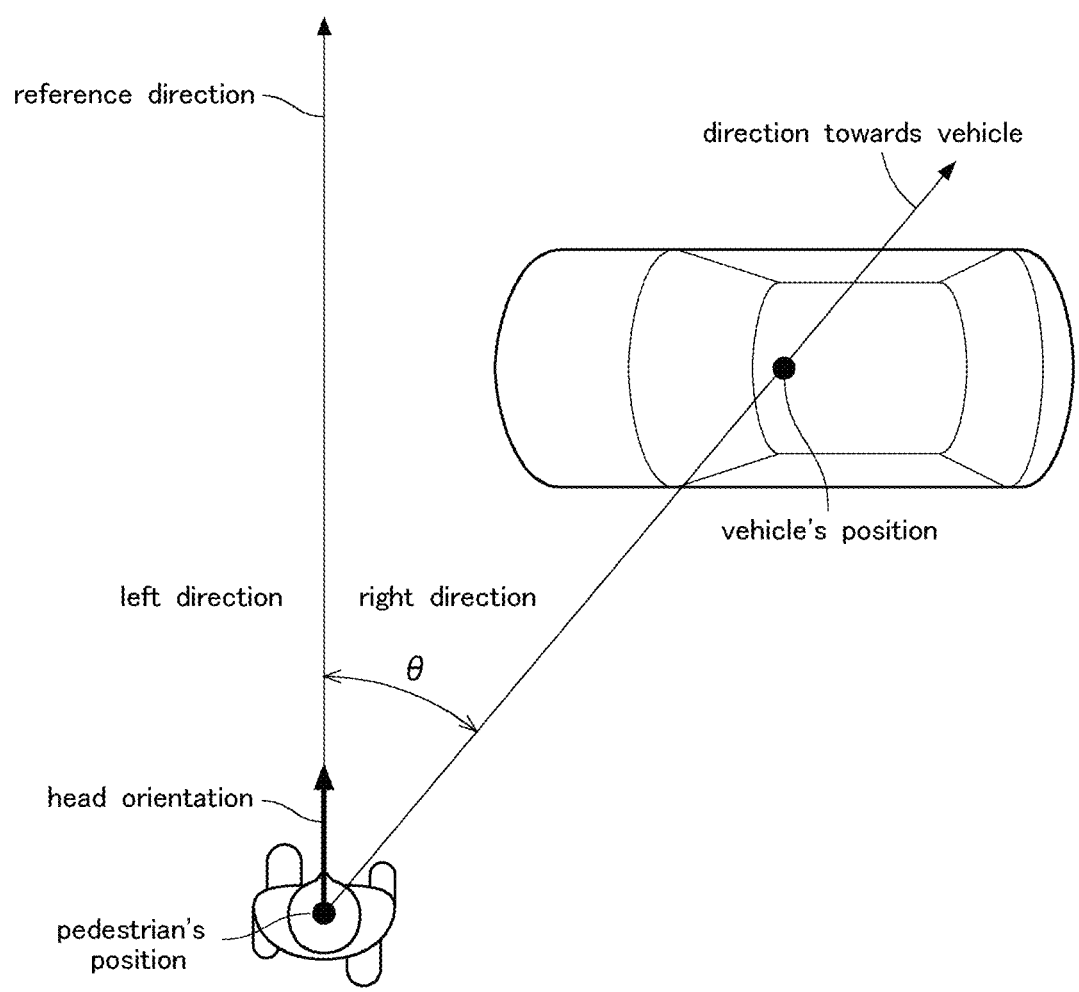
FIG. 6 is an explanatory diagram showing an outline of operations performed by a guidance direction determiner 65 according to the first embodiment.

Next, an outline of operations performed by the guidance direction determiner 65 according to the first embodiment will be described. FIG. 6 is an explanatory diagram showing an outline of the operations performed by the guidance direction determiner 65.

The guidance direction determiner 65 of the in-vehicle terminal 3 determines the direction (guidance direction) in which the pedestrian can see the vehicle, in order to guide the pedestrian so as to look in the direction toward the vehicle, based on the pedestrian's position data and the pedestrian's head orientation data, and the vehicle's position data. In the present embodiment, the guidance direction determiner 65 determines, as the guidance direction, the direction toward the vehicle viewed from the pedestrian; that is, to the right direction or the left direction from the pedestrian.

In this determination, the guidance direction determiner 65 acquires the direction toward the vehicle from the pedestrian based on the position data (latitude, longitude) of the pedestrian and that of the vehicle. Then, the guidance direction determiner 65 compares the pedestrian's head orientation (face direction); that is, the front direction of the pedestrian, with the direction toward the vehicle from the pedestrian, to thereby determine whether the vehicle is present to the right direction or left direction from the pedestrian.

Specifically, the guidance direction determiner 65 defines the pedestrian's head orientation as the reference direction and defines an angle from the reference direction in a clockwise direction as a positive angle. When the angle θ formed by the reference direction and the direction toward the vehicle is 0 to 180 degrees, the guidance direction determiner 65 determines the vehicle is present to the right direction from the pedestrian, whereas when that angle θ is 181 to 360 degrees, the guidance direction determiner 65 determines the vehicle is present to the left direction from the pedestrian.

In the present embodiment, the wearable terminal 2 which the pedestrian wears on the head is used to measure the head orientation of the pedestrian, and using the head orientation as the reference direction, the guidance direction determiner 65 determines the guidance direction. However, the moving direction of a pedestrian may be defined as the reference direction, which is used to determine the guidance direction. In this case, the moving direction may be acquired from the history of the pedestrian's position data.

In the present embodiment, the guidance direction determiner 65 determines, as the guidance direction, to which direction an object is present from the pedestrian, to the right direction or the left direction. However, the guidance direction may be determined as more subdivided guidance directions. For example, the guidance directions to be determined may be subdivided into four directions: front right direction, rear right direction, front left direction, and rear left direction. The subdivided guidance directions to be determined may further include front direction, right and left directions, and back direction.

Figure 7:
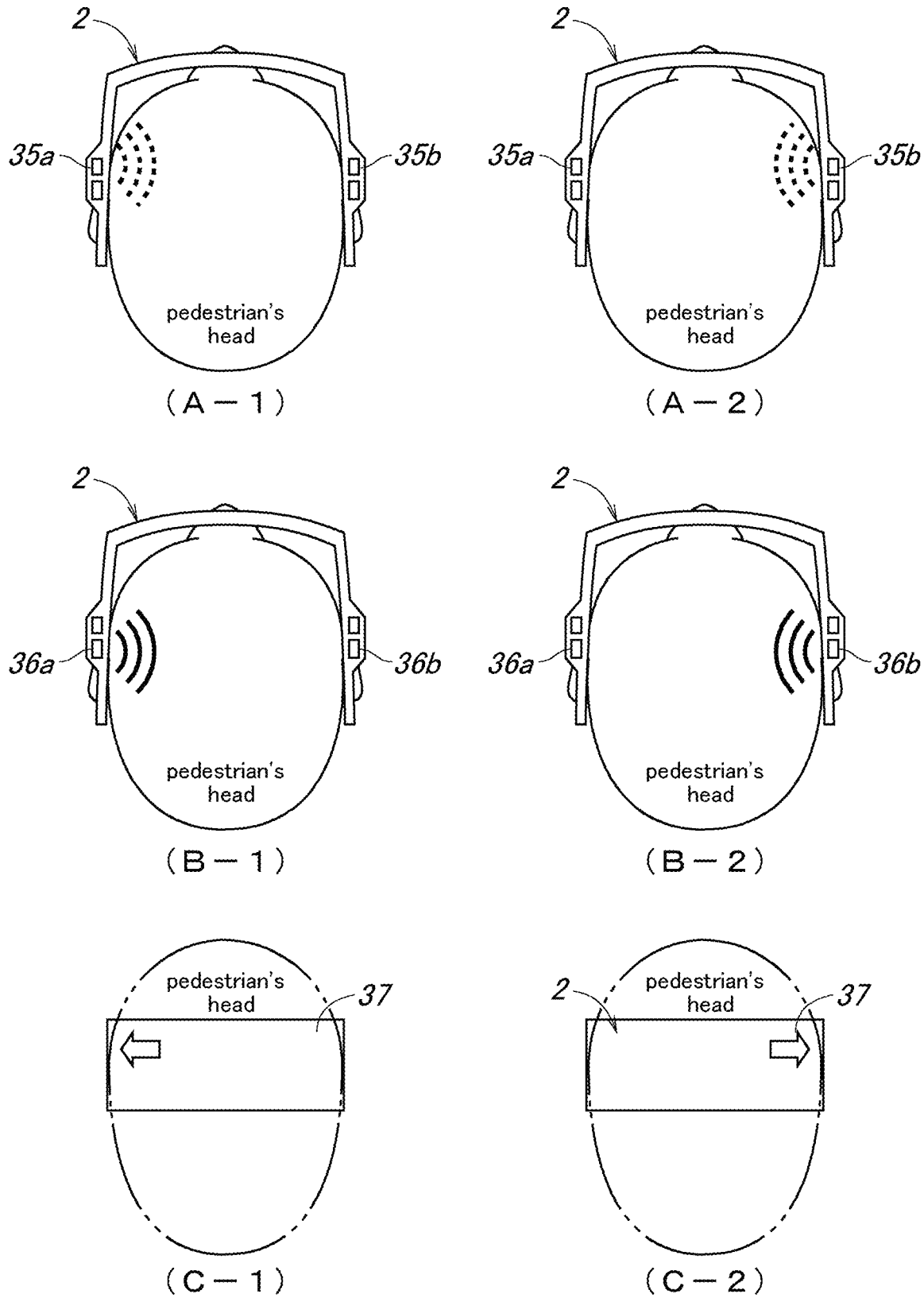
FIG. 7 is an explanatory diagram showing an outline of operations performed by a sight guidance controller 24 of the pedestrian terminal 1 according to the first embodiment.

Next, an outline of operations performed by the sight guidance controller 24 of the pedestrian terminal 1 according to the first embodiment. FIG. 7 is an explanatory diagram showing an outline of the operations performed by the sight guidance controller 24.

The sight guidance controller 24 of the pedestrian terminal 1 controls a sight guidance operation for a pedestrian based on sight guidance information received from the in-vehicle terminal 3. The sight guidance information includes information on the direction toward the vehicle as viewed from a pedestrian, that is, from which direction the vehicle approaches to the pedestrian, from the left direction or the right direction. Based on the sight guidance information, the sight guidance controller 24 causes the wearable terminal 2 to perform a sight guidance operation, urging the pedestrian to look in either the left or right direction.

In the present embodiment, as a sight guidance operation, the wearable terminal 2 may cause either the left or right vibrator 35a or 35b to operate as shown in FIGS. 7A-1 and 7A-2. Specifically, when the vehicle approaches from the left direction, the wearable terminal 2 causes the left vibrator 35a to operate, encouraging the pedestrian to look in the left direction. When the vehicle approaches from the right direction, the wearable terminal 2 causes the right vibrator 35b to operate, encouraging the pedestrian to look in the right direction.

In the present embodiment, as a sight guidance operation, the wearable terminal 2 may cause either the left or right speaker 36a or 36b to output a notification sound as shown in FIGS. 7B-1 and 7B-2. Specifically, when the vehicle approaches from the left direction, the wearable terminal 2 causes the left speaker 36a to output a notification sound (sound effect), encouraging the pedestrian to look in the left direction. When the vehicle approaches from the right direction, the wearable terminal 2 causes the right speaker 36b to output the notification sound, encouraging the pedestrian to look in the right direction.

In the present embodiment, as a sight guidance operation, the wearable terminal 2 may display either a leftward arrow or a rightward arrow on the display 37 of the wearable terminal 2 as shown in FIGS. 7C-1 and 7C-2. Specifically, when the vehicle approaches from the left direction, the wearable terminal 2 displays the leftward arrow of the display 37, encouraging the pedestrian to look in the left direction. When the vehicle approaches from the right direction, the wearable terminal 2 displays the rightward arrow on the display 37, encouraging the pedestrian to look in the right direction. The display 37 is a transparent display through which the pedestrian can view an actual landscape, and the image of the arrow is overlay-displayed (superimposed) on the actual landscape.

Although in the present embodiment, the wearable terminal 2 is configured to cause either the speaker 36a or 36b to output the notification sound (sound effect), the wearable terminal 2 may be configured to cause either the speaker 36a or 36b to output human speech sound such as "a vehicle is approaching from the right direction."

In the present embodiment, in addition to such sight guidance operations, the wearable terminal 2 performs alert operations. The alert operations may include causing the vibrator 35*a* or 35*b* to operate, causing the speaker 36*a* or 36*b* to output human speech sound such as "a vehicle is approaching, be attentive", or displaying an alert image on the display 37.

Figure 8:
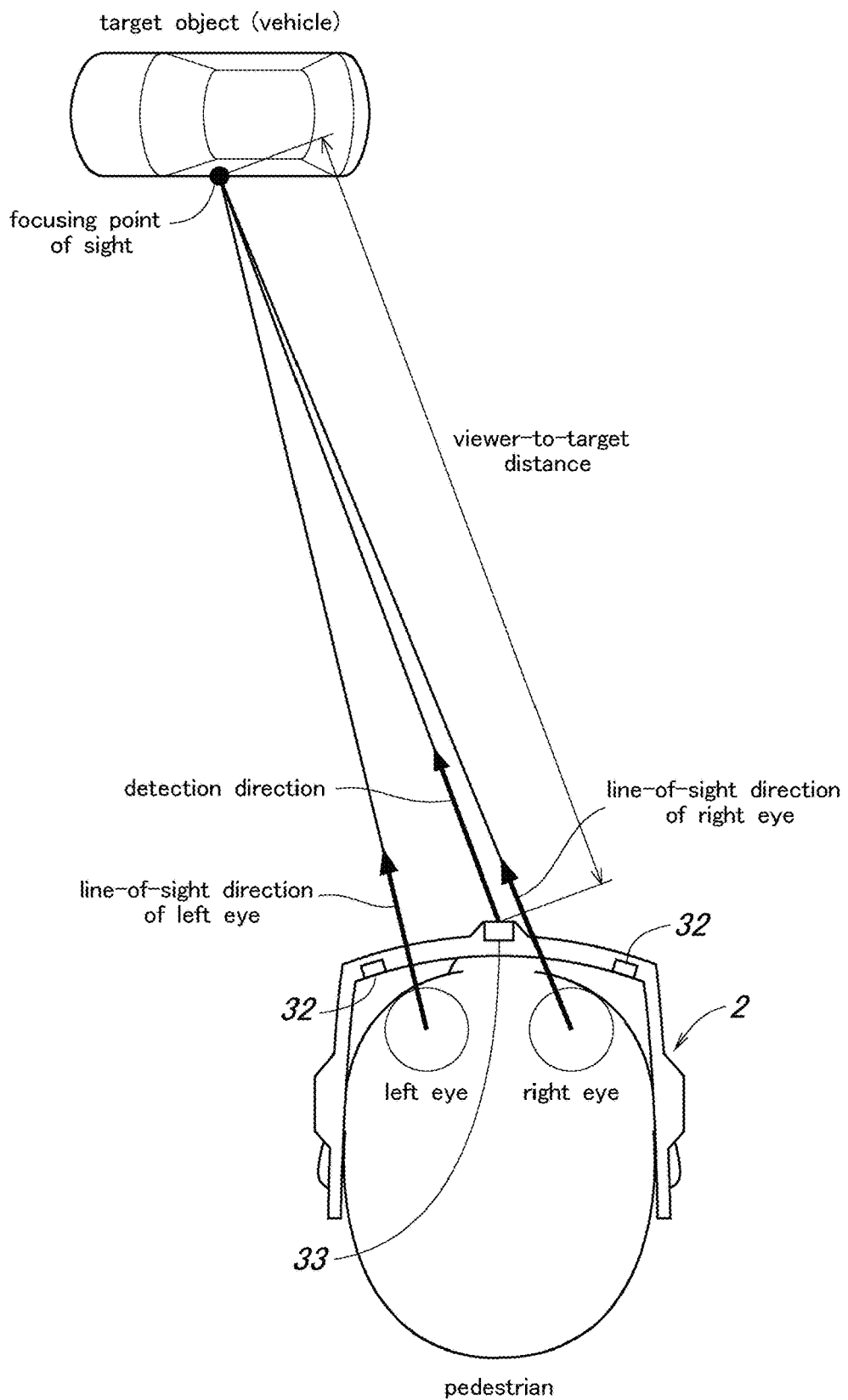
FIG. 8 is an explanatory diagram showing an outline of operations performed by a distance measurer 42 of the wearable terminal 2 according to the first embodiment.

Next, n outline of operations performed by the distance measurer 42 of the wearable terminal 2 according to the first embodiment will be described. FIG. 8 is an explanatory diagram showing an outline of the operations performed by the distance measurer 42.

The distance measurer 42 of the wearable terminal 2 measures the distance (viewer-to-target distance) from a viewpoint of the pedestrian to the object (target object) which the pedestrian sees, based on detection results of the line-of-sight sensor 32 and the distance measuring sensor 33.

In the present embodiment, the distance measuring sensor 33, whose detection direction is adjustable, is used such that, after the detection direction is adjusted so as to be in line with the line-of-sight direction of the pedestrian, based on the detection result of the line-of-sight sensor 32, the distance measuring sensor 33 detects the distance to the opposite object to thereby measure the distance (viewer-to-target distance) to the object (vehicle) which the pedestrian sees.

Since the directions of the line-of-sight (directions of sight from the respective eyeballs) differs between the right eye and the left eye, the wearable terminal 2 may configured such that, after acquiring a focusing point of sight at which the lines of sight of the right and left eyes interest, the detection direction of the distance measuring sensor 33 is adjusted toward the focusing point of sight.

In the present embodiment, the wearable terminal 2 measures the viewer-to-target distance by pointing the distance measuring sensor 33 in the line-of-sight direction of the pedestrian based on the detection result of the line-of-sight sensor 32. However, the wearable terminal 2 may be configured to measure the viewer-to-target distance to the object based only on the detection result of the line-of-sight sensor 32 without using the distance measuring sensor 33. In this case, the wearable terminal 2 first acquires a focusing point of sight at which the lines of sight of the right and left eyes interest, and then measures the distance between the focusing point of sight and the position of the pedestrian as a viewer-to-target distance.

Figure 9:
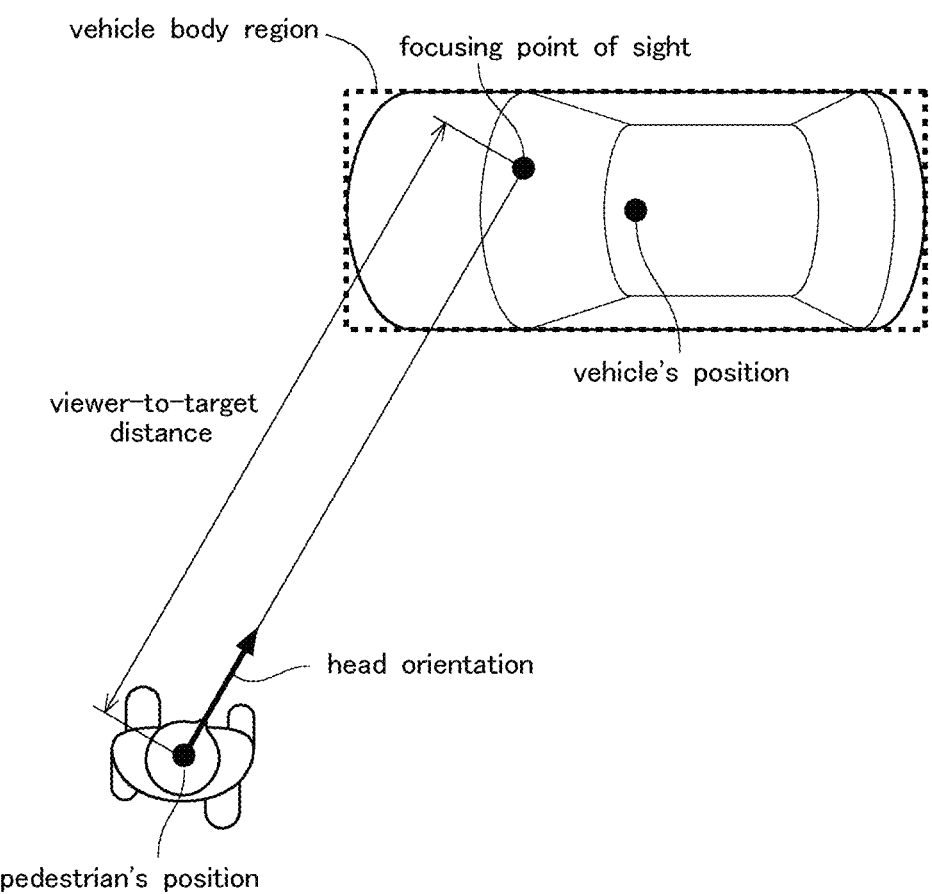
FIG. 9 is an explanatory diagram showing an outline of operations performed by a vehicle sight determiner 66 of the in-vehicle terminal 3 according to the first embodiment.

Next, an outline of operations performed by the vehicle sight determiner 66 of the in-vehicle terminal 3 according to the first embodiment will be described. FIG. 9 is an explanatory diagram showing an outline of the operations performed by the vehicle sight determiner 66 of the in-vehicle terminal 3.

The vehicle sight determiner 66 of the in-vehicle terminal 3 determines whether or not the pedestrian sees the vehicle based on the pedestrian's position data received from the pedestrian terminal 1, the pedestrian's head orientation data, the viewer-to-target distance information, the vehicle's position data acquired by the positioner 51, and the vehicle's body size data stored in the storage 55.

The vehicle sight determiner 66 first defines a vehicle body region (a footprint region in which the vehicle body extends) of the vehicle based on the position data and the vehicle body size data of the vehicle. The vehicle body region is defined by the coordinates (latitude, longitude) of the four points (front right, front left, rear right, and rear left points) of the vehicle body. The position data of the vehicle includes coordinates (latitude, longitude) of the focusing point of the vehicle body, and the vehicle sight determiner 66 can determine the vehicle body region from the coordinates of the focusing point and the vehicle body size.

The vehicle sight determiner 66 determines the coordinates (latitude, longitude) of the point (focusing point of sight) which the pedestrian is seeing based on the pedestrian's position data, the pedestrian's head orientation data, and the viewer-to-target distance information. Then, the vehicle sight determiner 66 compares the pedestrian's focusing point of sight with the vehicle body region, and when the pedestrian's focusing point of sight is included in the vehicle body region, the vehicle sight determiner 66 determines that the pedestrian sees the vehicle. The vehicle sight determiner 66 may determine the focusing point of sight in consideration of the line-of-sight direction in combination with the pedestrian's head orientation (face orientation).

Figure 10:
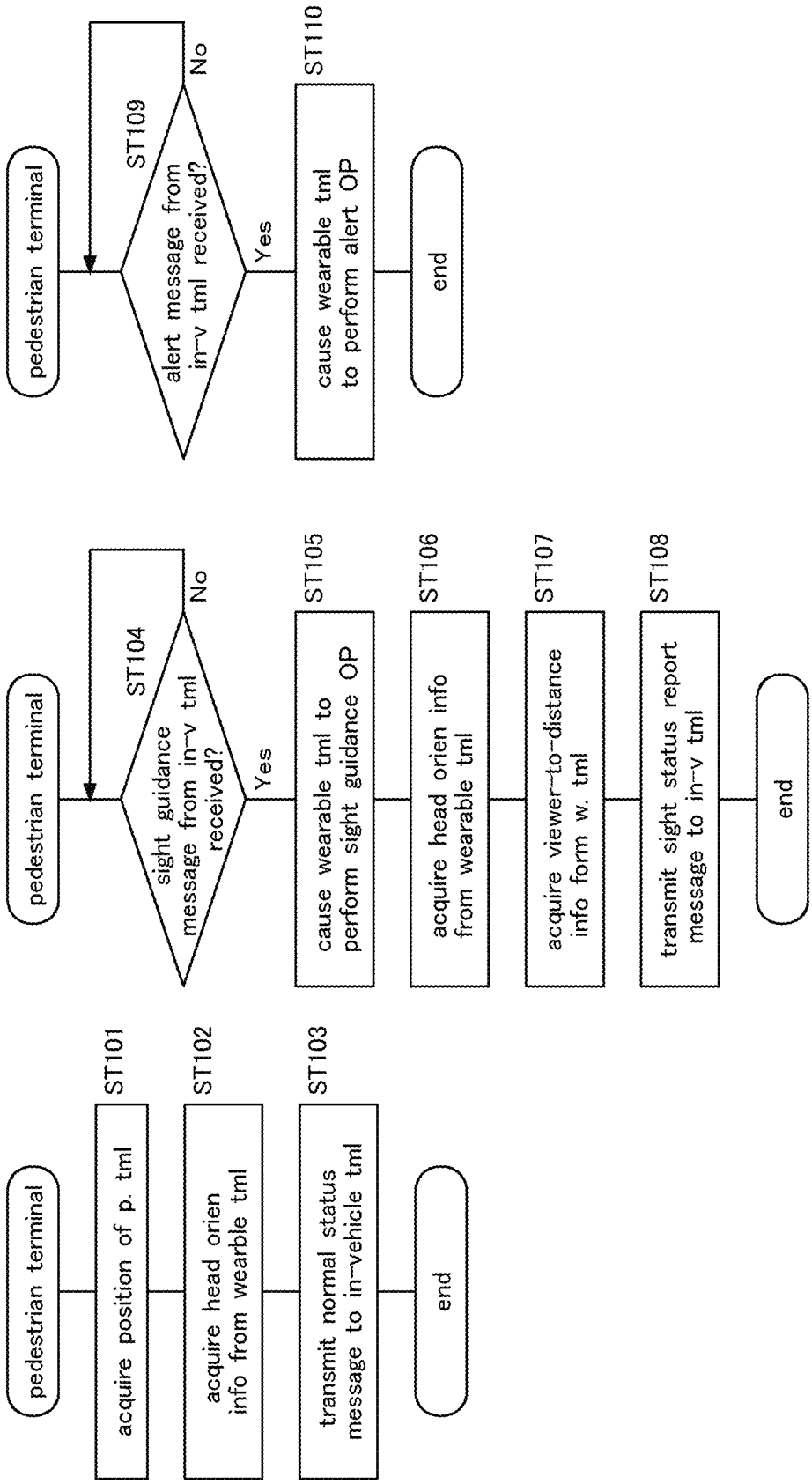
FIG. 10A, FIG. 10B, and FIG. 10C show flow charts of an operation procedure of the pedestrian terminal 1 according to the first embodiment.

Next, an operation procedure of the pedestrian terminal 1 according to the first embodiment will be described. FIG. 10 is a flow chart showing an operation procedure of the pedestrian terminal 1.

In the pedestrian terminal 1, first, as shown in FIG. 10A, the message controller 21 acquires the position data (latitude, longitude) of the pedestrian terminal 1 from the positioner 11 (ST101). Then, the message controller 21 acquires head orientation information from the wearable terminal 2, the head orientation information being measured by the head orientation measurer 41 of the wearable terminal 2 based on the detection result of the direction sensor 31 (ST102). Then, the message controller 21 transmits a normal status message from the ITS communication device 12 to the in-vehicle terminal 3 (ST103). The normal status message includes the terminal ID and position data and head orientation data of the pedestrian terminal 1.

Next, in the pedestrian terminal 1, as shown in FIG. 10B, when the ITS communication device 12 receives a sight guidance message from the in-vehicle terminal 3 (Yes in ST104), the sight guidance controller 24 controls the wearable terminal 2 such that the wearable terminal 2 performs a sight guidance operation for the pedestrian (ST105). The sight guidance message includes the terminal ID of the pedestrian terminal 1 and guidance direction information. In this case, the sight guidance controller 24 determines whether or not the message is transmitted to the pedestrian terminal 1 based on the terminal ID, and then causes the wearable terminal 2 to perform the sight guidance operation according to the guidance direction information.

As a sight guidance operation, the sight guidance controller 24 controls the wearable terminal 2 so as to cause either the left or right vibrator 35*a* or 35*b* to operate, cause either the left or right speaker 36*a* or 36*b* to output a notification sound (sound effect), or cause the wearable terminal 2 to display either a leftward arrow or a rightward arrow on the display 37.

Next, the message controller 21 acquires head orientation information from the wearable terminal 2, the head orientation information being measured by the head orientation measurer 41 based on the detection result of the direction sensor 31 (ST106). Then, the message controller 21 acquires viewer-to-target distance information (the distance from the pedestrian to the object which the pedestrian is seeing) from the wearable terminal 2, the viewer-to-target distance information being measured by the distance measurer 42 based on the detection results of the line-of-sight sensor 32 and the distance measuring sensor 33 of the wearable terminal 2 (ST107). Then, the message controller 21 transmits a sight status report message from the ITS communication device 12 to the in-vehicle terminal 3 (ST108). The sight status report message includes the terminal ID of the pedestrian terminal 1, and the pedestrian terminal's position data and sight status information (the pedestrian's head orientation data and the viewer-to-target distance information).

The pedestrian terminal 1 periodically transmits sight status report messages until a predetermined time elapses after receiving a sight guidance message from the in-vehicle terminal 3. After the predetermine time elapses, messages transmitted from the pedestrian terminal 1 return to normal status messages which do not include line-of-sight direction distance information.

In the present embodiment, a normal status message includes head orientation information. However, a normal status message may be formed to include, in addition to head orientation information, line-of-sight direction information. In this case, a normal status message can also be used as a sight status report message.

Next, in the pedestrian terminal 1, as shown in FIG. 10C, when the ITS communication device 12 receives an alert message from the in-vehicle terminal 3 (Yes in ST109), the alert controller 23 controls the wearable terminal 2 such that the wearable terminal 2 performs an alert operation to a pedestrian (ST110). The alert message includes the terminal ID of the pedestrian terminal 1 and alert information. The pedestrian terminal 1 determines whether or not the message is transmitted to the pedestrian terminal 1 based on the terminal ID, and then causes the wearable terminal 2 to perform, based on the alert information, the alert operation as instructed by the in-vehicle terminal 3.

The pedestrian terminal may be configured such that, upon receiving an alert message, the pedestrian terminal 1 performs collision determination, and when there is a risk of collision between the pedestrian and a vehicle, the pedestrian terminal 1 causes the wearable terminal 2 to perform an alert operation.

Figure 11:
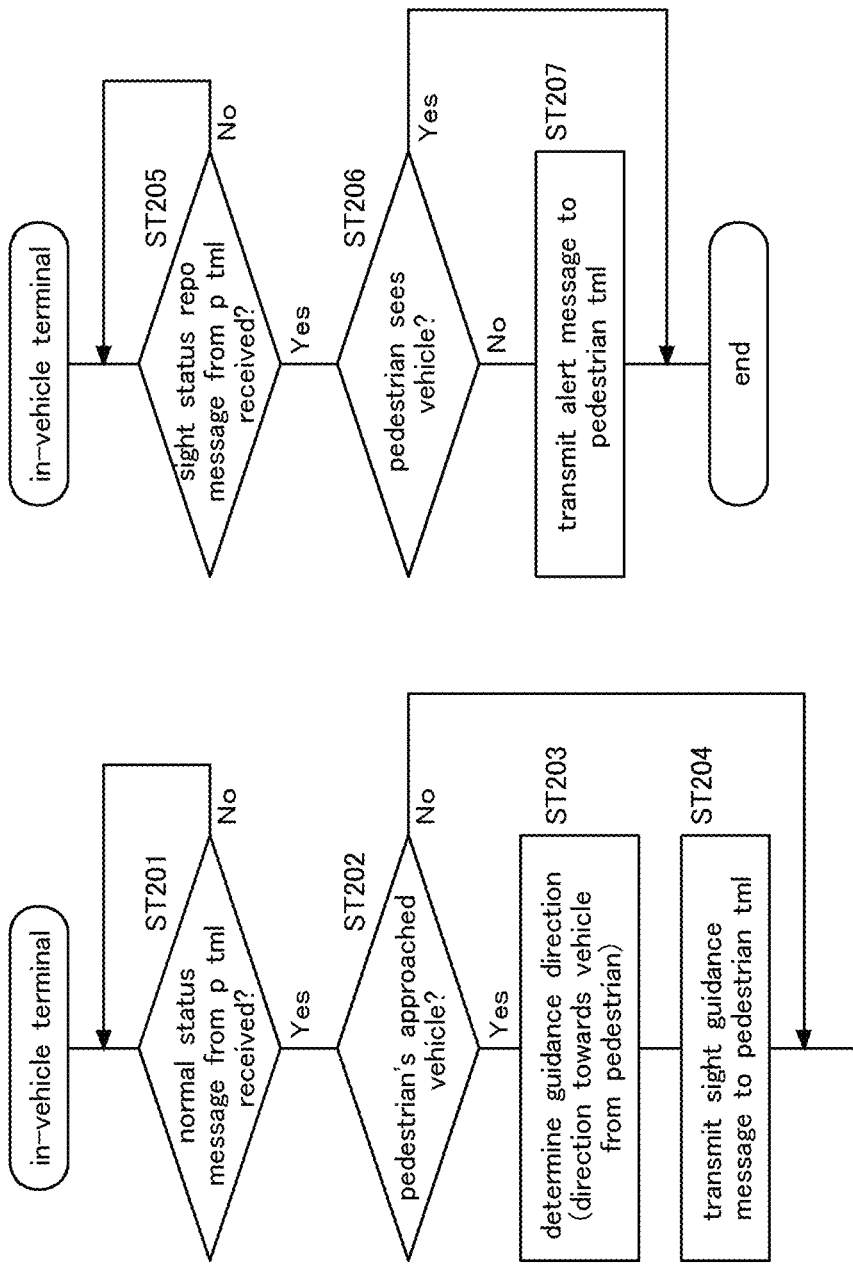
FIG. 11A and FIG. 11B show flow charts of an operation procedure of the in-vehicle terminal 3 according to the first embodiment.

Next, an operation procedure of the in-vehicle terminal 3 according to the first embodiment will be described. FIG. 11 is a flow chart showing an operation procedure of the in-vehicle terminal 3.

In the in-vehicle terminal 3, first, as shown in FIG. 11A, when the ITS communication device 52 receives a normal status message from a pedestrian terminal (ST201), the pedestrian approach detector 64 determines whether or not the pedestrian approaches to within a predetermined distance (e.g., 10 m) from the vehicle. (ST202). The normal status message includes the terminal ID, the pedestrian terminal's position data and the pedestrian's head orientation data. The pedestrian approach detector 64 determines, based on the position data of the pedestrian included in the message and that of the vehicle acquired by the positioner 51, whether or not the pedestrian approaches to within the predetermined distance from the vehicle.

When the pedestrian approach detector 64 determines that the pedestrian does not approach to within the predetermined distance from the vehicle (No in ST202), the operation ends.

When the pedestrian approach detector 64 determines that the pedestrian approaches to within the predetermined distance from the vehicle (Yes in ST202), the guidance direction determiner 65 determines the direction (guidance direction; right direction or left direction) in which the pedestrian can see the vehicle, based on the pedestrian's position data and the pedestrian's head orientation data included in the received message, and the position data of the vehicle acquired by the positioner 51 (ST203).

Next, the message controller 61 causes the ITS communication device 52 to transmit a sight guidance message to the pedestrian terminal 1 (ST204). The sight guidance message includes the terminal ID of the pedestrian terminal 1 to be notified, and guidance direction information (a result of the determination operation performed by the guidance direction determiner 65).

Next, in the in-vehicle terminal 3, as shown in FIG. 11B, when the ITS communication device 52 receives a sight status report message from the pedestrian terminal 1 (ST205), the vehicle sight determiner 66 determines whether or not a pedestrian sees the vehicle (ST206). The sight status report message includes the terminal ID and the position data of the pedestrian terminal and the pedestrian's head orientation data, and the viewer-to-target distance information. The vehicle sight determiner 66 determines whether or not the pedestrian sees the vehicle based on the position data of the pedestrian terminal 1, the pedestrian's head orientation data and the viewer-to-target distance information, the position data of the vehicle acquired by the positioner 51, and the body size data of the vehicle stored in the storage 55.

When the vehicle sight determiner 66 determines that the pedestrian sees the vehicle (Yes in ST206), the operation ends.

When the vehicle sight determiner 66 determines that the pedestrian does not see the vehicle (No in ST206), the message controller 61 causes the ITS communication device 52 to transmit an alert message to the pedestrian terminal 1 (ST207). The alert message includes the terminal ID of the pedestrian terminal 1 to be notified and alert information for urging the pedestrian to pay attention to the vehicle.

Separately from this operation flow, the in-vehicle terminal 3 also performs an alert operation based on the collision determination.

The pedestrian terminal 1 periodically transmits normal status messages. When the pedestrian continuously stays within the predetermined distance from the vehicle, the in-vehicle terminal 3 periodically transmits sight guidance messages to the pedestrian terminal 1. In this case, when the pedestrian does not see the vehicle, the in-vehicle terminal 3 periodically transmits alert messages to the pedestrian terminal 1, resulting in that the pedestrian terminal 1 continuously performs an alert operation.

In addition, even in the case that the pedestrian continuously stays within the predetermined distance from the vehicle, when the pedestrian sees the vehicle, the in-vehicle terminal 3 stop transmitting an alert message to the pedestrian terminal 1, resulting in that the pedestrian terminal 1 stop performing an alert operation.

In some cases, when recognizes an approaching vehicle, a pedestrian takes risk-avoidance actions such as to stop moving or to move away from the vehicle. In this case, it is no longer necessary to continue to perform an alert operation. In this view, the in-vehicle terminal 3 may be configured such that, when detecting that a pedestrian takes risk-avoidance actions, the in-vehicle causes the pedestrian terminal 1 to stop performing an alert operation. In this case, the pedestrian terminal 1 may be configured to detect a pedestrian's risk-avoidance action based on the position data of the pedestrian.

In other embodiments, the system may be configured to perform operations for supporting pedestrian's safety confirmation in a stepwise manner. Specifically, the system may be configured such that multiple support levels (notification, alert, and warn) are defined according to the level of collision risk, in which, in addition to an alert operation, a notification operation is performed for low collision risks, and a warning operation is performed for high collision risks. In this case, as a pedestrian approaches the vehicle so that the collision risk increases, the support operations changes accordingly; that is, a notification operation, an alert operation, a warning operation in this order. However, when the pedestrian takes a risk-avoidance action so that there is no need of safety confirmation support, the system may stop performing such safety confirmation support operations for the pedestrian.

Furthermore, the present invention is applicable to configurations in which a message for a pedestrian terminal 1 is transmitted from a different communication device from an in-vehicle terminal 3. In one embodiment, a message for a pedestrian terminal 1 may be transmitted from a communication device installed in infrastructure equipment such as a traffic light.

Second Embodiment

Figure 12:
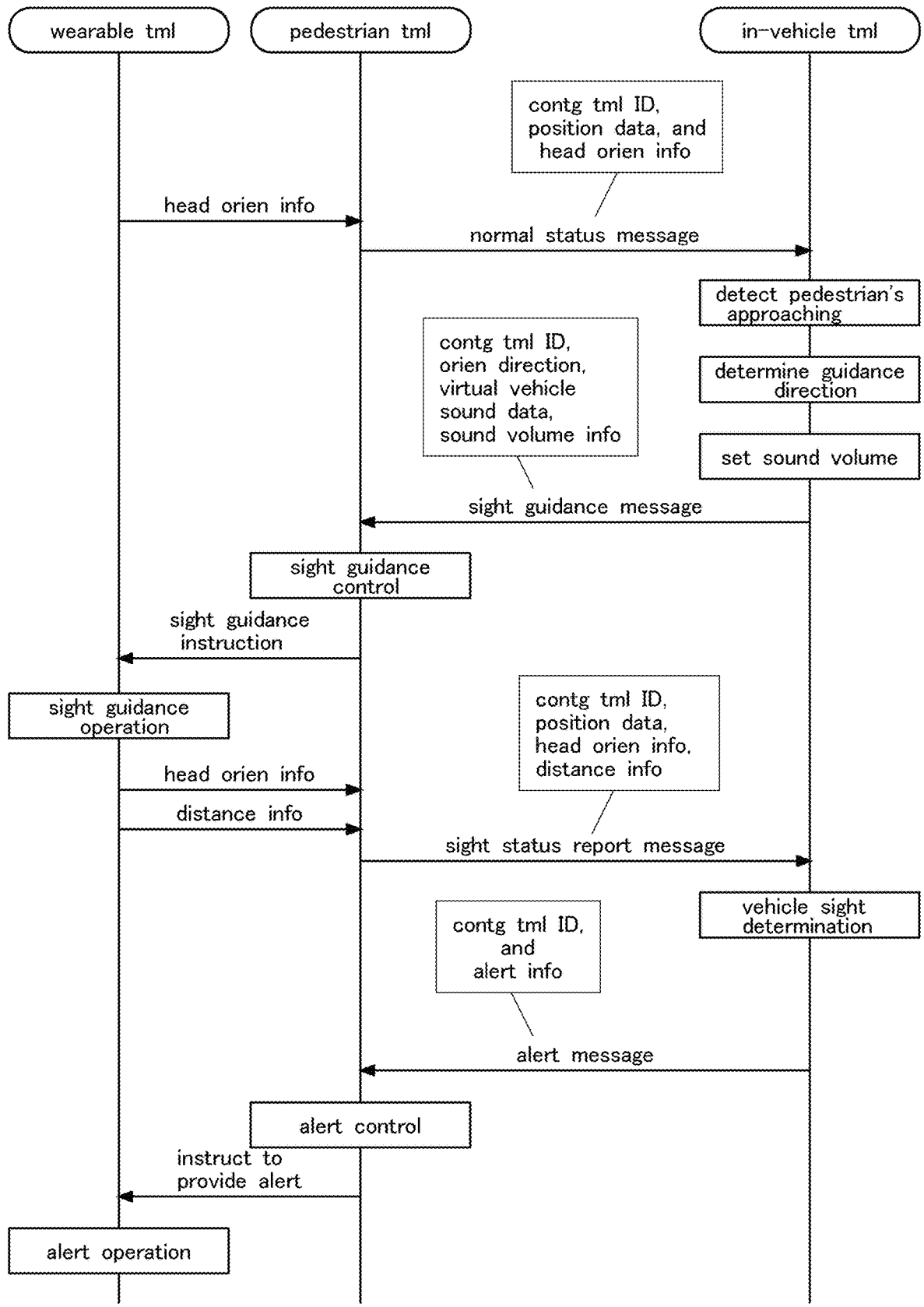
FIG. 12 is a sequence diagram showing an outline of an operation procedure of a safety confirmation support system according to a second embodiment of the present invention.

Next, a second embodiment of the present invention will be described. Except for what will be discussed here, the second embodiment is the same as the above-described first embodiment. FIG. 12 is a sequence diagram showing an outline of an operation procedure of a safety confirmation support system according to a second embodiment of the present invention.

In the first embodiment, the wearable terminal 2 is configured to cause either the left or right speaker 36a or 36b to output a sound effect as a sight guidance operation for encouraging the pedestrian so as to look in the direction toward where the vehicle is present. In the present embodiment, the system is configured such that the wearable terminal 2 causes either the left or right speaker 36a or 36b to output a virtual vehicle sound (vehicle running sound).

Furthermore, in the present embodiment, the virtual vehicle sound is output at a volume corresponding to the speed of the vehicle. When the vehicle runs at a high speed, the virtual vehicle sound is output at a loud volume, and, when the vehicle runs a slow speed, the virtual vehicle sound is output at a low volume.

Specifically, as shown in FIG. 12, when receiving a normal status message from the pedestrian terminal 1 through pedestrian-to-vehicle communications, the in-vehicle terminal 3 determines whether or not the pedestrian has approached to within a predetermined distance from the vehicle (pedestrian's approaching detection). When the in-vehicle terminal 3 determines that the pedestrian has approached to within the predetermined distance from the vehicle, the in-vehicle terminal 3 determines the direction (guidance direction) in which the pedestrian can see the vehicle (guidance direction determination). Moreover, the in-vehicle terminal 3 sets the volume of the notification sound based on the traveling speed of the vehicle (volume setting).

Next, the in-vehicle terminal 3 transmits a sight guidance message to the pedestrian terminal 1 through pedestrian-to-vehicle communications. The sight guidance message includes the terminal ID of the pedestrian terminal 1 to be notified, a result of the guidance direction determination, i.e., guidance direction information, virtual vehicle sound data, and volume information.

Upon receiving the sight guidance message transmitted from the in-vehicle terminal 3 through pedestrian-to-vehicle communications, the pedestrian terminal 1 performs sound controls based on the guidance direction information, virtual vehicle sound data, and volume information included in the message, so as to cause the wearable terminal 2 to perform the sight guidance operation; that is, output a virtual vehicle sound at a set volume from the left or right speaker 36a or 36b.

The subsequent operations are the same as those of the first embodiment (See FIG. 2).

The virtual vehicle sound to be output may be changed to be one corresponding to the type of a vehicle (such as truck, bus, or passenger car).

Although, in the present embodiment, the virtual vehicle sound is output at a volume corresponding to the speed of the vehicle, the volume of the virtual vehicle sound may be changed according to the change in the positional relationship between the pedestrian and the vehicle. For example, the system may be configured such that, when a vehicle is approaching a pedestrian, the virtual vehicle sound is output at a loud volume, and when the vehicle is moving away from the pedestrian, the virtual vehicle sound is output at a low volume. In this case, the position data of the pedestrian and that of the vehicle may be accumulated as position history information for a predetermined period, and, based on the position history information, the in-vehicle terminal 3 determines whether the vehicle is approaching the pedestrian or the vehicle is moving away from the pedestrian. Furthermore, the system may be configured such that the volume is adjusted according to the distance between the pedestrian and the vehicle. For example, the system may be configured such that, when the distance between the pedestrian and the vehicle is relatively long, the volume is lowered, and, as the distance between the pedestrian and the vehicle becomes shorter, the volume is increased.

Third Embodiment

Figure 13:
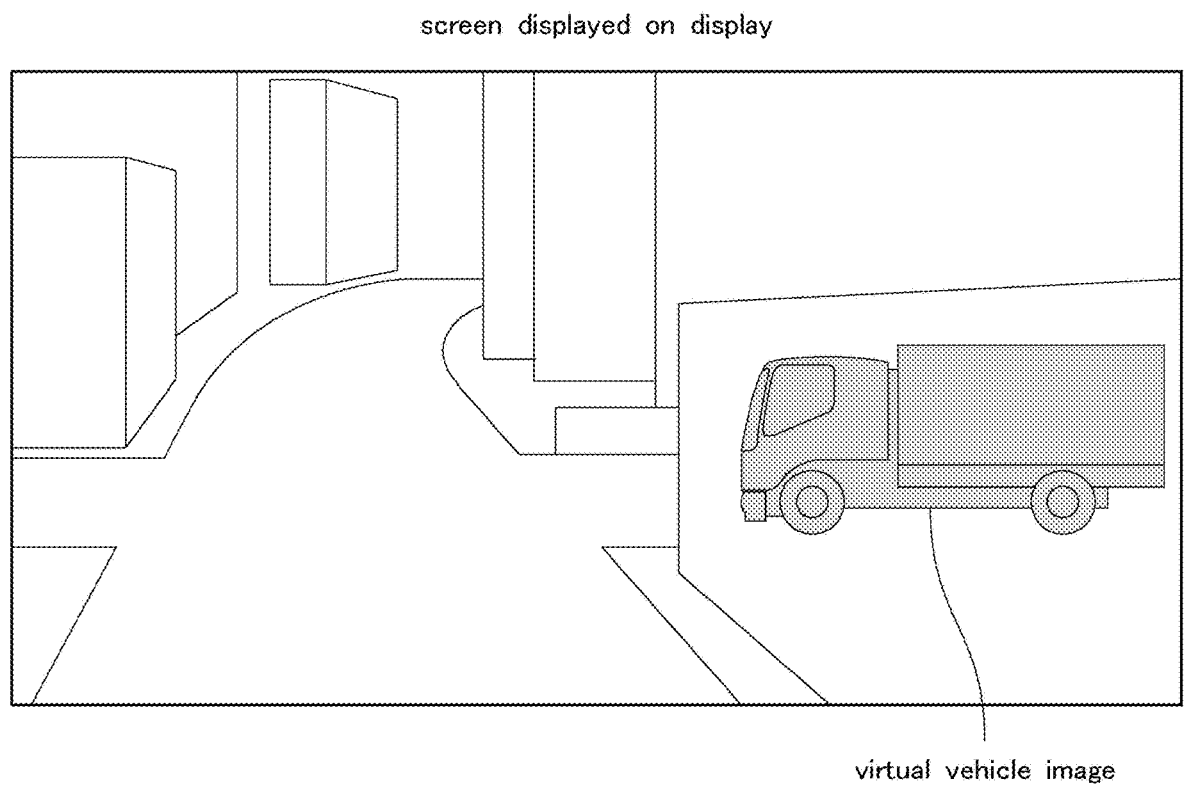
FIG. 13 is an explanatory diagram showing a screen displayed on a display 37 of the wearable terminal 2 according to a third embodiment of the present invention.

Next, a third embodiment of the present invention will be described. Except for what will be discussed here, the third embodiment is the same as the above-described embodiments. FIG. 13 is an explanatory diagram showing a screen displayed on the display 37 of the wearable terminal 2. FIG. 14 is an explanatory diagram showing vehicle body information stored in the storage 55 of the in-vehicle terminal 3. FIG. 15 is an explanatory diagram showing image display settings information stored in the storage 55 of the in-vehicle terminal 3.

In the above-described embodiment, as a sight guidance operation for urging a pedestrian to look in the direction toward an approaching vehicle, a rightward or leftward arrow is displayed on the display 37 of the wearable terminal 2. In the present embodiment, as shown in FIG. 13, a virtual vehicle image corresponding to an actual as can be seen by the pedestrian displayed on the display 37 of the wearable terminal 2 as a sight guidance operation. The display 37 is a transparent display through which the pedestrian can see an actual landscape, and the virtual vehicle image is overlay-displayed (superimposed) on the actual landscape. This allows the pedestrian to virtually see the vehicle even when the actual vehicle is out of sight (invisible) from the pedestrian at a non-line-of-sight intersection.

Preferably, in addition to displaying a virtual vehicle image on the display 37, the wearable terminal 2 causes either the left or right vibrator 35a or 35b to operate, and causes either the left or right speaker 36a or 36b to output a notification sound as additional sight guidance operations. Furthermore, the wearable terminal 2 may cause the speakers 36a or 36b to output a virtual vehicle sound.

In the present embodiment, the in-vehicle terminal 3 generates a virtual vehicle image as seen by a pedestrian based on vehicle body image data and the moving direction of a vehicle. For example, when the vehicle approaches the pedestrian from the right side, the in-vehicle terminal 3 generates a virtual vehicle image of the left side of the vehicle body. When the vehicle approaches the pedestrian from the left side, the in-vehicle terminal 3 generates a virtual vehicle image of the right side of the vehicle body.

In particular, the in-vehicle terminal 3 may be configured to store three-dimensional CG data of the vehicle body as vehicle body image data, and generate a virtual vehicle image according to the angle of the direction in which a pedestrian can see the vehicle (the seen angle of the vehicle body). As a result, even when the vehicle approaches the pedestrian not from a lateral direction, but from an angled direction, the in-vehicle terminal 3 can generate a virtual vehicle image as seen by a pedestrian. In this case, the in-vehicle terminal 3 may determine the seen angle of vehicle body based on the pedestrian's position data, the vehicle's position data, and the pedestrian's head orientation data.

In the present embodiment, as shown in FIG. 14, the storage 55 of the in-vehicle terminal 3 stores the vehicle body information; that is, the vehicle body size (vehicle width x, length y, and height h), the vehicle type (e.g., truck, bus, or passenger car), the vehicle body color (e.g., silver), and the vehicle body image data (three-dimensional CG data of the vehicle body).

In the example shown in FIG. 14, the vehicle body information includes a website address (URL) where the vehicle body image data is available, and the in-vehicle terminal 3 can acquire the vehicle body image data of the vehicle from a management server (not shown) for managing vehicle body image data.

The in-vehicle terminal 3 determines the size of a virtual vehicle image displayed on the display 37 based on the distance between the pedestrian and the vehicle (pedestrian-to-vehicle distance) and the vehicle body size. The in-vehicle terminal 3 may determine the pedestrian-to-vehicle distance based on the position data of the pedestrian and that of the vehicle.

In the present embodiment, as shown in FIG. 15, image display settings information is stored in the storage 55 of the in-vehicle terminal 3. The image display settings information includes the sizes of a virtual vehicle image in the display, which are determined based on the pedestrian-to-vehicle distance and the vehicle body size. As a result, the size of a virtual vehicle image can be changed according to the pedestrian-to-vehicle distance; that is, as the vehicle is actually seen by the pedestrian, when the vehicle is located near the pedestrian, a virtual vehicle image is displayed large, and when it is located far away from the pedestrian, a virtual vehicle image is displayed small.

The in-vehicle terminal 3 determines the position of a virtual vehicle image in the display 37 based on the pedestrian's position data, the vehicle's position data, and the pedestrian's head orientation data. Specifically, the in-vehicle terminal 3 can acquire the angle of the direction toward a vehicle with respect to the front direction of a pedestrian based on the pedestrian's position data, the vehicle's position data, and the pedestrian's head orientation data, and thus can determine the position of a virtual vehicle image in the display 37 based on that angle.

Figure 16:
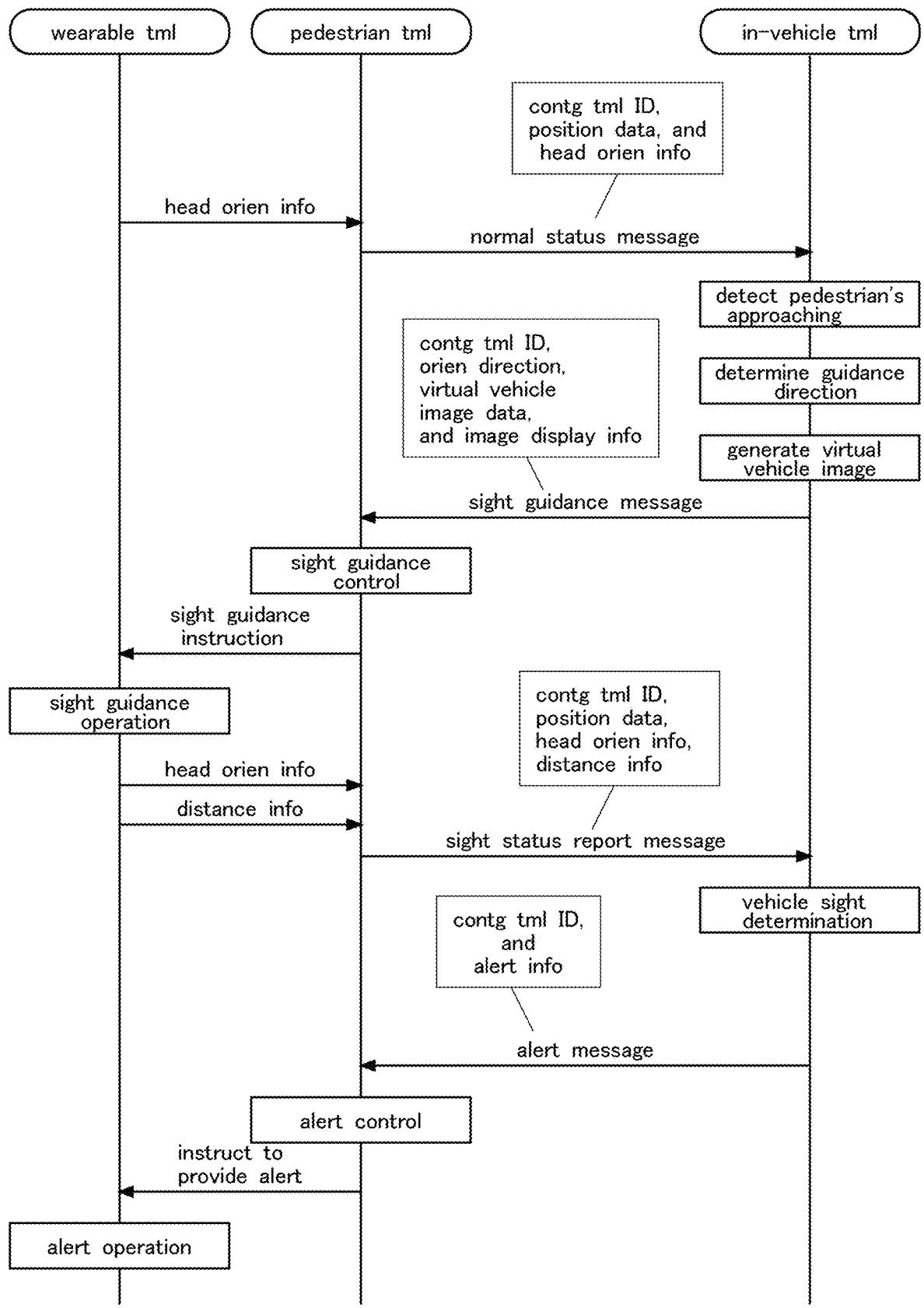
FIG. 16 is a sequence diagram showing an outline of the operation procedure of the safety confirmation support system according to the third embodiment.

Next, an outline of the operation procedure of the safety confirmation support system according to the third embodiment will be described. FIG. 16 is a sequence diagram showing an outline of the operation procedure of the safety confirmation support system.

When receiving a normal status message from the pedestrian terminal 1 through pedestrian-to-vehicle communications, the in-vehicle terminal 3 determines whether or not the pedestrian has approached to within a predetermined distance from the vehicle (pedestrian's approaching detection). When the pedestrian has approached to within the predetermined distance from the vehicle, the in-vehicle terminal 3 determines the direction (guidance direction) in which the pedestrian can see the vehicle (guidance direction determination).

The in-vehicle terminal 3 also generates a virtual vehicle image based on vehicle body image data (three-dimensional CG data of the vehicle body), vehicle body information (vehicle body color), and the angle of the direction in which a pedestrian can see the vehicle (the seen angle of vehicle body). The seen angle of vehicle body is determined based on the pedestrian's position data and head orientation data included in a normal status message, and the vehicle's position data acquired by the positioner 51.

The in-vehicle terminal 3 also determines the size of a virtual vehicle image displayed on the display 37 of the wearable terminal 2 based on the distance between the pedestrian and the vehicle (pedestrian-to-vehicle distance) and vehicle body information (the vehicle body size) stored in the storage 55. The pedestrian-to-vehicle distance is determined based on the pedestrian's position data and the vehicle's position data.

In addition, the in-vehicle terminal 3 determines the position of a virtual vehicle image in the display 37 of the wearable terminal 2 based on the pedestrian's position data and the vehicle's position data, and the pedestrian's head orientation data.

Next, the in-vehicle terminal 3 transmits a sight guidance message to the pedestrian terminal 1 through pedestrian-to-vehicle communications. The sight guidance message includes the terminal ID of the pedestrian terminal 1 to be notified, a result of the guidance direction determination, i.e., guidance direction information, virtual vehicle image data, and image display information (the size and position of a virtual vehicle image in the display).

Upon receiving the sight guidance message transmitted from the in-vehicle terminal 3 through pedestrian-to-vehicle communications, the pedestrian terminal 1 performs display controls based on the guidance direction information, the virtual vehicle image data, and image display information (the size and position of a virtual vehicle image in the display) included in the message, so as to display a virtual vehicle image having a designed size at a designated positon on the display 37 of the wearable terminal 2, as a sight guidance operation.

The subsequent operations are the same as those of the first embodiment (See FIG. 2).

In the present embodiment, the system is configured such that the in-vehicle terminal 3 generates a virtual vehicle image as seen by a pedestrian, determines the size and position of the virtual vehicle image in the display 37 of the wearable terminal 2, and transmits to the pedestrian terminal 1 a sight guidance message which further includes virtual vehicle image data, and image display information (the size and position of a virtual vehicle image in the display). However, the system may be configured such that the pedestrian terminal 1 generates a virtual vehicle image and determines the size and position of the virtual vehicle image in the display. In this case, the in-vehicle terminal 3 may be configured to transmits to the pedestrian terminal 1 a sight guidance massage which further includes the vehicle's position data, vehicle body image data (three-dimensional CG data of the vehicle body), and vehicle body information (such as vehicle body size, vehicle color).

In some embodiments, an arrow image indicating the direction in which the pedestrian can see an approaching vehicle may have different colors and widths (thickness) depending on the distance between the pedestrian and the vehicle, the speed of the vehicle, or any other factor. For example, the arrow image may be made thicker or made to have a different color when the distance between the pedestrian and the vehicle is relatively short or when the speed of the vehicle is relatively high. In other cases, the arrow image or its shape may be changed as appropriate. For example, the arrow image may be formed such that, when the distance between the pedestrian and the vehicle is relatively long, the arrow image is formed by dotted lines, and when the distance is relatively short, the arrow image is formed by solid lines. Furthermore, in the case where an approaching vehicle is likely to have a higher risk of accident (e.g., when the vehicle has a number of records of traffic violations), even when the pedestrian-to-vehicle distance is relatively long, an arrow image for a shorter pedestrian-to-vehicle distance may be used.

Fourth Embodiment

Figure 17:
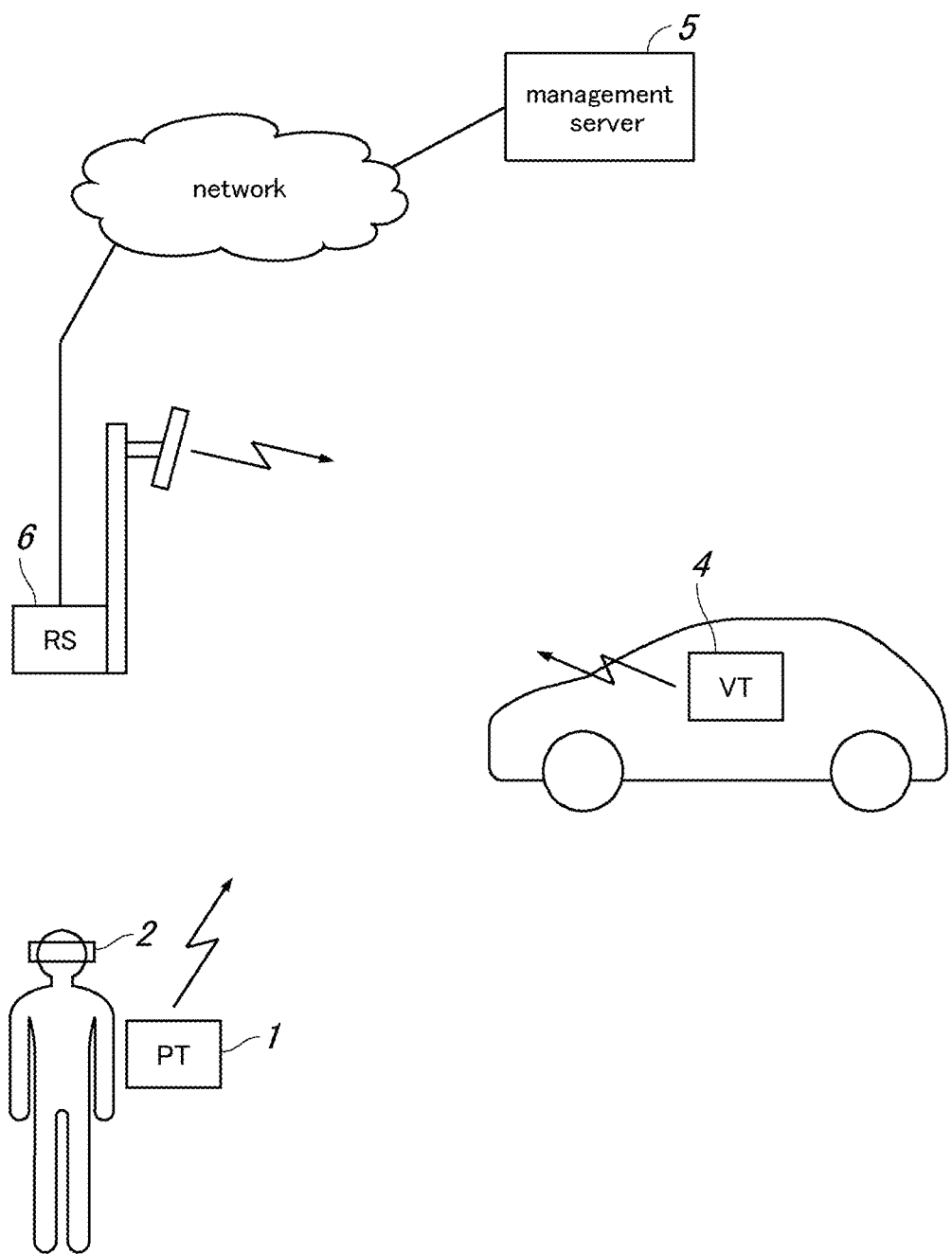
FIG. 17 is an explanatory diagram showing a general configuration of a safety confirmation support system according to a fourth embodiment of the present invention.

Next, a fourth embodiment of the present invention will be described. Except for what will be discussed here, the fourth embodiment is the same as the above-described embodiments. FIG. 17 is an explanatory diagram showing a general configuration of a safety confirmation support system according to the fourth embodiment.

In the above-described embodiments, the system is configured such that the pedestrian is guided to look in the look in the direction toward a vehicle. However, a problem that can happen is that, despite the sight guidance, the pedestrian still does not see the vehicle; that is, the pedestrian misses the sight guidance. In particular, a place where pedestrians frequently miss sight guidance can be regarded as a risky area.

In view of this problem, in the present embodiment, the system is configured to include a management server 5 (analyzer) for analyzing a pedestrian's action in response to the provision of sight guidance, and when a pedestrian misses the sight guidance, the system stores and maintains the position data of the pedestrian to thereby identify one or more risky areas where pedestrians frequently miss sight guidance. It can help prevent traffic accidents to present such risky areas to vehicle drivers or an authority for traffic management such as police.

Specifically, first, when detecting that a pedestrian has missed sight guidance, the in-vehicle terminal 3 transmits the position data of the pedestrian to the management server 5. In some embodiments, the system may be configured such that the in-vehicle terminal 3 transmits information to the management server 5 via a roadside device 6, and that the in-vehicle terminal 3 and the roadside device 6 communicate with each other through ITS communications (roadside-to-vehicle communications) and the roadside device 6 and the management server 5 communicates with each other through network communications.

The management server 5 receives information from the in-vehicle terminal 3; that is, the position data of a pedestrian who has missed sight guidance, and registers the position data in a database, so that the management server 5 can perform analysis (statistical processing operations) on the information in the database at an appropriate time. The analysis involves, for example, counting the number of times which pedestrians miss sight guidance in a predetermined period for each of the cells (divided areas), the cells being formed by dividing a target area, and identifying cells for which the number of times of missing sight guidance is equal to or greater than a predetermined number of times, as risky areas.

In some embodiments, the management server 5 may be configured to perform attribute-based analysis, referring to pedestrians' attributes (e.g., elderly person, or children), to provide an analysis result for each attribute. In other embodiments, the management server 5 may be configured to perform time-zone-based analysis, to provide an analysis result for each time zone.

In the above-described embodiment, the system is configured to detect a pedestrian's head orientation (face orientation) and line of sight, and provide an alert to the pedestrian when the in-vehicle terminal 3 determines, based on the pedestrian's head orientation (face orientation) and line of sight, that the pedestrian does not see, i.e. does not recognize the vehicle. However, the system may be configured to detect the driver's head orientation (face orientation) and line of sight, and provide an alert to the driver when the in-vehicle terminal 3 determines, based on the driver's head orientation (face orientation) and line of sight, that the driver does not see, i.e. does not recognize a pedestrian. In this case, the system may be configured to provide an alert to a pedestrian when the in-vehicle terminal 3 determines that the driver does not see the pedestrian.

In some embodiments, the system may have a function of providing an alert to a pedestrian in response to the failure to look in the direction toward the vehicle, where the function can be disabled at a specific place. For example, at railroad crossings, accidents are less likely to occur between pedestrians and vehicles as vehicles generally slow down there. Considering that fact, the function of providing an alert to a pedestrian may be disabled around railroad crossings. Similarly, the alert function may be disabled around bus stops.

It should be noted that the present invention is applicable to cases other than those involving pedestrians and vehicles. For example, the present invention is also applicable to cases which involve children and their parents, or cases which involves the elderly and their care givers. In such cases, the system may be configured such that, when a parent or care giver does not see a child or an elderly person for more than a certain period of time, the system provides an alert to the child and the parent or to the elderly person and the care giver, preventing the child or the elderly person from getting lost or wandering around. Furthermore, the present invention is also applicable to cases which involve pets and their owners.

Fifth Embodiment

Figure 18:
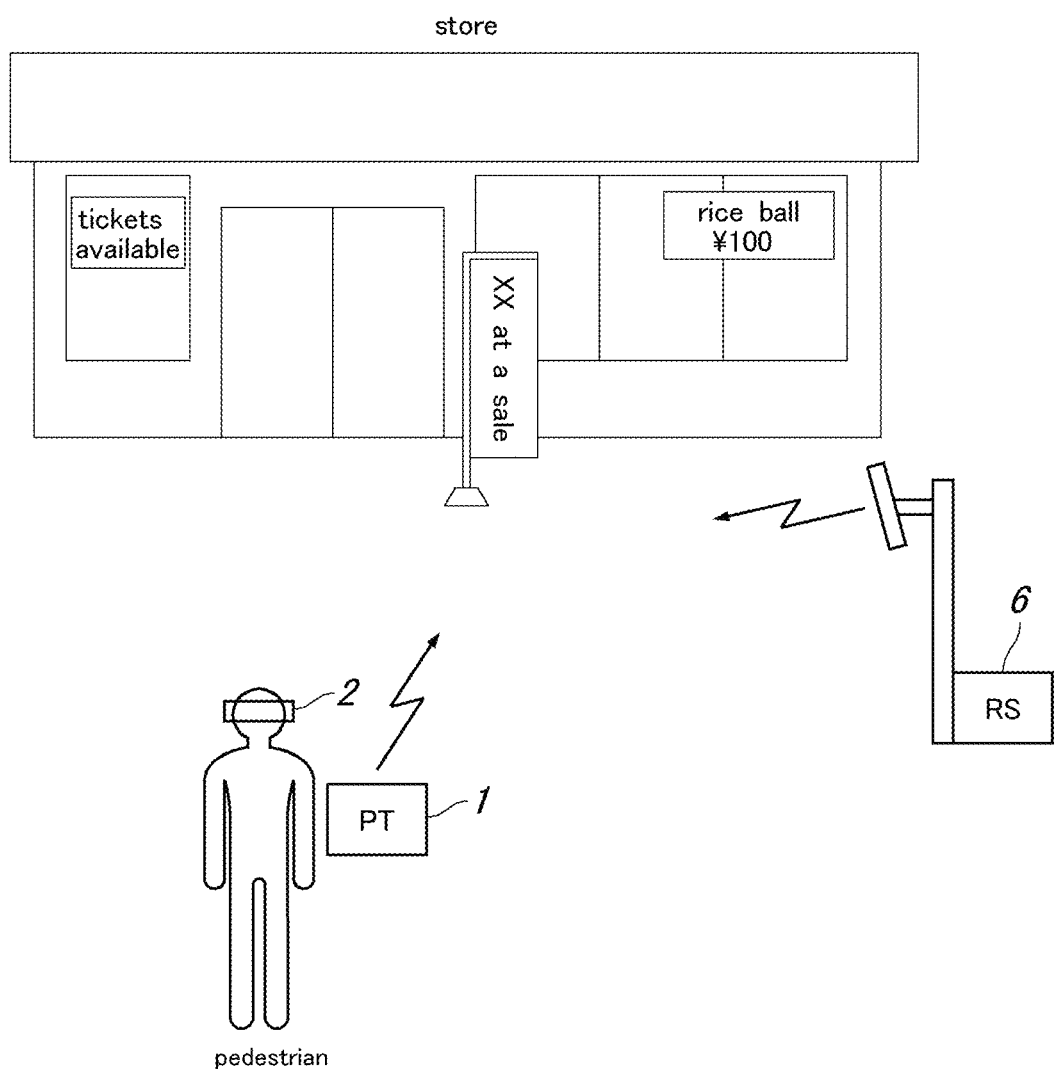
FIG. 18 is a diagram showing a general configuration of an information distribution system according to a fifth embodiment of the present invention.

Next, a fifth embodiment of the present invention will be described. Except for what will be discussed here, the fifth embodiment is the same as the above-described embodiments. FIG. 18 is a diagram showing a general configuration of an information distribution system according to the fifth embodiment.

The information distribution system (roadside-to-pedestrian communication system) distributes to pedestrians information associated with an advertisement object (a target object to be paid attention) visible to the pedestrians. The system includes a pedestrian terminal 1 (pedestrian device), a wearable terminal 2. (wearable device), and a roadside device 6 (communication device), where the pedestrian terminal 1 and the roadside device 6 perform ITS communications (roadside-to-pedestrian communications) with each other.

The pedestrian terminal 1 receives a message including various distribution information transmitted from the roadside device 6 through ITS communications (roadside-to-pedestrian communications).

The wearable terminal 2 is connected to the pedestrian terminal 1, and performs an information presenting operation based on the control of the pedestrian terminal 1, to present the information delivered from the roadside device 6 to the pedestrian. In the present embodiment, the wearable terminal 2 is worn on the head of a pedestrian, and is configured to detect the pedestrian's head orientation (face orientation) and line-of-sight direction.

The roadside device 6 is installed on the road. The roadside device 6 transmits a message including various distribution information, to the pedestrian terminal 1 through ITS communications (roadside-to-pedestrian communications).

In the present embodiment, the roadside device 6 transmits to the pedestrian terminal 1 a message including advertisement object information associated with advertisement objects around the roadside device 6, and the pedestrian terminal 1 acquires the advertisement object information from the roadside device 6 and presents the acquired information to the pedestrian. Examples of advertisement objects include signboards, posters, banner-flags, banners, and hanging banners.

Figure 19:
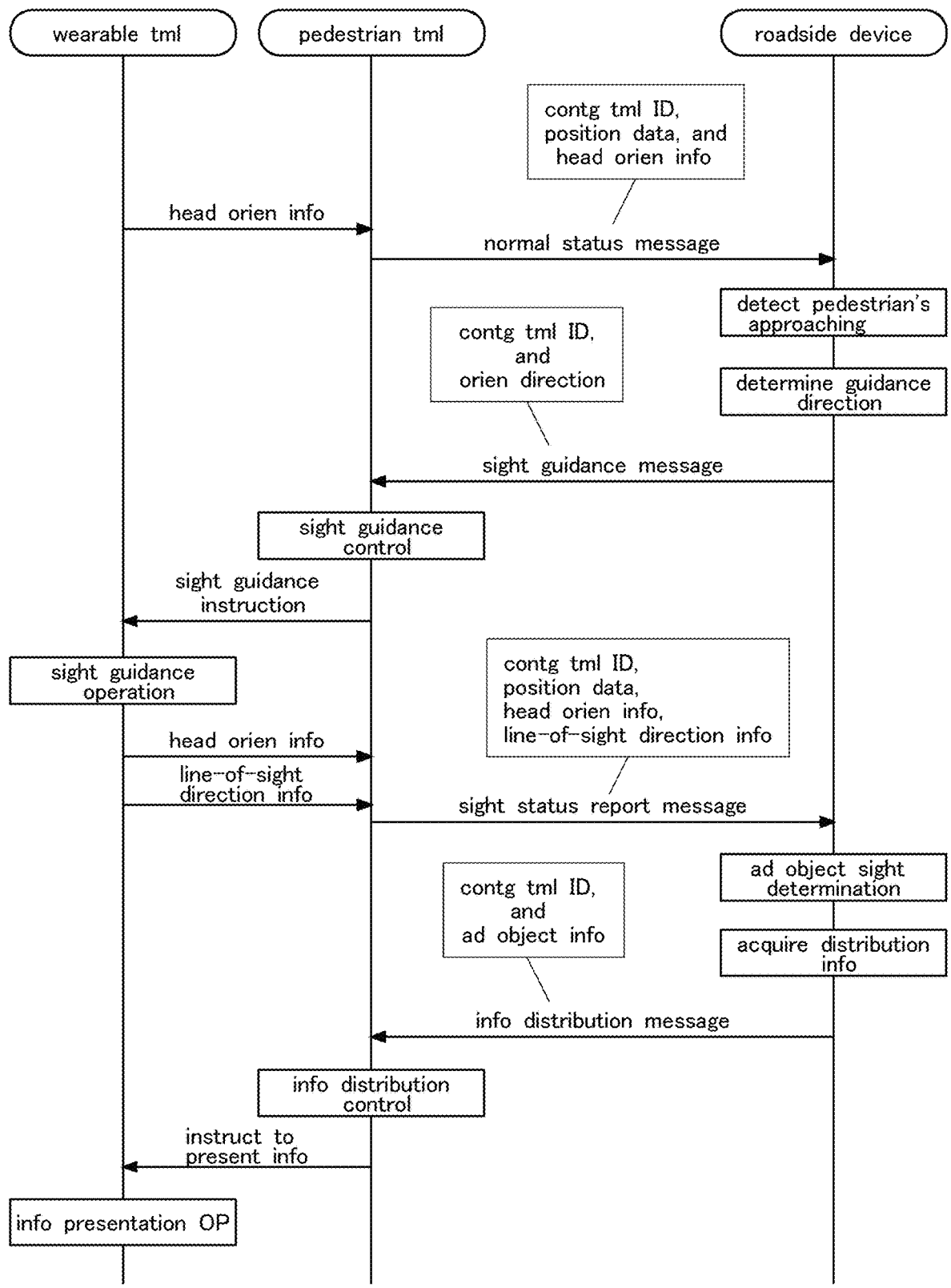
FIG. 19 is a sequence diagram showing an outline of the operation procedure of the information distribution system according to the fifth embodiment.

Next, an outline of the operation procedure of the information distribution system according to the fifth embodiment will be described. FIG. 19 is a sequence diagram showing an outline of the operation procedure of the information distribution system.

In the present embodiment, when a pedestrian approaches an advertisement object, the system guides the pedestrian to look in the direction toward the advertisement object, and when the pedestrian sees the advertisement object in response to the guidance, the system presents advertisement object information associated therewith to the pedestrian.

The wearable terminal 2, which is worn on the head of a pedestrian, measures the head orientation (face orientation) of the pedestrian, and transmits a measurement result, i.e., head orientation data to the pedestrian terminal 1. The wearable terminal 2 measures the line-of-sight direction of the pedestrian, and transmits a measurement result, i.e., line-of-sight direction information, to the pedestrian terminal 1.

The wearable terminal 2 may be configured to measure head orientations and line-of-sight directions and transmit measurement records at regular intervals. In some cases, the wearable terminal 2 may be configured to measure a head orientation and a line-of-sight direction and transmit measurement records in response to a request from the pedestrian terminal 1. In the case where measurements are performed in response a request from the pedestrian terminal 1, the wearable terminal 2 may be configured to continuously perform measurements until a predetermined time elapses after receiving the request.

The pedestrian terminal 1 first transmits a normal status message to the roadside device 6 through roadside-to-pedestrian communications. Such a normal status message includes the pedestrian terminal's terminal ID and position data (latitude, longitude), and the pedestrian's head orientation data acquired by the wearable terminal 2.

When receiving a normal status message from the pedestrian terminal 1 through roadside-to-pedestrian communications, the roadside device 6 determines whether or not the pedestrian has approached to within a predetermined distance (e.g., 10 m) from the advertisement object (pedestrian's approaching detection) based on the position data of the pedestrian included in the message and that of the advertisement object stored in the roadside device 6. When the roadside device 6 determines that the pedestrian has approached to within the predetermined distance from the advertisement object, the roadside device 6 determines the direction (guidance direction) in which the pedestrian can see the advertisement object (guidance direction determination) based on the pedestrian's position data, the advertisement object's position data, and the pedestrian's head orientation data included in the received message.

Next, the roadside device 6 transmits a sight guidance message to the pedestrian terminal 1 through roadside-to-pedestrian communications. The sight guidance message includes the terminal ID of the pedestrian terminal 1 to be notified, and a result of the guidance direction determination, i.e., guidance direction information.

Upon receiving the sight guidance message transmitted from the roadside device 6 through roadside-to-pedestrian communications, the pedestrian terminal 1 controls the wearable terminal 2 based on the guidance direction information included in the message so that the wearable terminal 2 performs a sight guidance operation to thereby guide the pedestrian to look in the direction toward the advertisement object. In the present embodiment, the wearable terminal 2 notifies the pedestrian of the direction toward the advertisement object by performing a sight guidance operation such as one using voice, vibration, or image display.

Next, the pedestrian terminal 1 transmits a sight status report message to the roadside device 6 through roadside-to-pedestrian communications. The sight status report message includes the pedestrian terminal's terminal ID and position data and the pedestrian's sight status information (head orientation data and line-of-sight direction information) acquired by the wearable terminal 2.

When receiving the sight status report message from the pedestrian terminal 1 through roadside-to-pedestrian communications, the roadside device 6 determines whether or not the pedestrian sees the advertisement object (advertisement object sight determination) based on the position data of the pedestrian terminal 1, the pedestrian's head orientation data and the line-of-sight direction information included in the message, and the position data of the advertisement object.

Next, when the pedestrian does not see the advertisement object, the roadside device 6 transmits an information distribution message to the pedestrian terminal 1 through roadside-to-pedestrian communications. The information distribution message includes the terminal ID of the pedestrian terminal 1 to be notified and advertisement object information associated with the advertisement object which the pedestrian sees. When the pedestrian does not see the advertisement object, the roadside device 6 transmits no information distribution message.

When receiving the information distribution message from the roadside device 6 through roadside-to-pedestrian communications, the pedestrian terminal 1 controls the wearable terminal 2 based on the advertisement object information included in the message so that the wearable terminal 2 performs an information presentation operation to thereby present the advertisement object information included in the message to the pedestrian. In the present embodiment, the wearable terminal 2 is controlled to perform the information presentation operation to present the advertisement object information to the pedestrian by using vibration, voice, or image display.

In the present embodiment, the system is configured to cause the wearable terminal 2 to perform the information presentation operation to the pedestrian. In other embodiment, the system may be configured to cause the pedestrian terminal 1 or a mobile terminal device (not shown) such as smartphone carried by the pedestrian to perform the information presentation operation.

In the present embodiment, the system is configured to cause the roadside device 6 to perform guidance direction determination. In other embodiments, the system may be configured to cause the pedestrian terminal 1 to perform guidance direction determination. In this case, when detecting that the pedestrian has approached the advertisement object, the roadside device 6 transmits a sight guidance instruction message to the pedestrian terminal 1, and upon receiving the sight guidance instruction message from the roadside device 6, the pedestrian terminal 1 performs guidance direction determination, and controls the wearable terminal 2 so that the wearable terminal 2 performs a sight guidance operation based on the determination result. Since the advertisement object's position data is necessary for the guidance direction determination, the roadside device 6 may be configured to add the advertisement object's position data to the sight guidance instruction message and transmits it to the pedestrian terminal 1.

Figure 20:
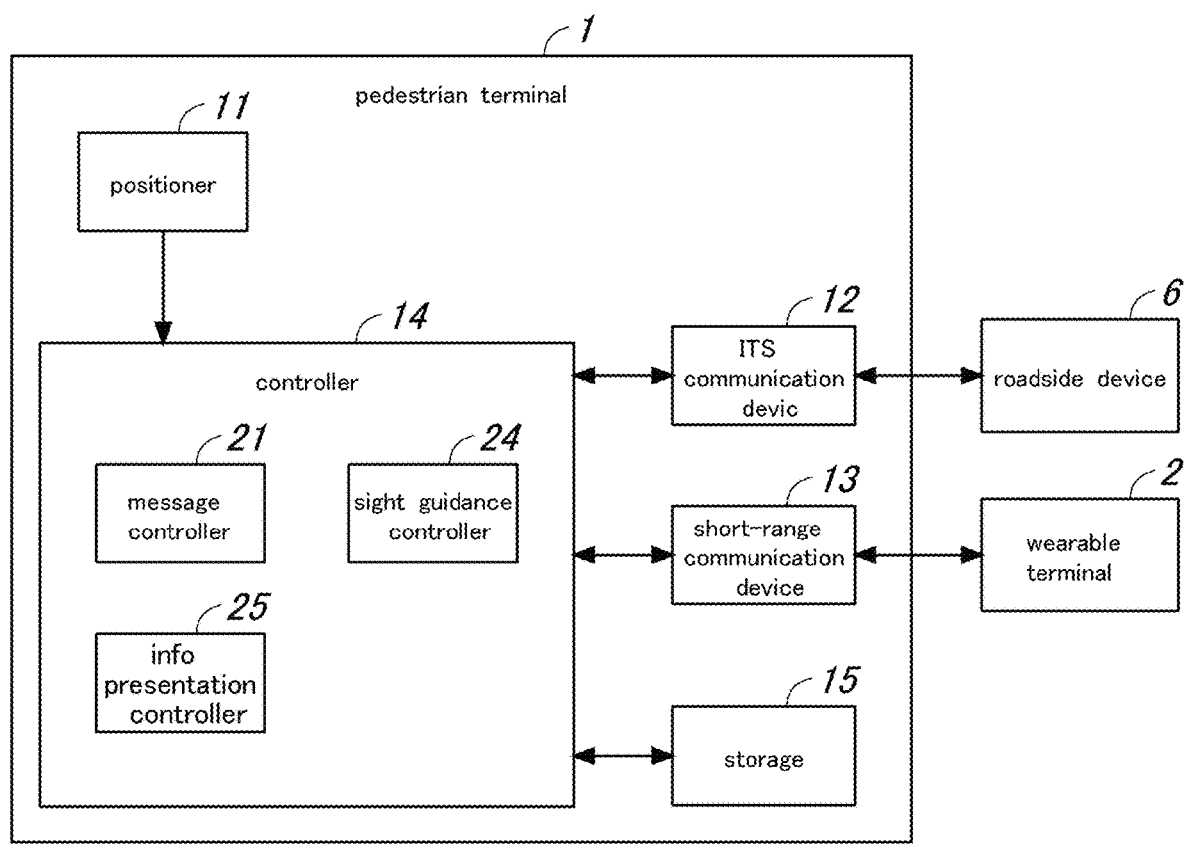
FIG. 20 is a block diagram showing a schematic configuration of a pedestrian terminal 1 according to the fifth embodiment.

Next, a schematic configuration of a pedestrian terminal 1 according to the fifth embodiment will be described. FIG. 20 is a block diagram showing a schematic configuration of the pedestrian terminal 1.

Although the configuration of the pedestrian terminal 1 is similar to that of the first embodiment (FIG. 3), the ITS communication device 12 in this embodiment transmits and receives messages to and from the roadside device 6 through ITS communications (roadside-to-pedestrian communications). The controller 14 includes, in addition to the message controller 21, a sight guidance controller 24 and an information presentation controller 25.

The message controller 21 controls the transmission of a message to the roadside device 6.

The sight guidance controller 24 controls the wearable terminal 2 so as to perform a sight guidance operation to thereby guide the pedestrian so as to look in the direction toward the advertisement object, based on sight guidance information received from the roadside device 6. Specifically, the wearable terminal 2 performs a sight guidance operation, which includes causing the vibrator 35a or 35b to operate, causing the speaker 36a or 36b to output human speech sound, or displaying an image on the display 37.

The information presentation controller 25 controls the wearable terminal 2 so as to perform an information presentation operation to thereby present the advertisement object information to the pedestrian. Specifically, the wearable terminal 2 performs information presentation operations, which involves causing the speaker 36a or 36b to output human speech sound, or displaying an image on the display 37.

The system may be configured to enable the pedestrian to perform a selection operation; that is, select what type of sight guidance operation to be performed by the wearable terminal 2. The system may also be configured to enable the pedestrian to select what type of information presentation operation to be performed by the wearable terminal 2.

The pedestrian terminal 1 transmits and receives messages including position data to and from the in-vehicle terminal 3 to determine if there is a risk of collision between the pedestrian and the vehicle, and when there is a risk of collision, the pedestrian terminal 1 provides an alert to the pedestrian.

Figure 21:
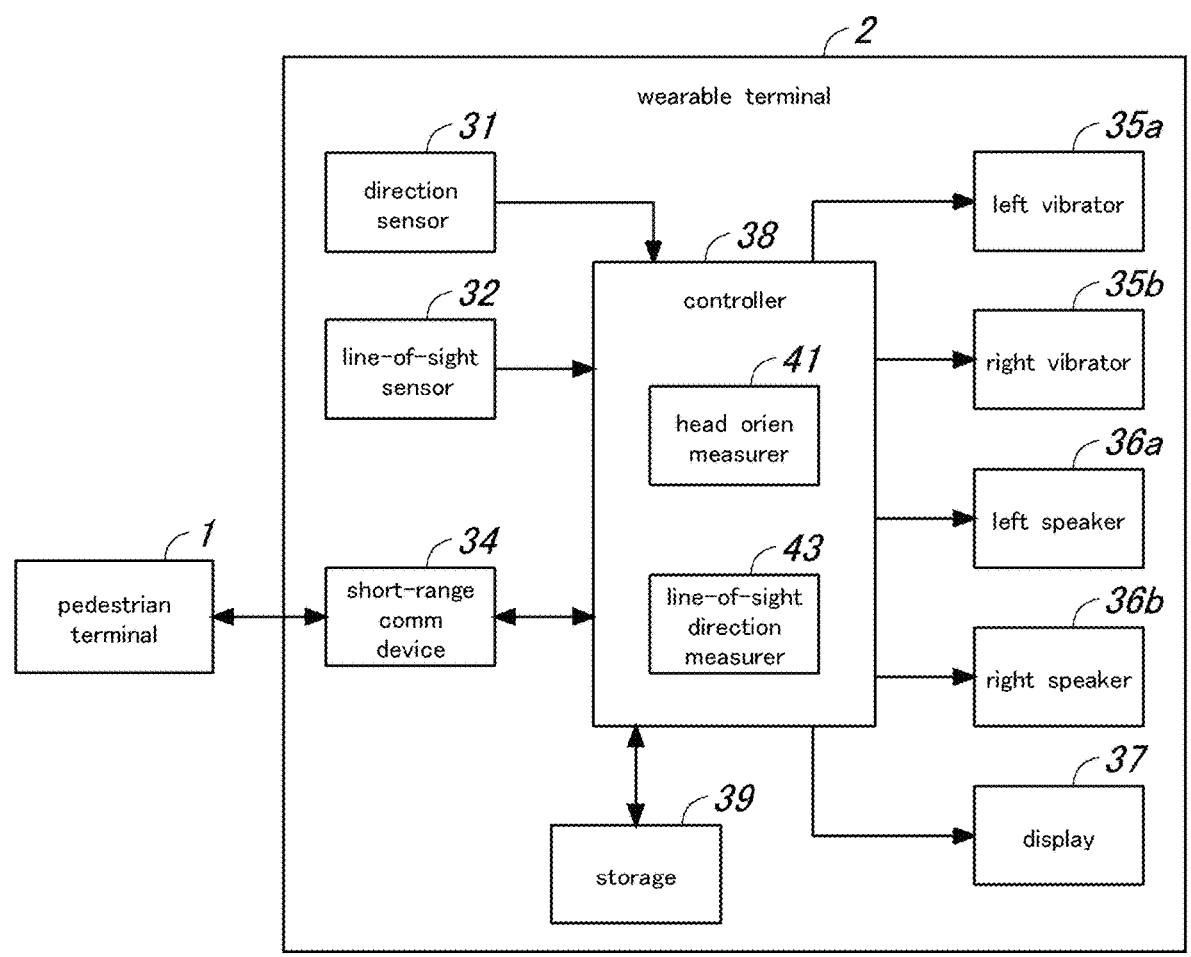
FIG. 21 is a block diagram showing a schematic configuration of a wearable terminal 2 according to the fifth embodiment.

Next, a schematic configuration of a wearable terminal 2 according to the fifth embodiment will be described. FIG. 21 is a block diagram showing a schematic configuration of the wearable terminal 2.

Although the configuration of the wearable terminal 2 is similar to that of the first embodiment (FIG. 4), the wearable terminal 2 of the present embodiment does not include a distance measuring sensor 33.

Based on the control of the pedestrian terminal 1, the vibrators 35a and 35b, the speakers 36a and 36b, and the display 37 are used to perform a sight guidance operation to guide a pedestrian to look in the direction toward the advertisement object, and perform an information presentation operation; that is, present in the pedestrian the advertisement object information associated with the advertisement object which the pedestrian sees.

The controller 38 includes, in addition to the head orientation measurer 41, a line-of-sight direction measurer 43. The line-of-sight direction measurer 43 measures the pedestrian's line-of-sight direction (the coordinates of the viewer's viewpoint) based on a detection result of the line-of-sight sensor 32.

Figure 22:
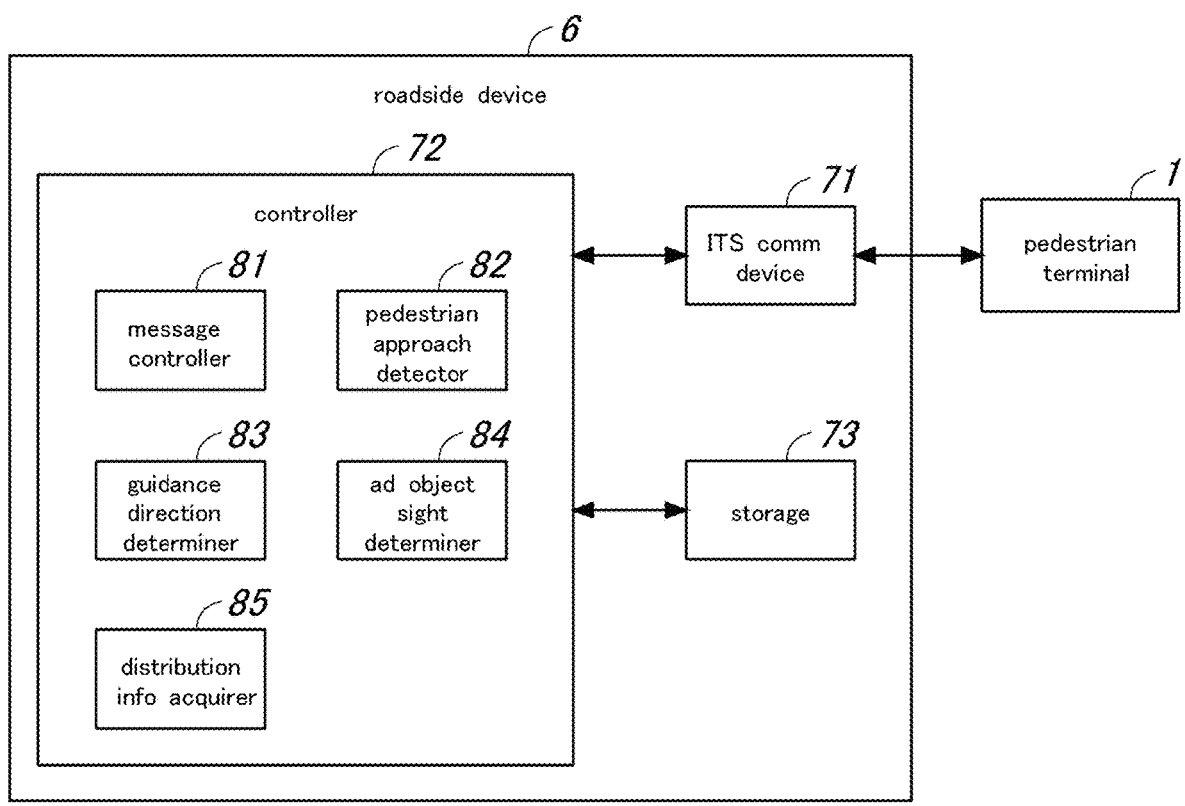
FIG. 22 is a block diagram showing a schematic configuration of a roadside device 6 according to the fifth embodiment.

Next, a schematic configuration of a roadside device 6 according to the fifth embodiment will be described FIG. 22 is a block diagram showing the schematic configuration of the roadside device 6.

The roadside device 6 includes an ITS communication device 71 (communication transceiver), a controller 72, and a storage 73.

The ITS communication device 71 transmits and receives messages to and from the pedestrian terminal 1 through ITS communications (roadside-to-pedestrian communications).

The storage 73 stores information registered in an advertisement object database (See FIG. 24) and programs executable by a processor which implements the controller 72, and other information. The advertisement object database stores information on advertisement objects around the roadside device 6.

The controller 72 includes a message controller 81, a pedestrian approach detector 82, a guidance direction determiner 83, an advertisement object sight determiner 84, and a distribution information acquirer 85. The controller 72 is configured by the processor, and each unit of the controller 72 is implemented by the processor executing a program stored in the storage 73.

The message controller 81 controls the transmission of a message to the pedestrian terminal 1.

The pedestrian approach detector 82 detects that a pedestrian has approached to within a predetermined distance from the vehicle, based on the pedestrian's position data received from the pedestrian terminal 1 and the advertisement object's position data stored in the storage 73.

The guidance direction determiner 83 determines the direction (guidance direction) in which the pedestrian can see the advertisement object, in order to guide the pedestrian so as to look in the direction toward the advertisement object, based on the pedestrian's position data and the pedestrian's head orientation data, and the advertisement object's position data stored in the storage 73. In the present embodiment, the guidance direction determiner 83 determines, as the guidance direction, the direction toward the advertisement object viewed from the pedestrian; that is, to the right direction or the left direction from the pedestrian.

The advertisement object sight determiner 84 determines whether or not a pedestrian sees the advertisement object and identifies which advertisement object the pedestrian sees, based on the pedestrian's position data, the pedestrian's head orientation data and line-of-sight direction information received from the pedestrian terminal 1, and the data in the advertisement object database stored in the storage 73.

The distribution information acquirer 85 acquires advertisement object information on the advertisement object seen by the pedestrian, based on the data in the advertisement object database (See FIG. 24) stored in the storage 73. The roadside device 6 is configured to add the advertisement object information acquired by the distribution information acquirer 85 to an information distribution message and transmit it to the pedestrian terminal 1.

Figure 23:
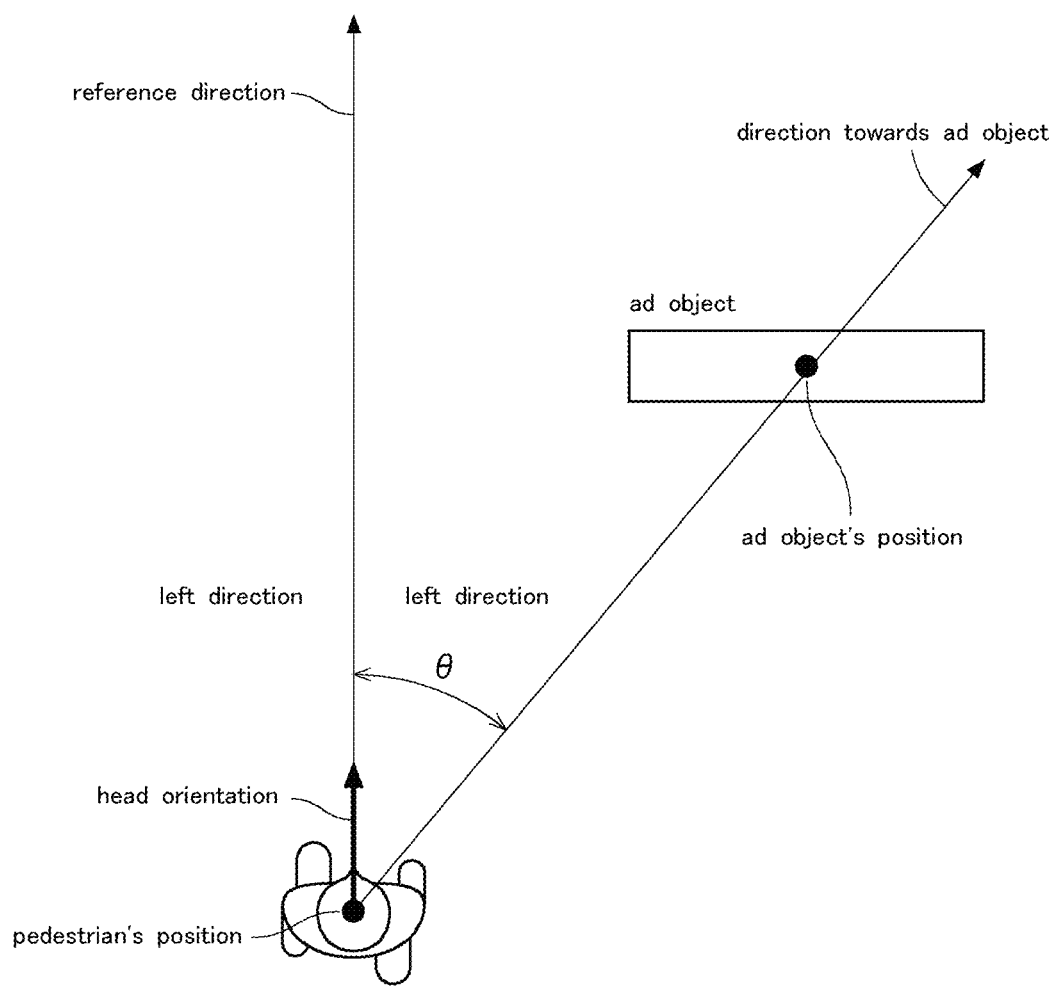
FIG. 23 is an explanatory diagram showing an outline of operations performed by a guidance direction determiner 83 of the roadside device 6 according to the fifth embodiment.

Next, an outline of operations performed by the guidance direction determiner 83 according to the fifth embodiment will be described. FIG. 23 is an explanatory diagram showing an outline of operations performed by the guidance direction determiner 83.

The guidance direction determiner 83 of the roadside device 6 determines the direction (guidance direction) in which the pedestrian can see the advertisement object, in order to guide the pedestrian so as to look in the direction toward the advertisement object, based on the pedestrian's position data and the pedestrian's head orientation data, and the advertisement object's position data. In the present embodiment, the guidance direction determiner 83 determines, as the guidance direction, the direction toward the advertisement object viewed from the pedestrian; that is, to the right direction or the left direction from the pedestrian.

In this determination, the guidance direction determiner 83 acquires the direction toward the advertisement object from the pedestrian based on the position data (latitude, longitude) of the pedestrian and that of the advertisement object. Then, the guidance direction determiner 83 compares the pedestrian's head orientation (face direction); that is, the front direction of the pedestrian, with the direction toward the advertisement object from the pedestrian, to thereby determine whether the advertisement object is present to the right direction or left direction from the pedestrian.

Specifically, the guidance direction determiner 83 defines the pedestrian's head orientation as the reference direction and defines an angle from the reference direction in a clockwise direction as a positive angle. When the angle θ formed by the reference direction and the direction toward the advertisement object is 0 to 180 degrees, the guidance direction determiner 83 determines the advertisement object is present to the right direction from the pedestrian, whereas when that angle θ is 181 to 360 degrees, the guidance direction determiner 83 determines the advertisement object is present to the left direction from the pedestrian.

In the present embodiment, the wearable terminal 2 which the pedestrian wears on the head is used to measure the head orientation of the pedestrian, and using the head orientation as the reference direction, the guidance direction determiner 83 determines the guidance direction. However, the moving direction of a pedestrian may be defined as the reference direction, which is used to determine the guidance direction. In this case, the moving direction may be acquired from the history of the pedestrian's position data.

In the present embodiment, the guidance direction determiner 83 determines, as the guidance direction, to which an advertisement object is present from the pedestrian, to the right direction or the left direction. However, the guidance direction may be determined as more subdivided guidance directions. For example, the guidance directions to be determined may be subdivided into four directions: front right direction, rear right direction, front left direction, and rear left direction. The subdivided guidance directions to be determined may further include front direction, right and left directions, and back direction. Furthermore, for example, in the cases where there is a large height difference between the pedestrian and the advertisement object (e.g., when the advertisement object is installed on the roof of a building or when the advertisement object is across a steep slope), the subdivided guidance directions to be determined may further include upward and downward directions.

In the present embodiment, the position data of an advertisement object is stored in the storage 73 in the roadside device 6, and the direction toward the advertisement object from the pedestrian is determined as the guidance direction. In other embodiments, the system may be configured such that, when an advertisement object is installed near the roadside device 6 and thus the direction toward the advertisement from the pedestrian is substantially in line with the direction toward the roadside device 6, the guidance direction determiner 83 determines the direction toward the roadside device 6 from the pedestrian as the guidance direction.

Next, operations performed by the sight guidance controller 24 of the pedestrian terminal 1 according to the fifth embodiment will be described. The operations performed by the sight guidance controller 24 are the same as those of the first embodiment as shown in FIG. 7.

The sight guidance controller 24 of the pedestrian terminal 1 controls a sight guidance operation of the wearable terminal 2 based on sight guidance information received from the roadside device 6. The sight guidance information includes information on the direction toward the advertisement object which a pedestrian sees, that is, the direction toward the advertisement object viewed from the pedestrian; that is, to the right direction or the left direction from the pedestrian. Based on the sight guidance information, the sight guidance controller 24 causes the wearable terminal 2 to perform a sight guidance operation, urging the pedestrian to look in either the left or right direction.

In the present embodiment, as a sight guidance operation, the wearable terminal 2 may cause either the left or right vibrator 35*a* or 35*b* to operate as shown in FIGS. 7A-1 and 7A-2. Specifically, when the advertisement object is present in the left direction, the wearable terminal 2 causes the left vibrator 35*a* to operate, encouraging the pedestrian to look in the left direction. When the advertisement object is present in the right direction, the wearable terminal 2 causes the right vibrator 35*b* to operate, encouraging the pedestrian to look in the right direction.

In the present embodiment, as a sight guidance operation, the wearable terminal 2 may cause either the left or right speaker 36*a* or 36*b* to output a notification sound as shown in FIGS. 7B-1 and 7B-2. Specifically, when the advertisement object is present in the left direction, the wearable terminal 2 causes the left speaker 36*a* to output a notification sound (sound effect), encouraging the pedestrian to look in the left direction. When the advertisement object is present in the right direction, the wearable terminal 2 causes the right speaker 36*b* to output the notification sound, encouraging the pedestrian to look in the right direction.

In the present embodiment, as a sight guidance operation, the wearable terminal 2 may display either a leftward arrow or a rightward arrow on the display 37 of the wearable terminal 2 as shown in FIGS. 7C-1 and 7C-2. Specifically, when the advertisement object is present in the left direction, the wearable terminal 2 displays the leftward arrow of the display 37, encouraging the pedestrian to look in the left direction. When the advertisement object is present in the right direction, the wearable terminal 2 displays the rightward arrow on the display 37, encouraging the pedestrian to look in the right direction. The display 37 is a transparent display through which the pedestrian can view an actual landscape, and the image of the arrow is overlay-displayed (superimposed) on the actual landscape.

Although in the present embodiment, the wearable terminal 2 is configured to cause either the speaker 36a or 36b to output the notification sound (sound effect), the wearable terminal 2 may be configured to cause either the speaker 36a or 36b to output human speech sound such as "a convenience store is present in the right direction."

The sight guidance operation to be performed may be changed according to a change in the positional relationship between a pedestrian and an advertisement object. For example, when the pedestrian is located away from the advertisement object, the wearable terminal 2 may perform sight guidance operations such that the vibration of the vibrators 35a and 35b is reduced, the notification sound output from the speakers 36a and 36b is turned down, and the size of the display image on the display 37 is reduced, and when the pedestrian is located near the advertisement object, the wearable terminal 2 may perform sight guidance operations such that the vibration of the vibrators 35a and 35b is increased, the notification sound output from the speakers 36a and 36b is turned up, and the size of the display image on the display 37 is increased. In addition, the wearable terminal 2 may perform sight guidance operations such that, as the pedestrian moves to approach the advertisement object, the vibration of the vibrators 35a and 35b is gradually increased, the notification sound output from the speakers 36a and 36b is gradually turned up, and the size of the display image on the display 37 is gradually increased accordingly. In this case, the pedestrian terminal may store and accumulate the position data of the pedestrian for a predetermined period as position history information, and, based on the position history information, determine the change in the positional relationship between the pedestrian and the advertisement object.

Next, operations performed by the advertisement object sight determiner 84 and the distribution information acquirer 85 of the roadside device 6 according to the fifth embodiment will be described. FIG. 24 is an explanatory diagram showing an advertisement object database stored in the storage 73 of the roadside device 6.

The advertisement object sight determiner 84 of the roadside device 6 determines whether or not a pedestrian sees the advertisement object and identifies which advertisement object the pedestrian sees, based on the pedestrian's position data, the pedestrian's head orientation data, and the line-of-sight direction information received from the pedestrian terminal 1, and data in the advertisement object database stored in the storage 73.

FIG. 24 shows an example of an advertisement object database of the roadside device 6 installed near a store, and contains information on a plurality of advertisement objects (such as sign boards, posters, banner-flags, banners, and hanging banners) provided at the store. Specifically, the advertisement object database contains, for each advertisement object, the advertisement object ID, the position data (latitude, longitude), the head orientation (head direction), and the coordinates of the viewer's viewpoint (the line-of-sight direction) of the pedestrian. Using the advertisement object database, the roadside device 6 can identify the advertisement object which the pedestrian sees on the basis of the pedestrian's position data, the pedestrian's head orientation and coordinates of the viewer's viewpoint, and when no such advertisement object is identified, the roadside device 6 determines that the pedestrian does not see any advertisement object.

In the advertisement object database, the pedestrian's position data (latitude, longitude) is defined by an area in which the pedestrian is located. Also, the pedestrian's head orientation (head direction) is defined by an angle range of orientation, and the coordinates of the viewer's viewpoint (the line-of-sight direction) are defined in the XY orthogonal coordinate system.

The distribution information acquirer 85 of the roadside device 6 acquires advertisement object information associated with the advertisement object which the pedestrian sees, based on the data in the advertisement object database. The advertisement object database includes, for each advertisement object, a website address (URL) where corresponding advertisement object information is available. By using the advertisement object database, the distribution information acquirer 85 can acquire the corresponding advertisement object information from a management server (not shown) for managing advertisement object information associated with the advertisement object which the pedestrian sees.

In the present embodiment, the advertisement object sight determiner 84 determines whether or not a pedestrian sees the advertisement object based on the data in the advertisement object database. In other embodiments, in order to determine whether or not a pedestrian sees an advertisement object, the advertisement object sight determiner 84 may determine whether or not the line of sight of a pedestrian crosses the advertisement object based on the pedestrian's position data, the pedestrian's head orientation data and the line-of-sight direction information, and the position data of the advertisement object stored in the storage 73.

In some cases, even when the line-of-sight of the pedestrian is directed to an advertisement object, the pedestrian may look at another object located on the near side of the advertisement object or one located beyond the advertisement object. In this view, the system may be configured such that the wearable terminal 2 is provided with a distance measuring sensor to measure the distance (viewer-to-target distance) from a viewpoint of the pedestrian to an object (target object) which the pedestrian sees, and the advertisement object sight determiner 84 determines that the pedestrian sees an advertisement object only when the viewer-to-target distance is the same as the distance from the pedestrian to the advertisement object.

In such cases, the distance measuring sensor, whose detection direction is adjustable, may be used such that, after the detection direction of the sensor is adjusted so as to be in line with the line-of-sight direction of the pedestrian, based on the line-of-sight direction detected by the line-of-sight sensor 32, the distance measuring sensor 33 detects the distance to the opposite object to thereby accurately measure the viewer-to-target distance to the object which the pedestrian sees.

Next, an operation procedure of the pedestrian terminal 1 according to the fifth embodiment will be described. FIG. 25 is a flow chart showing the operation procedure of the pedestrian terminal 1.

In the pedestrian terminal 1, first, as shown in FIG. 25A, the message controller 21 acquires the position data (latitude, longitude) of the pedestrian terminal 1 from the positioner 11 (ST101). Then, the pedestrian terminal 1 acquires head orientation information from the wearable terminal 2, the head orientation information being measured by the head orientation measurer 41 of the wearable terminal 2 based on the detection result of the direction sensor 31 (ST102). Then, the message controller 21 transmits a normal status message from the ITS communication device 12 to the roadside device 6 (ST103). The normal status message includes the terminal ID and position data and head orientation data of the pedestrian terminal 1.

Next, in the pedestrian terminal 1, as shown in FIG. 25B, when the ITS communication device 12 receives a sight guidance message from the roadside device 6 (Yes in ST104), the sight guidance controller 24 controls the wearable terminal 2 such that the wearable terminal 2 performs a sight guidance operation for the pedestrian (ST105). The sight guidance message includes the terminal ID of the pedestrian terminal 1 and guidance direction information. In this case, the sight guidance controller 24 determines whether or not the message is transmitted to the pedestrian terminal 1 based on the terminal ID, and then causes the wearable terminal 2 to perform the sight guidance operation according to the guidance direction information.

As a sight guidance operation, the sight guidance controller 24 controls the wearable terminal 2 so as to cause either the left or right vibrator 35a or 35b to operate, cause either the left or right speaker 36a or 36b to output a notification sound (sound effect), or cause the wearable terminal 2 to display either a leftward arrow or a rightward arrow on the display 37.

Next, the message controller 21 acquires head orientation information from the wearable terminal 2, the head orientation information being measured by the head orientation measurer 41 based on the detection result of the direction sensor 31 (ST106). Then, the message controller 21 acquires line-of-sight direction information from the wearable terminal 2, the line-of-sight direction information being measured by the line-of-sight measurer 43 based on the detection result of the line-of-sight sensor 32 of the wearable terminal 2 (ST107). Then, the message controller 21 transmits a sight status report message from the ITS communication device 12 to the roadside device 6 (ST108). The sight status report message includes the terminal ID of the pedestrian terminal 1, and the pedestrian terminal's position data and sight status information (the pedestrian's head orientation data and the line-of-sight information).

The pedestrian terminal 1 periodically transmits sight status report messages until a predetermined time elapses after receiving a sight guidance message from the roadside device 6. After the predetermine time elapses, messages transmitted from the pedestrian terminal 1 return to normal status messages which do not include line-of-sight direction information.

In the present embodiment, a normal status message includes head orientation information. However, a normal status message may be formed to include, in addition to head orientation information, line-of-sight direction information. In this case, a normal status message is also used as a sight status report message.

Next, in the pedestrian terminal 1, as shown in FIG. 25C, when the ITS communication device 12 receives an information distribution message from the roadside device 6 (Yes in ST109), the information presentation controller 25 controls the wearable terminal 2 such that the wearable terminal 2 performs an information presentation operation to a pedestrian (ST110). The information distribution message includes the terminal ID of the pedestrian terminal 1 and advertisement object information. The pedestrian terminal 1 determines whether or not the message is transmitted to the pedestrian terminal 1 based on the terminal ID, and then causes the wearable terminal 2 to perform the information presentation operation; that is, present the advertisement object information included in the message to the pedestrian. More specifically, the wearable terminal 2 causes the left and right speakers 36a and 36b to output a speech sound containing the advertisement object information and displays a screen including the advertisement object information on the display 37.

Separately from this operation flow, the pedestrian terminal 1 also performs an alert operation based on the collision determination. Specifically, the roadside device 6 detects a vehicle by radar and transmits a message including the position data of the vehicle to the pedestrian terminal 1. Upon receiving the message from the roadside device 6, the pedestrian terminal 1 performs collision determination based on the position data of the vehicle and the position data of the pedestrian terminal (pedestrian) to thereby determine if there is a risk of collision between the pedestrian and the vehicle. When there is a risk of collision between the pedestrian and the vehicle, the pedestrian terminal 1 causes the wearable terminal 2 to perform an alert operation.

Next, an operation procedure of the roadside device 6 according to the fifth embodiment will be described. FIG. 26 is a flow chart showing the operation procedure of the roadside device 6.

Figure 26B:
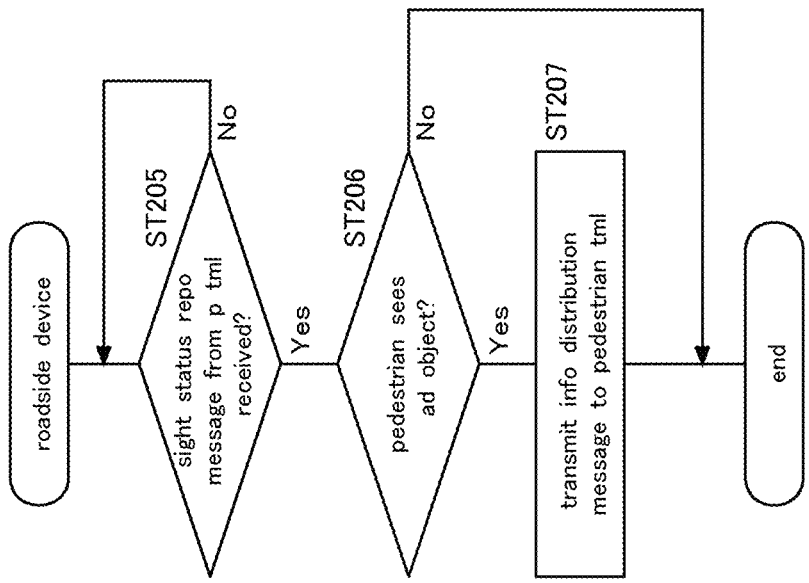
FIG. 26A and FIG. 26B show flow charts of an operation procedure of the roadside device 6 according to the fifth embodiment.
Figure 26A:
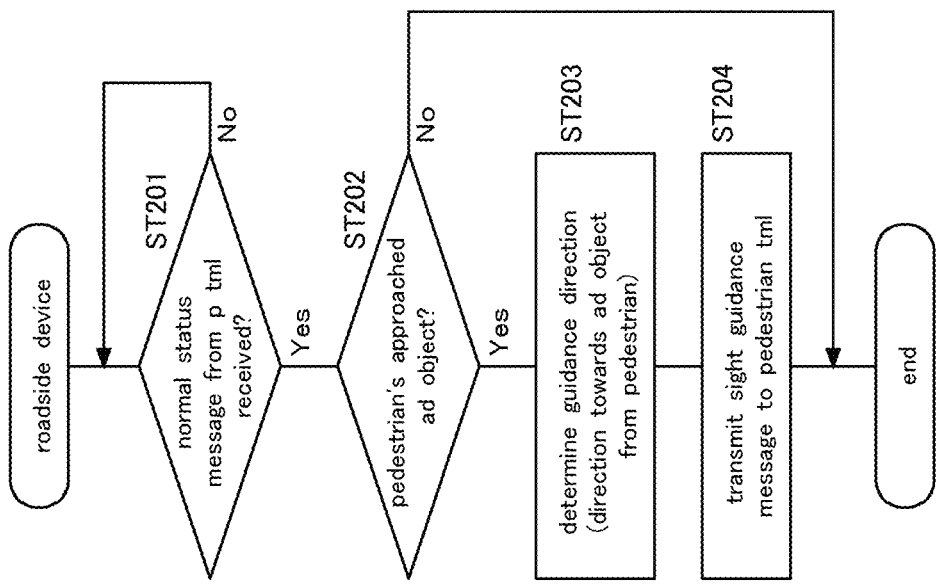

In the roadside device 6, first, as shown in FIG. 26A, when the ITS communication device 71 receives a normal status message from a pedestrian terminal (ST201), the pedestrian approach detector 82 determines whether or not the pedestrian approaches to within a predetermined distance (e.g., 10 m) from the advertisement object. (ST202). The normal status message includes the terminal ID, the pedestrian terminal's position data and the pedestrian's head orientation data. The pedestrian approach detector 82 determines, based on the position data of the pedestrian included in the message and that of the advertisement object stored in the storage 73, whether or not the pedestrian approaches to within the predetermined distance from the advertisement object.

When the pedestrian approach detector 82 determines that the pedestrian does not approach to within the predetermined distance from the advertisement object (No in ST202), the operation ends.

When the pedestrian approach detector 82 determines that the pedestrian approaches to within the predetermined distance from the advertisement object (Yes in ST202), the guidance direction determiner 83 determines the direction (guidance direction; right direction or left direction) in which the pedestrian can see the advertisement object, based on the pedestrian's position data and the pedestrian's head orientation data included in the received message, and the position data of the advertisement object stored in the storage 73 (ST203).

Next, the message controller 81 causes the ITS communication device 71 to transmit a sight guidance message to the pedestrian terminal 1 (ST204). The sight guidance message includes the terminal ID of the pedestrian terminal 1 to be notified, and guidance direction information (a result of the determination operation performed by the guidance direction determiner 83).

Next, in the roadside device 6, as shown in FIG. 26B, when the ITS communication device 71 receives a sight status report message from the pedestrian terminal 1 (ST205), the vehicle sight determiner 84 determines whether or not a pedestrian sees the advertisement object (ST206). The sight status report message includes the terminal ID and the position data of the pedestrian terminal and the pedestrian's head orientation data, and the line-of-sight direction information. The vehicle sight determiner 84 determines whether or not the pedestrian sees the advertisement object based on the position data of the pedestrian terminal 1, the pedestrian's head orientation data and the line-of-sight direction information, and the position data of the advertisement object stored in the storage 73.

When the vehicle sight determiner 84 determines that the pedestrian does not see the advertisement object (No in ST206), the operation ends.

When the vehicle sight determiner 84 determines that the pedestrian sees the advertisement object (Yes in ST206), the message controller 81 causes the ITS communication device 71 to transmit an information distribution message to the pedestrian terminal 1 (ST207). The information distribution message includes the terminal ID of the pedestrian terminal 1 to be notified, and the advertisement object information associated with the advertisement object which the pedestrian sees. In this case, the distribution information acquirer 85 acquires the advertisement information associated with the advertisement object which the pedestrian sees, based on the data in the advertisement database (see FIG. 24) stored in the storage 73.

The advertisement object information to be delivered to the pedestrian terminal 1 may be changed according to a change in the positional relationship between a pedestrian and an advertisement object. For example, when the pedestrian is located away from the advertisement object, the roadside device 6 may deliver simple advertisement object information to the pedestrian terminal 1, and when the pedestrian is located near the advertisement object, the roadside device 6 may deliver detailed one to the pedestrian terminal 1. In particular, the roadside device 6 may be configured such that, the closer to the advertisement object comes, the more detailed information the roadside device 6 delivers to the pedestrian terminal 1. In this case, the pedestrian terminal may store and accumulate the position data of the pedestrian for a predetermined period as position history information, and, based on the position history information, determine the change in the positional relationship between the pedestrian and the advertisement object.

The roadside device 6 may change advertisement object information to be delivered to the pedestrian terminal 1 according to the pedestrians' attributes (e.g., elderly person, children). In this case, the roadside device 6 may be configured such that the storage 73 stores a table including preset advertisement object information corresponding to each pedestrians' attribute, and the roadside device 6 selects advertisement object information to be delivered to the pedestrian terminal 1 according to the pedestrians' attribute included in a message transmitted from the pedestrian terminal 1.

The roadside device 6 may change information to be delivered to the pedestrian terminal 1 according to the situation around the pedestrian. For example, the roadside device 6 may be configured such that, when the pedestrian is in a normal situation, the roadside device 6 delivers to the pedestrian terminal 1 advertisement object information associated with the advertisement object which the pedestrian sees, and when the pedestrian is involved in a disaster such as an earthquake, the roadside device 6 delivers, instead of advertisement object information, evacuation information regarding evacuation routes (the routes from the current position of the pedestrian to an evacuation center).

The roadside device 6 may change information to be delivered to the pedestrian terminal 1 according to both the situation around the pedestrian and the attribute of the pedestrian (e.g., a healthy person, a dementia patient, an elderly person). For example, in cases where the roadside device 6 can to deliver evacuation information including evacuation routes to a pedestrian when the pedestrian is involved in a disaster, the roadside device 6 may be configured to provide different evacuation routes to a dementia patient or an elderly person and to a healthy person. More specifically, for a dementia patient and the elderly, the roadside device 6 provides evacuation routes which do not include difficult roads to walk (such as steep slopes, stepped roads, gravel roads). In other embodiments, the roadside device 6 may be configured to guide a dementia patient or an elderly person to locations such as home, a bus stop, a hospital, and a welfare facility as necessary.

The roadside device 6 may change information to be delivered to the pedestrian terminal 1 according to the weather condition or other environmental condition. For example, the roadside device 6 may be configured such that, during or immediately after a rainfall, the roadside device 6 delivers to pedestrians information including evacuation routes which do not include places where puddles are likely to be created, and that during or immediately after a snowfall, the roadside device 6 delivers to pedestrians information including evacuation routes which do not include places where snow is difficult to melt or where ice covered surfaces are likely to formed, on which persons can easily slip and fall.

In addition to delivering information to the pedestrian terminal 1 and using the wearable terminal 2 and the pedestrian terminal 1 to present the information to the pedestrian, the roadside device 6 may cooperate with a system for controlling a digital signage display installed on the road, such that digital signage display located near the pedestrian can be used to present information to the pedestrian. In this case, the digital signage display may be configured to have a visible light communication function so that, by using visible light communications, the digital signage display can present to the pedestrian a website address (URL) where detailed information such as evacuation information is available. This configuration can be useful particularly for the elderly people.

Delivery of information from the roadside device 6 to a pedestrian terminal 1 can also be utilized to prevent children and wandering of elderly people from getting lost. For example, the roadside device 6 may be configured to acquire the position data of a person receiving protection (protected person such as a child or an elderly person) from the pedestrian terminal 1 carried by the protected person, and deliver the position data to the pedestrian terminal carried by a protector or carer, thereby enabling the protector or carer to confirm the current position or movement path of the protected person.

More specifically, when a protected person's pedestrian terminal 1 approaches the roadside device 6, the protected person's pedestrian terminal 1 transmits the protected person's information (such as user ID and position history information) to the roadside device 6. The protected person's pedestrian terminal 1 may also transmit to the roadside device 6 information records of the orientation of the protected person, in addition to the user ID and position history information. A protector's pedestrian terminal 1 can transmit to the roadside device 6 the user ID of the protected person in order to search the protected person. Then, when determining a match between the user ID of the protected person from the protected person's pedestrian terminal 1 and the ID from the protector's pedestrian terminal 1, the roadside device 6 transmits the protected person's information (such as the user ID and position history information) to the protector's pedestrian terminal 1. The roadside device 6 may also transmit information records of the orientation of the protected person to the protector's pedestrian terminal 1. This enables the protector to confirm the current position and the movement path of the protected person. Moreover, the roadside device 6 transmits the protector's information (such as position data) to the protected person's pedestrian terminal 1. This enables the protected person to confirm the current position of the protector.

Sixth Embodiment

Figure 27:
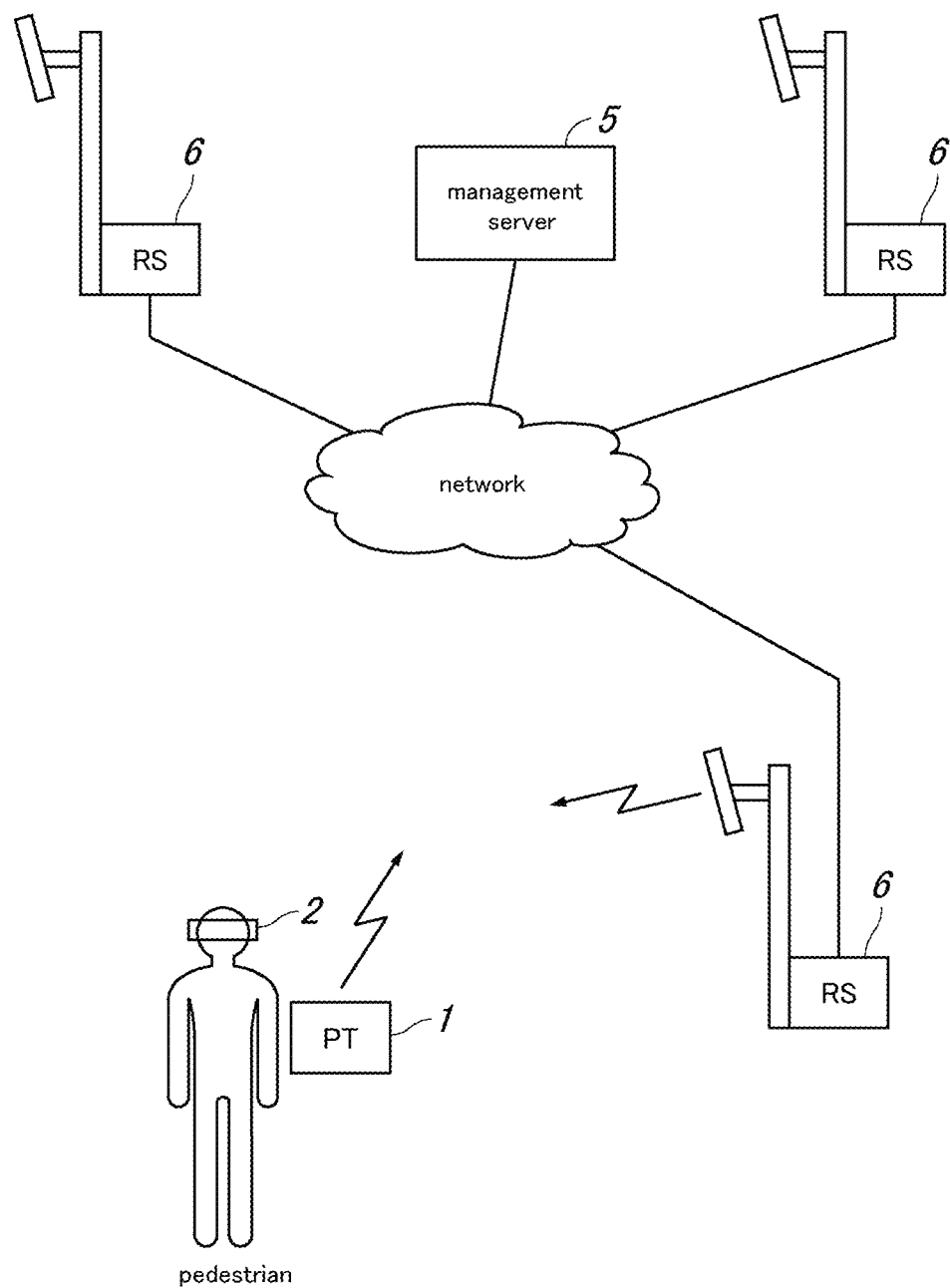
FIG. 27 is a diagram showing a general configuration of an information distribution system according to a sixth embodiment of the present invention.
Figure 28:
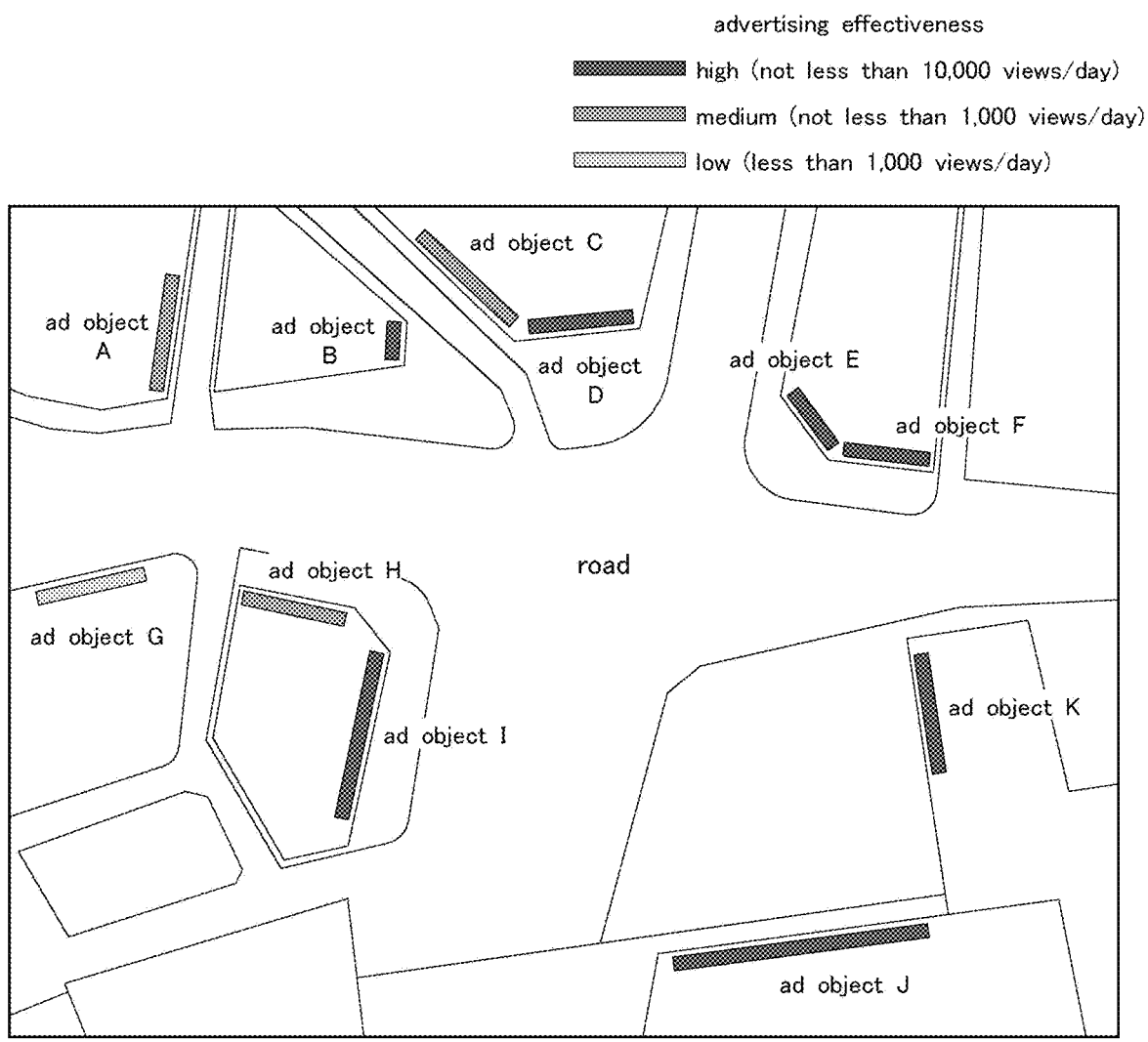
FIG. 28 is an explanatory diagram showing an example of analysis results according to the sixth embodiment.

Next, a sixth embodiment of the present invention will be described. Except for what will be discussed here, the sixth embodiment is the same as the above-described embodiments. FIG. 27 is a diagram showing a general configuration of an information distribution system according to the sixth embodiment. FIG. 28 is an explanatory diagram showing an example of analysis results according to the sixth embodiment.

In the above-described embodiments, the pedestrian device is configured to perform a sight guidance operation so as to urge a pedestrian to look in the direction toward an advertisement object. In this case, when a pedestrian sees an advertisement object in response to the sight guidance, the advertisement object is considered to achieve an advertising effect (impression effect). In particular, a place where pedestrians frequently see an advertisement object can be regard as an area with high advertising effectiveness. Thus, such systems can be used to measure advertising effectiveness (view rate of advertisement).

In the present embodiment, as shown in FIG. 27, the system is configured to include a management server 5 (analyzer) for analyzing behavior of a pedestrian in response to a sight guidance operation. When a pedestrian looks at the advertisement object in response to a sight guidance operation, the management server 5 stores and accumulates the position data of the pedestrian and the ID of the advertisement object in a storage so that the management server 5 can perform aggregate analysis on the data to determine the rate of the pedestrians' views in response to sight guidance for each advertisement object, thereby identifying advertisement objects with high advertising effectiveness.

More specifically, when detecting that a pedestrian sees an advertisement object in response to a sight guidance, the roadside device 6 transmits the position data of the pedestrian and the ID information data of the advertisement object (advertisement object ID) to the management server 5. The roadside device 6 and the management server 5 may communicate with each other using network communications.

The management server 5 receives information from the roadside device 6; that is, the position data of the pedestrian who has looked at the advertisement object in response to a sight guidance, and stores the position data in a database, so that the management server 5 can perform analysis (statistical processing operations) on the data in the database at an appropriate time. The analysis involves, for example, counting, for each advertisement object, the number of times which pedestrians view the advertisement object in response to sight guidance (advertisement view number) in a predetermined period, and comparing the advertisement view number with a predetermined threshold value, to thereby evaluate advertising effectiveness of the advertisement object.

In this way, as shown in FIG. 28, an analysis result including the advertising effectiveness for each advertisement object can be presented to a user. In the example shown in FIG. 28, the advertising effectiveness is evaluated in three levels; that is, high, medium, and low, and the position of each advertisement object is indicated on the map of an area where the advertisement object is installed. Moreover, the respective levels of advertising effectiveness of advertisement objects are indicated in different colors.

Furthermore, in cases where, after looking at an advertisement object in response to a sight guidance, a pedestrian enters a store associated with the advertisement object and purchases a product in the store, the advertisement object can be considered to have a high level of advertising effectiveness (effects of increasing views, or response). In this way, the system can evaluate advertising effectiveness of an advertisement object.

In this view, in the present embodiment, the management server can perform aggregate analysis to determine how frequently the pedestrian takes specific actions (entering the store, purchasing a product) after viewing an advertisement object in response to sight guidance, to thereby evaluate advertising effectiveness of the advertisement object.

In this case, the management server 5 may be configured to detect that a pedestrian sees an advertisement object in response to sight guidance and then enters a store, based on the pedestrian's position data acquired from the pedestrian terminal 1 and the position data of the store. Also, the management server 5 may be configured such that, when a customer makes a purchase in the store, the server 5 acquires the customer ID of the customer from the customer's smartphone or IC card, so that, by using information which associates each customer ID to a corresponding a pedestrian's terminal ID (pedestrian ID), the management server 5 can acquire the terminal ID of the pedestrian terminal carried by the pedestrian who has made a purchase. In this way, the management server 5 can detect that a pedestrian who has seen an advertisement object in response to sight guidance, and then purchased a product.

Furthermore, a result of aggregate analysis to determine the rate of the pedestrians' views in response to sight guidance for each advertisement object, can be used for marketing in shopping malls or other shopping facilities. For example, by using an analysis result, a shopping mall or such a facility can attract more customers by placing a shop whose advertisement has the higher rate of the pedestrians' views at a location where a lot of people pass.

Seventh Embodiment

Next, a seventh embodiment of the present invention will be described. Except for what will be discussed here, the seventh embodiment is the same as the above-described embodiments. FIG. 29 is a diagram showing a general configuration of an information distribution system according to the seventh embodiment.

In the above-described embodiment, a stationary advertisement object is used, and the roadside device 6 installed near the stationary advertisement object delivers advertisement object information associated with the advertisement object to a pedestrian terminal 1. However, in the present embodiment, an advertisement vehicle is used, and an in-vehicle terminal 3 mounted in the advertisement vehicle delivers advertisement vehicle information to a pedestrian terminal 1.

Specifically, when an advertisement vehicle approaches a pedestrian, the system guides the pedestrian to look in the direction toward the advertisement vehicle, and when the pedestrian sees the advertisement vehicle in response, the system presents advertisement vehicle information associated with the advertisement vehicle to the pedestrian.

Figure 30:
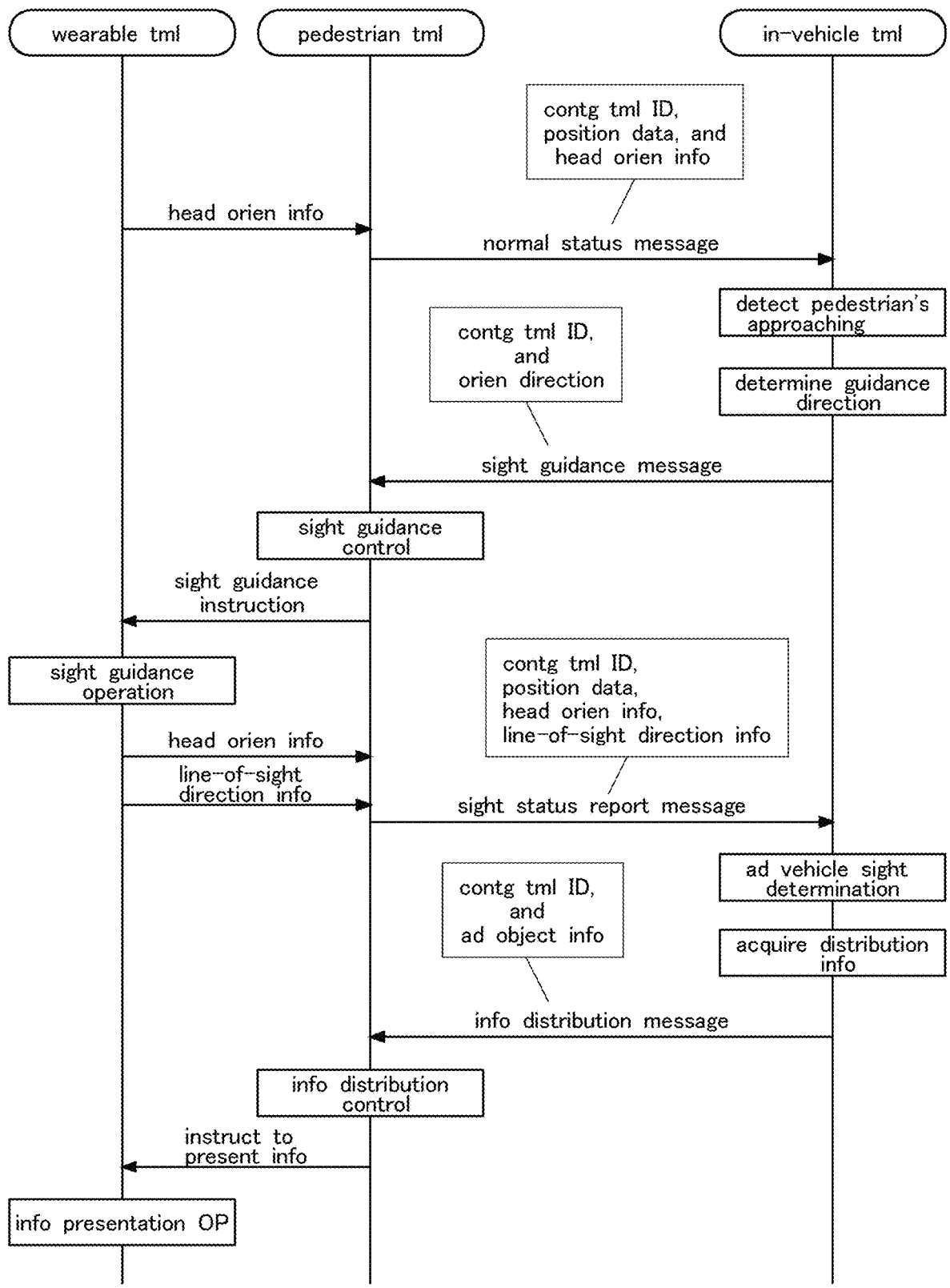
FIG. 30 is a sequence diagram showing an outline of the operation procedure of the information distribution system according to the seventh embodiment.

Next, an outline of the operation procedure of the information distribution system according to the seventh embodiment will be described. FIG. 30 is a sequence diagram showing an outline of the operation procedure of the information distribution system.

The pedestrian terminal 1 first transmits a normal status message to the in-vehicle terminal 3 through pedestrian-to-vehicle communications. Such a normal status message includes a terminal ID and position data (latitude, longitude) of the pedestrian terminal, and pedestrian's head orientation data acquired by the wearable terminal 2.

When receiving a normal status message from the pedestrian terminal 1 through pedestrian-to-vehicle communications, the in-vehicle terminal 3 determines whether or not the pedestrian has approached to within a predetermined distance (e.g., 10 m) from the vehicle (pedestrian's approaching detection) based on the position data of the pedestrian included in the message and that of the vehicle measured by the in-vehicle terminal. When the in-vehicle terminal 3 determines that the pedestrian has approached to within the predetermined distance from the vehicle, the in-vehicle terminal 3 determines the direction (guidance direction) in which the pedestrian can see the vehicle (guidance direction determination) based on the pedestrian's position data, the vehicle's position data, and the pedestrian's head orientation data included in the received message.

Next, the in-vehicle terminal 3 transmits a sight guidance message to the pedestrian terminal 1 through pedestrian-to-vehicle communications. The sight guidance message includes the terminal ID of the pedestrian terminal 1 to be notified, and a result of the guidance direction determination, i.e., guidance direction information.

Upon receiving the sight guidance message transmitted from the in-vehicle terminal 3 through pedestrian-to-vehicle communications, the pedestrian terminal 1 controls the wearable terminal 2 based on the guidance direction information included in the message so that the wearable terminal 2 performs a sight guidance operation to guide the pedestrian to look in the direction toward the vehicle. In the present embodiment, the wearable terminal 2 notifies the pedestrian of the direction toward the vehicle by the sight guidance operation, such as one using voice, vibration, or image display.

Next, the pedestrian terminal 1 transmits a sight status report message to the in-vehicle terminal 3 through pedestrian-to-vehicle communications. The sight status report message includes the terminal ID and position data of the pedestrian terminal 1 and sight status information (the pedestrian's head orientation data and the viewer-to-target distance) acquired by the wearable terminal 2.

When receiving the sight status report message from the pedestrian terminal 1 through pedestrian-to-vehicle communications, the in-vehicle terminal 3 determines whether or not the pedestrian sees the vehicle (vehicle sight determination) based on the position data of the pedestrian terminal 1, the pedestrian's head orientation and the viewer-to-target distance included in the message, and the position data of the in-vehicle terminal 3.

Next, when the pedestrian does not see the advertisement vehicle, the in-vehicle terminal 3 transmits an information distribution message to the pedestrian terminal 1 through roadside-to-pedestrian communications. The information distribution message includes the terminal ID of the pedestrian terminal 1 to be notified and advertisement vehicle information associated with the advertisement vehicle which the pedestrian sees. When the pedestrian does not see the advertisement vehicle, the in-vehicle terminal 3 transmits no information distribution message.

When receiving the information distribution message from the in-vehicle terminal 3 through roadside-to-pedestrian communications, the pedestrian terminal 1 controls the wearable terminal 2 based on the advertisement vehicle information included in the message so that the wearable terminal 2 performs an information presentation operation to thereby present the advertisement vehicle information included in the message, to the pedestrian.

Furthermore, the present embodiment is applicable to configurations in which a taxi is used in place of an advertisement vehicle. In this case, an in-vehicle terminal 3 in the taxi transmits information indicating the taxi is an empty car to the pedestrian terminal 1. The present embodiment is also applicable to configurations in which a bus is used. In this case, an in-vehicle terminal 3 in the bus transmits information indicating the destination of the bus or the bus stops the bus will make stops, to the pedestrian terminal 1. This configuration is particularly beneficial in cases where there are buses whose destinations are different and the bus to ride is difficult for a user to find.

Such a pedestrian-to-vehicle communication system as the present embodiment may be configured to include a management server 5 (analyzer) for analyzing a pedestrian's action in response to sight guidance, in the same manner as the sixth embodiment. In this case, the management server 5 may collect information on a pedestrian who has viewed an advertisement vehicle in response to sight guidance therefor, from the in-vehicle terminal 3. The in-vehicle terminal 3 may transmit information to the management server 5 via the roadside device 6.

Specific embodiments of the present invention are described herein for illustrative purposes. However, the present invention is not limited to those specific embodiments, and various changes, substitutions, additions, and omissions may be made for elements of the embodiments without departing from the scope of the invention. In addition, elements and features of the different embodiments may be combined with each other to yield an embodiment which is within the scope of the present invention.

INDUSTRIAL APPLICABILITY

A pedestrian device a communication device, and an information distribution method according to the present invention can present information associated with a target object located on or around a road, to a pedestrian at an appropriate time and such that the information includes appropriate information for the pedestrian's status, and are useful as a pedestrian device carried by a pedestrian, a communication device installed near a target object (a target to be paid attention to), the target object being on or around a road, for delivering target object information, and an information distribution method by which target object information is delivered from a communication device to a pedestrian device.

GLOSSARY 1 pedestrian terminal (pedestrian device)
2 wearable terminal (wearable device)
3 in-vehicle terminal (communication device, in-vehicle device)

5 management server (analyzer)
6 roadside device (communication device)
11 positioner
12 ITS communication device (communication transceiver)
13 short-range communication device (short-range communication transceiver)
14 controller
15 storage
31 direction sensor
32 line-of-sight sensor
33 distance measuring sensor
34 short-range communication device (short-range communication transceiver)
35a, 35b vibrator
36a, 36b speaker
37 display
38 controller
39 storage
51 positioner
52 TS communication device (communication transceiver)
54 controller
55 storage
71 TS communication device (communication transceiver)
72 controller
73 storage

The invention claimed is:

1. A pedestrian device, comprising:
a communication transceiver configured to communicate with a communication device which transmits information of a target object to be paid attention by a pedestrian; and
a controller,
wherein the controller is configured to cause the communication transceiver to transmit position data of the pedestrian to the communication device;
wherein the communication device is configured to transmit guidance direction information to the communication transceiver when the pedestrian approaches to within a predetermined distance from the target object;
wherein, when the communication transceiver receives the guidance direction information transmitted from the communication device, the controller is configured to
perform control based on the guidance direction information so as to guide the pedestrian to look in a direction toward the target object; and
acquire sight status information on a sight status of the pedestrian, and cause the communication transceiver to transmit the sight status information to the communication device; and
wherein, when the communication device transmits, based on the sight status information, target object information on the target object to the communication transceiver, and then the communication transceiver receives the target object information, the controller performs control so as to present the target object information to the pedestrian.

2. The pedestrian device according to claim 1, wherein the communication device is an in-vehicle device mounted in a vehicle;
wherein the target object is the vehicle in which the in-vehicle device is mounted;
wherein, when determining that the pedestrian does not see the vehicle, the in-vehicle device transmits alert information to the pedestrian device; and
wherein, when receiving the alert information transmitted from the in-vehicle device, the controller performs control based on the alert information so as to provide an alert to the pedestrian.

3. The pedestrian device according to claim 2, further comprising a short-range communication transceiver configured to perform short-range communications with a wearable device, wherein the wearable device is configured to be worn on a body of the pedestrian and detect the sight status of the pedestrian; and
wherein the controller is configured to acquire the sight status of the pedestrian from the wearable device.

4. The pedestrian device according to claim 3, wherein the wearable device is worn by the pedestrian on a head, and measures a head orientation of the pedestrian and a viewer-to-target distance from a viewpoint of the pedestrian to the target object, as the sight status information; and
wherein the controller is configured to transmit the head orientation and the viewer-to-target distance to the in-vehicle device.

5. The pedestrian device according to claim 3, wherein the wearable device includes a vibrator, a speaker, and a display; and wherein the controller is configured to control at least one selected from the group consisting of the vibrator, the speaker, and the display of the wearable device so as to guide the pedestrian to look in the direction toward the vehicle.

6. The pedestrian device according to claim 3, wherein the controller is configured to cause a display included in the wearable device to display a virtual vehicle image.

7. The pedestrian device according to claim 1, wherein the communication device is a roadside device installed on a road;
wherein the target object is an advertisement object;
wherein, when determining that the pedestrian sees the advertisement object, the roadside device transmits advertisement object information on the advertisement object to the pedestrian device; and
wherein, when receiving the advertisement object information transmitted from the roadside device, the controller performs control so as to present the advertisement object information to the pedestrian.

8. The pedestrian device according to claim 1, wherein the communication device is an in-vehicle device which is mounted in an advertisement vehicle used as an advertisement object;
wherein, when determining that the pedestrian sees the advertisement vehicle, the in-vehicle device transmits advertisement vehicle information on the advertisement vehicle to the pedestrian device; and
wherein, when receiving the advertisement vehicle information transmitted from the in-vehicle device, the controller performs control so as to present the advertisement vehicle information to the pedestrian.

9. The pedestrian device according to claim 7, further comprising a short-range communication transceiver configured to perform short-range communications with a wearable device, wherein the wearable device is configured to be worn on a body of the pedestrian and detect the sight status of the pedestrian; and
wherein the controller is configured to acquire the sight status of the pedestrian from the wearable device.

10. The pedestrian device according to claim 9, wherein the wearable device includes a vibrator, a speaker, and a display; and wherein the controller is configured to control at least one selected from the group consisting of the vibrator, the speaker, and the display of the wearable device so as to guide the pedestrian to look in the direction toward the vehicle.

11. A communication device installed near a target object to be paid attention, the target object being located on or around a road, and configured to deliver target object information on a target object to be paid attention by a pedestrian, the communication device comprising:
- a communication transceiver configured to communicate with a pedestrian device; and
- a controller,
- wherein, when the communication transceiver receives position data of the pedestrian transmitted from the pedestrian device, the controller determines whether or not the pedestrian approaches to within a predetermined distance from the target object based on the position data of the pedestrian;
- wherein, when determining that the pedestrian approaches to within the predetermined distance from the target object, the controller causes the communication transceiver to transmit guidance direction information to the pedestrian device, such that the pedestrian device uses the guidance direction information to guide the pedestrian to look in a direction toward the target object; and
- wherein, when the communication transceiver receives sight status information on a sight status of the pedestrian, the controller determines, based on the sight status information, whether or not the pedestrian sees the target object, and then, based on a determination result, the controller transmits target object information to the pedestrian device.

12. The communication device according to claim 11, wherein the communication device is an in-vehicle device mounted in a vehicle;
- wherein the target object is the vehicle, in which the in-vehicle device is mounted; and
- wherein, when determining that the pedestrian does not see the vehicle, the controller causes the communication transceiver to transmit alert information to the pedestrian device, the alert information providing an alert to the pedestrian.

13. The communication device according to claim 12, wherein, when the pedestrian sees the vehicle, the controller does not cause the communication transceiver to transmit the alert information.

14. The communication device according to claim 12, wherein the pedestrian device transmits a head orientation of the pedestrian and a viewer-to-target distance from a viewpoint of the pedestrian to the target object, as the sight status information, to the communication device; and
- wherein the controller determines whether or not the pedestrian sees the vehicle based on the head orientation, the viewer-to-target distance, and a body size of the vehicle.

15. The communication device according to claim 12, wherein the controller transmits a virtual vehicle image of the vehicle together with the guidance direction information to the pedestrian device, where the pedestrian device causes a wearable device to display the virtual vehicle image.

16. The communication device according to claim 11, wherein the communication device is a roadside device installed on a road;
- wherein the target object is an advertisement object; and
- wherein, when determining that the pedestrian sees the advertisement object, the controller causes the communication transceiver to transmit advertisement object information on the advertisement object to the pedestrian device.

17. The communication device according to claim 11, wherein the communication device is an in-vehicle device which is mounted in an advertisement vehicle used as an advertisement object;
- wherein the target object is the advertisement vehicle; and
- wherein, when determining that the pedestrian sees the advertisement object, the controller causes the communication transceiver to transmit advertisement vehicle information on the advertisement vehicle to the pedestrian device.

18. An information distribution method by which a communication device, delivers target object information on a target object to be paid attention by a pedestrian to a pedestrian device,
- wherein the pedestrian device transmits position data of a pedestrian to the communication device;
- wherein the communication device determines whether or not the pedestrian approaches to within a predetermined distance from the target object based on the position data of the pedestrian;
- wherein, when determining that the pedestrian approaches to within the predetermined distance from the target object, the communication device transmits guidance direction information to the pedestrian device, wherein the guidance direction information is to be used to guide the pedestrian to look in a direction toward the target object;
- wherein, when receiving the guidance direction information, the pedestrian device performs control based on the guidance direction information so as to guide the pedestrian to look in the direction toward the target object, and
- acquires sight status information on a sight status of the pedestrian, and transmits the sight status information to the communication device;
- wherein, when receiving the sight status information, the communication device determines, based on the sight status information, whether or not the pedestrian sees the target object, and then, based on a determination result, transmits target object information on the target object to the pedestrian device; and
- wherein, when receiving the target object information, the pedestrian device performs control so as to present the target object information to the pedestrian.

* * * * *